US012591304B2

(12) United States Patent
Muhammad et al.

(10) Patent No.: US 12,591,304 B2
(45) Date of Patent: Mar. 31, 2026

(54) SYSTEMS AND METHODS FOR CONTEXTUALIZED INTERACTIONS WITH AN ENVIRONMENT

(71) Applicant: Meta Platforms Technologies, LLC, Menlo Park, CA (US)

(72) Inventors: Faizan Muhammad, Medford, WA (US); Daniel Wetmore, Brooklyn, NY (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/415,563

(22) Filed: Jan. 17, 2024

(65) Prior Publication Data

US 2024/0160285 A1     May 16, 2024

Related U.S. Application Data

(63) Continuation of application No. 17/094,712, filed on Nov. 10, 2020, now Pat. No. 11,907,423.
(Continued)

(51) Int. Cl.
*G06T 19/20*          (2011.01)
*G06F 3/01*           (2006.01)
(Continued)

(52) U.S. Cl.
CPC ............. *G06F 3/014* (2013.01); *G06F 3/015* (2013.01); *G06T 7/33* (2017.01); *G06T 19/003* (2013.01);
(Continued)

(58) Field of Classification Search
None
See application file for complete search history.

(56) References Cited

U.S. PATENT DOCUMENTS 1,411,995 A      4/1922 Dull
3,408,133 A     10/1968 Lee
(Continued)

FOREIGN PATENT DOCUMENTS

CA        2902045 A1     8/2014
CA        2921954 A1     2/2015
(Continued)

OTHER PUBLICATIONS

Final Office Action mailed Feb. 24, 2025 for U.S. Appl. No. 17/741,263, filed May 10, 2022, 9 pages.
(Continued)

*Primary Examiner* — Kee M Tung
(74) *Attorney, Agent, or Firm* — Morgan, Lewis & Bockius LLP

(57) ABSTRACT

Computerized systems, methods, apparatuses, and computer-readable storage media are provided for generating a 3D map of an environment and/or for utilizing the 3D map to enable a user to control smart devices in the environment and/or to interact with a person in the environment. To generate the 3D map, perform the control, and/or interact with the person, a plurality of neuromuscular sensors may be worn by the user. The sensors may be arranged on a carrier worn by the user and may be configured to sense neuromuscular signals from the user. A camera configured to capture information about the environment may be arranged on the carrier worn by the user. The sensors and the camera provide data to a computer processor coupled to a memory.

20 Claims, 22 Drawing Sheets

1000

Related U.S. Application Data

(60) Provisional application No. 62/940,121, filed on Nov. 25, 2019.

(51) Int. Cl.

| | |
|---|---|
| *G06T 7/33* | (2017.01) |
| *G06T 19/00* | (2011.01) |
| *G06V 10/147* | (2022.01) |
| *G06V 10/94* | (2022.01) |
| *G06V 20/20* | (2022.01) |
| *G06V 20/64* | (2022.01) |

(52) U.S. Cl.

CPC ............ *G06T 19/20* (2013.01); *G06V 10/147* (2022.01); *G06V 10/945* (2022.01); *G06V 20/20* (2022.01); *G06V 20/64* (2022.01); *G06T 2207/10016* (2013.01)

(56) References Cited

U.S. PATENT DOCUMENTS

| | | | |
|---|---|---|---|
| 3,580,243 | A | 5/1971 | Johnson |
| 3,620,208 | A | 11/1971 | Wayne et al. |
| 3,712,716 | A | 1/1973 | Cornsweet et al. |
| 3,735,425 | A | 5/1973 | Hoshall et al. |
| 3,880,146 | A | 4/1975 | Everett et al. |
| 4,055,168 | A | 10/1977 | Miller et al. |
| 4,602,639 | A | 7/1986 | Hoogendoorn et al. |
| 4,705,408 | A | 11/1987 | Jordi |
| 4,817,064 | A | 3/1989 | Milles |
| 4,896,120 | A | 1/1990 | Kamil |
| 4,978,213 | A | 12/1990 | El Hage |
| 5,003,978 | A | 4/1991 | Dunseath, Jr. |
| D322,227 | S | 12/1991 | Warhol, deceased |
| 5,081,852 | A | 1/1992 | Cox |
| 5,103,323 | A | 4/1992 | Magarinos et al. |
| 5,231,674 | A | 7/1993 | Cleveland et al. |
| 5,251,189 | A | 10/1993 | Thorp |
| D348,660 | S | 7/1994 | Parsons |
| 5,445,869 | A | 8/1995 | Ishikawa et al. |
| 5,462,065 | A | 10/1995 | Cusimano |
| 5,467,104 | A | 11/1995 | Furness, III et al. |
| 5,482,051 | A | 1/1996 | Reddy et al. |
| 5,589,956 | A | 12/1996 | Morishima et al. |
| 5,596,339 | A | 1/1997 | Furness, III et al. |
| 5,605,059 | A | 2/1997 | Woodward |
| 5,625,577 | A | 4/1997 | Kunii et al. |
| 5,683,404 | A | 11/1997 | Johnson |
| 5,742,421 | A | 4/1998 | Wells et al. |
| 6,005,548 | A | 12/1999 | Latypov et al. |
| 6,008,781 | A | 12/1999 | Furness, III et al. |
| 6,009,210 | A | 12/1999 | Kang |
| 6,027,216 | A | 2/2000 | Guyton et al. |
| 6,032,530 | A | 3/2000 | Hock |
| D422,617 | S | 4/2000 | Simioni |
| 6,066,794 | A | 5/2000 | Longo |
| 6,184,847 | B1 | 2/2001 | Fateh et al. |
| 6,236,476 | B1 | 5/2001 | Son et al. |
| 6,238,338 | B1 | 5/2001 | DeLuca et al. |
| 6,244,873 | B1 | 6/2001 | Hill et al. |
| 6,317,103 | B1 | 11/2001 | Furness, III et al. |
| 6,377,277 | B1 | 4/2002 | Yamamoto |
| D459,352 | S | 6/2002 | Giovanniello |
| 6,411,843 | B1 | 6/2002 | Zarychta |
| 6,487,906 | B1 | 12/2002 | Hock |
| 6,510,333 | B1 | 1/2003 | Licata et al. |
| 6,527,711 | B1 | 3/2003 | Stivoric et al. |
| 6,619,836 | B1 | 9/2003 | Silvant et al. |
| 6,639,570 | B2 | 10/2003 | Furness, III et al. |
| 6,658,287 | B1 | 12/2003 | Litt et al. |
| 6,720,984 | B1 | 4/2004 | Jorgensen et al. |
| 6,743,982 | B2 | 6/2004 | Biegelsen et al. |
| 6,771,294 | B1 | 8/2004 | Pulli et al. |
| 6,774,885 | B1 | 8/2004 | Even-Zohar |
| 6,807,438 | B1 | 10/2004 | Brun Del Re et al. |
| D502,661 | S | 3/2005 | Rapport |
| D502,662 | S | 3/2005 | Rapport |
| 6,865,409 | B2 | 3/2005 | Getsla et al. |
| D503,646 | S | 4/2005 | Rapport |
| 6,880,364 | B1 | 4/2005 | Vidolin et al. |
| 6,901,286 | B1 | 5/2005 | Sinderby et al. |
| 6,927,343 | B2 | 8/2005 | Watanabe et al. |
| 6,942,621 | B2 | 9/2005 | Avinash et al. |
| 6,965,842 | B2 | 11/2005 | Rekimoto |
| 6,972,734 | B1 | 12/2005 | Ohshima et al. |
| 6,984,208 | B2 | 1/2006 | Zheng |
| 7,022,919 | B2 | 4/2006 | Brist et al. |
| 7,028,507 | B2 | 4/2006 | Rapport |
| 7,086,218 | B1 | 8/2006 | Pasach |
| 7,089,148 | B1 | 8/2006 | Bachmann et al. |
| D535,401 | S | 1/2007 | Travis et al. |
| 7,173,437 | B2 | 2/2007 | Hervieux et al. |
| 7,209,114 | B2 | 4/2007 | Radley-Smith |
| D543,212 | S | 5/2007 | Marks |
| 7,265,298 | B2 | 9/2007 | Maghribi et al. |
| 7,271,774 | B2 | 9/2007 | Puuri |
| 7,333,090 | B2 | 2/2008 | Tanaka et al. |
| 7,351,975 | B2 | 4/2008 | Brady et al. |
| 7,450,107 | B2 | 11/2008 | Radley-Smith |
| 7,473,888 | B2 | 1/2009 | Wine et al. |
| 7,491,892 | B2 | 2/2009 | Wagner et al. |
| 7,517,725 | B2 | 4/2009 | Reis |
| 7,558,622 | B2 | 7/2009 | Tran |
| 7,574,253 | B2 | 8/2009 | Edney et al. |
| 7,580,742 | B2 | 8/2009 | Tan et al. |
| 7,596,393 | B2 | 9/2009 | Jung et al. |
| 7,618,260 | B2 | 11/2009 | Daniel et al. |
| 7,636,549 | B2 | 12/2009 | Ma et al. |
| 7,640,007 | B2 | 12/2009 | Chen et al. |
| 7,660,126 | B2 | 2/2010 | Cho et al. |
| 7,684,105 | B2 | 3/2010 | Lamontagne et al. |
| 7,747,113 | B2 | 6/2010 | Mukawa et al. |
| 7,761,390 | B2 | 7/2010 | Ford |
| 7,773,111 | B2 | 8/2010 | Cleveland et al. |
| 7,787,946 | B2 | 8/2010 | Stahmann et al. |
| 7,805,386 | B2 | 9/2010 | Greer |
| 7,809,435 | B1 | 10/2010 | Ettare et al. |
| 7,844,310 | B2 | 11/2010 | Anderson |
| D628,616 | S | 12/2010 | Yuan |
| 7,850,306 | B2 | 12/2010 | Uusitalo et al. |
| 7,870,211 | B2 | 1/2011 | Pascal et al. |
| D633,939 | S | 3/2011 | Puentes et al. |
| D634,771 | S | 3/2011 | Fuchs |
| 7,901,368 | B2 | 3/2011 | Flaherty et al. |
| 7,925,100 | B2 | 4/2011 | Howell et al. |
| 7,948,763 | B2 | 5/2011 | Chuang |
| D640,314 | S | 6/2011 | Yang |
| D643,428 | S | 8/2011 | Janky et al. |
| D646,192 | S | 10/2011 | Woode |
| D649,177 | S | 11/2011 | Cho et al. |
| 8,054,061 | B2 | 11/2011 | Prance et al. |
| D654,622 | S | 2/2012 | Hsu |
| 8,120,828 | B2 | 2/2012 | Schwerdtner |
| 8,170,656 | B2 | 5/2012 | Tan et al. |
| 8,179,604 | B1 | 5/2012 | Prada Gomez et al. |
| 8,188,937 | B1 | 5/2012 | Amafuji et al. |
| 8,190,249 | B2 | 5/2012 | Gharieb et al. |
| D661,613 | S | 6/2012 | Demeglio |
| 8,203,502 | B1 | 6/2012 | Chi et al. |
| 8,207,473 | B2 | 6/2012 | Axisa et al. |
| 8,212,859 | B2 | 7/2012 | Tang et al. |
| D667,482 | S | 9/2012 | Healy et al. |
| D669,522 | S | 10/2012 | Klinar et al. |
| D669,523 | S | 10/2012 | Wakata et al. |
| D671,590 | S | 11/2012 | Klinar et al. |
| 8,311,623 | B2 | 11/2012 | Sanger |
| 8,348,538 | B2 | 1/2013 | Van Loenen et al. |
| 8,351,651 | B2 | 1/2013 | Lee |
| 8,355,671 | B2 | 1/2013 | Kramer et al. |
| 8,384,683 | B2 | 2/2013 | Luo |
| 8,386,025 | B2 | 2/2013 | Hoppe |
| 8,389,862 | B2 | 3/2013 | Arora et al. |
| 8,421,634 | B2 | 4/2013 | Tan et al. |
| 8,427,977 | B2 | 4/2013 | Workman et al. |

(56) References Cited

U.S. PATENT DOCUMENTS

| | | | |
|---|---|---|---|
| D682,343 S | 5/2013 | Waters |
| D682,727 S | 5/2013 | Bulgari |
| 8,435,191 B2 | 5/2013 | Barboutis et al. |
| 8,437,844 B2 | 5/2013 | Syed Momen et al. |
| 8,447,704 B2 | 5/2013 | Tan et al. |
| D685,019 S | 6/2013 | Li |
| 8,467,270 B2 | 6/2013 | Gossweiler, III et al. |
| 8,469,741 B2 | 6/2013 | Oster et al. |
| D687,087 S | 7/2013 | Iurilli |
| 8,484,022 B1 | 7/2013 | Vanhoucke |
| D689,862 S | 9/2013 | Liu |
| D692,941 S | 11/2013 | Klinar et al. |
| 8,591,411 B2 | 11/2013 | Banet et al. |
| D695,333 S | 12/2013 | Farnam et al. |
| D695,454 S | 12/2013 | Moore |
| 8,620,361 B2 | 12/2013 | Bailey et al. |
| 8,624,124 B2 | 1/2014 | Koo et al. |
| 8,634,119 B2 | 1/2014 | Bablumyan et al. |
| D701,555 S | 3/2014 | Markovitz et al. |
| 8,666,212 B1 | 3/2014 | Amirparviz |
| 8,702,629 B2 | 4/2014 | Giuffrida et al. |
| 8,704,882 B2 | 4/2014 | Turner |
| D704,248 S | 5/2014 | DiChiara |
| 8,718,980 B2 | 5/2014 | Garudadri et al. |
| 8,743,052 B1 | 6/2014 | Keller et al. |
| 8,744,543 B2 | 6/2014 | Li et al. |
| 8,754,862 B2 | 6/2014 | Zaliva |
| 8,777,668 B2 | 7/2014 | Ikeda et al. |
| D716,457 S | 10/2014 | Brefka et al. |
| D717,685 S | 11/2014 | Bailey et al. |
| 8,879,276 B2 | 11/2014 | Wang |
| 8,880,163 B2 | 11/2014 | Barachant et al. |
| 8,883,287 B2 | 11/2014 | Boyce et al. |
| 8,890,875 B2 | 11/2014 | Jammes et al. |
| 8,892,479 B2 | 11/2014 | Tan et al. |
| 8,895,865 B2 | 11/2014 | Lenahan et al. |
| D719,568 S | 12/2014 | Heinrich et al. |
| D719,570 S | 12/2014 | Heinrich et al. |
| 8,912,094 B2 | 12/2014 | Koo et al. |
| 8,914,472 B1 | 12/2014 | Lee et al. |
| 8,922,481 B1 | 12/2014 | Kauffmann et al. |
| D723,093 S | 2/2015 | Li |
| 8,954,135 B2 | 2/2015 | Yuen et al. |
| D724,647 S | 3/2015 | Rohrbach |
| 8,970,571 B1 | 3/2015 | Wong et al. |
| 8,971,023 B2 | 3/2015 | Olsson et al. |
| 9,018,532 B2 | 4/2015 | Wesselmann et al. |
| 9,037,530 B2 | 5/2015 | Tan et al. |
| 9,086,687 B2 | 7/2015 | Park et al. |
| 9,092,664 B2 | 7/2015 | Forutanpour et al. |
| D736,664 S | 8/2015 | Paradise et al. |
| 9,107,586 B2 | 8/2015 | Tran |
| D738,373 S | 9/2015 | Davies et al. |
| 9,135,708 B2 | 9/2015 | Ebisawa |
| 9,146,730 B2 | 9/2015 | Lazar |
| D741,855 S | 10/2015 | Park et al. |
| 9,170,674 B2 | 10/2015 | Forutanpour et al. |
| D742,272 S | 11/2015 | Bailey et al. |
| D742,874 S | 11/2015 | Cheng et al. |
| D743,963 S | 11/2015 | Osterhout |
| 9,182,826 B2 | 11/2015 | Powledge et al. |
| 9,211,417 B2 | 12/2015 | Heldman et al. |
| 9,218,574 B2 | 12/2015 | Phillipps et al. |
| D747,714 S | 1/2016 | Erbeus |
| D747,759 S | 1/2016 | Ho |
| 9,235,934 B2 | 1/2016 | Mandella et al. |
| 9,240,069 B1 | 1/2016 | Li |
| D750,623 S | 3/2016 | Park et al. |
| D751,065 S | 3/2016 | Magi |
| 9,278,453 B2 | 3/2016 | Assad |
| 9,299,248 B2 | 3/2016 | Lake et al. |
| D756,359 S | 5/2016 | Bailey et al. |
| 9,329,694 B2 | 5/2016 | Slonneger |
| 9,341,659 B2 | 5/2016 | Poupyrev et al. |
| 9,349,280 B2 | 5/2016 | Baldwin et al. |
| 9,351,653 B1 | 5/2016 | Harrison |
| D758,476 S | 6/2016 | Ho |
| D760,313 S | 6/2016 | Ho et al. |
| 9,367,139 B2 | 6/2016 | Ataee et al. |
| 9,372,535 B2 | 6/2016 | Bailey et al. |
| 9,389,694 B2 | 7/2016 | Ataee et al. |
| 9,393,418 B2 | 7/2016 | Giuffrida et al. |
| 9,402,582 B1 | 8/2016 | Parviz et al. |
| 9,408,316 B2 | 8/2016 | Bailey et al. |
| 9,418,927 B2 | 8/2016 | Axisa et al. |
| D766,895 S | 9/2016 | Choi |
| 9,439,566 B2 | 9/2016 | Arne et al. |
| D768,627 S | 10/2016 | Rochat et al. |
| 9,459,697 B2 | 10/2016 | Bedikian et al. |
| 9,472,956 B2 | 10/2016 | Michaelis et al. |
| 9,477,313 B2 | 10/2016 | Mistry et al. |
| D771,735 S | 11/2016 | Lee et al. |
| 9,483,123 B2 | 11/2016 | Aleem et al. |
| 9,529,434 B2 | 12/2016 | Choi et al. |
| D780,828 S | 3/2017 | Bonaventura et al. |
| D780,829 S | 3/2017 | Bonaventura et al. |
| 9,597,015 B2 | 3/2017 | McNames et al. |
| 9,600,030 B2 | 3/2017 | Bailey et al. |
| 9,612,661 B2 | 4/2017 | Wagner et al. |
| 9,613,262 B2 | 4/2017 | Holz |
| 9,652,047 B2 | 5/2017 | Mullins et al. |
| 9,654,477 B1 | 5/2017 | Kotamraju |
| 9,659,403 B1 | 5/2017 | Horowitz |
| 9,687,168 B2 | 6/2017 | John |
| 9,696,795 B2 | 7/2017 | Marcolina et al. |
| 9,720,515 B2 | 8/2017 | Wagner et al. |
| 9,741,169 B1 | 8/2017 | Holz |
| 9,766,709 B2 | 9/2017 | Holz |
| 9,785,247 B1 | 10/2017 | Horowitz et al. |
| 9,788,789 B2 | 10/2017 | Bailey |
| 9,807,221 B2 | 10/2017 | Bailey et al. |
| 9,864,431 B2 | 1/2018 | Keskin et al. |
| 9,867,548 B2 | 1/2018 | Le et al. |
| 9,880,632 B2 | 1/2018 | Ataee et al. |
| 9,891,718 B2 | 2/2018 | Connor |
| 9,921,641 B1 | 3/2018 | Worley, III et al. |
| 9,996,983 B2 | 6/2018 | Mullins |
| 10,042,422 B2 | 8/2018 | Morun et al. |
| 10,070,799 B2 | 9/2018 | Ang et al. |
| 10,078,435 B2 | 9/2018 | Noel |
| 10,101,809 B2 | 10/2018 | Morun et al. |
| 10,152,082 B2 | 12/2018 | Bailey |
| 10,185,416 B2 | 1/2019 | Mistry et al. |
| 10,188,309 B2 | 1/2019 | Morun et al. |
| 10,198,871 B1 * | 2/2019 | Hariton ................. H04L 67/131 |
| 10,199,008 B2 | 2/2019 | Aleem et al. |
| 10,203,751 B2 | 2/2019 | Keskin et al. |
| 10,216,274 B2 | 2/2019 | Chapeskie et al. |
| 10,251,577 B2 | 4/2019 | Morun et al. |
| 10,310,601 B2 | 6/2019 | Morun et al. |
| 10,331,210 B2 | 6/2019 | Morun et al. |
| 10,362,958 B2 | 7/2019 | Morun et al. |
| 10,409,371 B2 | 9/2019 | Kaifosh et al. |
| 10,429,928 B2 | 10/2019 | Morun et al. |
| 10,437,335 B2 | 10/2019 | Daniels |
| 10,460,455 B2 | 10/2019 | Giurgica-Tiron et al. |
| 10,489,986 B2 | 11/2019 | Kaifosh et al. |
| 10,496,168 B2 | 12/2019 | Kaifosh et al. |
| 10,504,286 B2 | 12/2019 | Kaifosh et al. |
| 10,520,378 B1 | 12/2019 | Brown et al. |
| 10,528,135 B2 | 1/2020 | Bailey et al. |
| 10,558,273 B2 | 2/2020 | Park et al. |
| 10,592,001 B2 | 3/2020 | Berenzweig et al. |
| 10,610,737 B1 | 4/2020 | Crawford |
| 10,676,083 B1 | 6/2020 | De Sapio et al. |
| 10,687,759 B2 | 6/2020 | Guo et al. |
| 10,905,350 B2 | 2/2021 | Berenzweig et al. |
| 10,905,383 B2 | 2/2021 | Barachant |
| 10,937,414 B2 | 3/2021 | Berenzweig et al. |
| 10,990,174 B2 | 4/2021 | Kaifosh et al. |
| 11,009,951 B2 | 5/2021 | Bailey et al. |
| 11,150,730 B1 | 10/2021 | Anderson et al. |
| 11,327,566 B2 | 5/2022 | Hussami et al. |
| 11,635,736 B2 | 4/2023 | Kaifosh et al. |

(56)        References Cited

U.S. PATENT DOCUMENTS

| | | |
|---|---|---|
| 11,644,799 B2 | 5/2023 | Lake et al. |
| 2001/0033402 A1 | 10/2001 | Popovich |
| 2002/0003627 A1 | 1/2002 | Rieder |
| 2002/0009972 A1 | 1/2002 | Amento et al. |
| 2002/0030636 A1 | 3/2002 | Richards |
| 2002/0032386 A1 | 3/2002 | Sackner et al. |
| 2002/0077534 A1 | 6/2002 | DuRousseau |
| 2002/0094701 A1 | 7/2002 | Biegelsen et al. |
| 2002/0120415 A1 | 8/2002 | Millott et al. |
| 2002/0120916 A1 | 8/2002 | Snider, Jr. |
| 2002/0198472 A1 | 12/2002 | Kramer |
| 2003/0030595 A1 | 2/2003 | Radley-Smith |
| 2003/0036691 A1 | 2/2003 | Stanaland et al. |
| 2003/0051505 A1 | 3/2003 | Robertson et al. |
| 2003/0144586 A1 | 7/2003 | Tsubata |
| 2003/0144829 A1 | 7/2003 | Geatz et al. |
| 2003/0171921 A1 | 9/2003 | Manabe et al. |
| 2003/0182630 A1 | 9/2003 | Saund et al. |
| 2003/0184544 A1 | 10/2003 | Prudent |
| 2004/0010210 A1 | 1/2004 | Avinash et al. |
| 2004/0024312 A1 | 2/2004 | Zheng |
| 2004/0054273 A1 | 3/2004 | Finneran et al. |
| 2004/0068409 A1 | 4/2004 | Tanaka et al. |
| 2004/0073104 A1 | 4/2004 | Brun del Re et al. |
| 2004/0073414 A1 | 4/2004 | Bienenstock et al. |
| 2004/0080499 A1 | 4/2004 | Lui |
| 2004/0092839 A1 | 5/2004 | Shin et al. |
| 2004/0138580 A1 | 7/2004 | Frei et al. |
| 2004/0194500 A1 | 10/2004 | Rapport |
| 2004/0210165 A1 | 10/2004 | Marmaropoulos et al. |
| 2004/0243342 A1 | 12/2004 | Rekimoto |
| 2004/0254617 A1 | 12/2004 | Hemmerling et al. |
| 2005/0005637 A1 | 1/2005 | Rapport |
| 2005/0012715 A1 | 1/2005 | Ford |
| 2005/0070227 A1 | 3/2005 | Shen et al. |
| 2005/0070791 A1 | 3/2005 | Edney et al. |
| 2005/0115561 A1 | 6/2005 | Stahmann et al. |
| 2005/0119701 A1 | 6/2005 | Lauter et al. |
| 2005/0177038 A1 | 8/2005 | Kolpin et al. |
| 2005/0179644 A1 | 8/2005 | Alsio et al. |
| 2006/0018833 A1 | 1/2006 | Murphy et al. |
| 2006/0037359 A1 | 2/2006 | Stinespring |
| 2006/0058699 A1 | 3/2006 | Vitiello et al. |
| 2006/0061544 A1 | 3/2006 | Min et al. |
| 2006/0121958 A1 | 6/2006 | Jung et al. |
| 2006/0129057 A1 | 6/2006 | Maekawa et al. |
| 2006/0132705 A1 | 6/2006 | Li |
| 2006/0149338 A1 | 7/2006 | Flaherty et al. |
| 2006/0211956 A1 | 9/2006 | Sankai |
| 2006/0238707 A1 | 10/2006 | Elvesjo et al. |
| 2007/0009151 A1 | 1/2007 | Pittman et al. |
| 2007/0016265 A1 | 1/2007 | Davoodi et al. |
| 2007/0023662 A1 | 2/2007 | Brady et al. |
| 2007/0078308 A1 | 4/2007 | Daly |
| 2007/0132785 A1 | 6/2007 | Ebersole, Jr. et al. |
| 2007/0148624 A1 | 6/2007 | Nativ |
| 2007/0172797 A1 | 7/2007 | Hada et al. |
| 2007/0177770 A1 | 8/2007 | Derchak et al. |
| 2007/0185697 A1 | 8/2007 | Tan et al. |
| 2007/0196033 A1 | 8/2007 | Russo |
| 2007/0256494 A1 | 11/2007 | Nakamura et al. |
| 2007/0276270 A1 | 11/2007 | Tran |
| 2007/0279852 A1 | 12/2007 | Daniel et al. |
| 2007/0285399 A1 | 12/2007 | Lund |
| 2008/0001735 A1 | 1/2008 | Tran |
| 2008/0032638 A1 | 2/2008 | Anderson |
| 2008/0051673 A1 | 2/2008 | Kong et al. |
| 2008/0052643 A1 | 2/2008 | Ike et al. |
| 2008/0058668 A1 | 3/2008 | Seyed Momen et al. |
| 2008/0103639 A1 | 5/2008 | Troy et al. |
| 2008/0103769 A1 | 5/2008 | Schultz et al. |
| 2008/0136775 A1 | 6/2008 | Conant |
| 2008/0152217 A1 | 6/2008 | Greer |
| 2008/0163130 A1 | 7/2008 | Westerman |
| 2008/0214360 A1 | 9/2008 | Stirling et al. |
| 2008/0221487 A1 | 9/2008 | Zohar et al. |
| 2008/0262772 A1 | 10/2008 | Luinge et al. |
| 2008/0278497 A1 | 11/2008 | Jammes et al. |
| 2008/0285805 A1 | 11/2008 | Luinge et al. |
| 2009/0005700 A1 | 1/2009 | Joshi et al. |
| 2009/0007597 A1 | 1/2009 | Hanevold |
| 2009/0027337 A1 | 1/2009 | Hildreth |
| 2009/0031757 A1 | 2/2009 | Harding |
| 2009/0040016 A1 | 2/2009 | Ikeda |
| 2009/0051544 A1 | 2/2009 | Niknejad |
| 2009/0079607 A1 | 3/2009 | Denison et al. |
| 2009/0079813 A1 | 3/2009 | Hildreth |
| 2009/0082692 A1 | 3/2009 | Hale et al. |
| 2009/0082701 A1 | 3/2009 | Zohar et al. |
| 2009/0085864 A1 | 4/2009 | Kutliroff et al. |
| 2009/0102580 A1 | 4/2009 | Uchaykin |
| 2009/0109241 A1 | 4/2009 | Tsujimoto |
| 2009/0112080 A1 | 4/2009 | Matthews |
| 2009/0124881 A1 | 5/2009 | Rytky |
| 2009/0147004 A1 | 6/2009 | Ramon et al. |
| 2009/0179824 A1 | 7/2009 | Tsujimoto et al. |
| 2009/0189864 A1 | 7/2009 | Walker et al. |
| 2009/0189867 A1 | 7/2009 | Krah et al. |
| 2009/0195497 A1 | 8/2009 | Fitzgerald et al. |
| 2009/0204031 A1 | 8/2009 | McNames et al. |
| 2009/0207464 A1 | 8/2009 | Wiltshire et al. |
| 2009/0209878 A1 | 8/2009 | Sanger |
| 2009/0251407 A1 | 10/2009 | Flake et al. |
| 2009/0258669 A1 | 10/2009 | Nie et al. |
| 2009/0265671 A1 | 10/2009 | Sachs et al. |
| 2009/0318785 A1 | 12/2009 | Ishikawa et al. |
| 2009/0319230 A1 | 12/2009 | Case, Jr. et al. |
| 2009/0322653 A1 | 12/2009 | Putilin et al. |
| 2009/0326406 A1 | 12/2009 | Tan et al. |
| 2009/0327171 A1 | 12/2009 | Tan et al. |
| 2010/0030532 A1 | 2/2010 | Arora et al. |
| 2010/0041974 A1 | 2/2010 | Ting et al. |
| 2010/0045619 A1* | 2/2010 | Birnbaum ........... G06F 3/04845 |
| | | 345/173 |
| 2010/0063794 A1 | 3/2010 | Hernandez-Rebollar |
| 2010/0066664 A1 | 3/2010 | Son et al. |
| 2010/0106044 A1 | 4/2010 | Linderman |
| 2010/0113910 A1 | 5/2010 | Brauers et al. |
| 2010/0142015 A1 | 6/2010 | Kuwahara et al. |
| 2010/0149073 A1 | 6/2010 | Chaum et al. |
| 2010/0150415 A1 | 6/2010 | Atkinson et al. |
| 2010/0228487 A1 | 9/2010 | Leuthardt et al. |
| 2010/0234696 A1 | 9/2010 | Li et al. |
| 2010/0240981 A1 | 9/2010 | Barboutis et al. |
| 2010/0249635 A1 | 9/2010 | Van Der Reijden |
| 2010/0280628 A1 | 11/2010 | Sankai |
| 2010/0292595 A1 | 11/2010 | Paul |
| 2010/0292606 A1 | 11/2010 | Prakash et al. |
| 2010/0292617 A1 | 11/2010 | Lei et al. |
| 2010/0293115 A1 | 11/2010 | Seyed Momen |
| 2010/0306713 A1 | 12/2010 | Geisner et al. |
| 2010/0315266 A1 | 12/2010 | Gunawardana et al. |
| 2010/0317958 A1 | 12/2010 | Beck et al. |
| 2011/0007035 A1 | 1/2011 | Shai |
| 2011/0018754 A1 | 1/2011 | Tojima et al. |
| 2011/0025982 A1 | 2/2011 | Takahashi |
| 2011/0054360 A1 | 3/2011 | Son et al. |
| 2011/0065319 A1 | 3/2011 | Oster et al. |
| 2011/0066381 A1 | 3/2011 | Garudadri et al. |
| 2011/0072510 A1 | 3/2011 | Cheswick |
| 2011/0077484 A1 | 3/2011 | Van Slyke et al. |
| 2011/0082838 A1 | 4/2011 | Niemela |
| 2011/0092826 A1 | 4/2011 | Lee et al. |
| 2011/0105859 A1 | 5/2011 | Popovic et al. |
| 2011/0119216 A1 | 5/2011 | Wigdor |
| 2011/0133934 A1 | 6/2011 | Tan et al. |
| 2011/0134026 A1 | 6/2011 | Kang et al. |
| 2011/0151974 A1 | 6/2011 | Deaguero |
| 2011/0166434 A1 | 7/2011 | Gargiulo |
| 2011/0172503 A1 | 7/2011 | Knepper et al. |
| 2011/0173204 A1 | 7/2011 | Murillo et al. |
| 2011/0173574 A1 | 7/2011 | Clavin et al. |
| 2011/0181527 A1 | 7/2011 | Capela et al. |
| 2011/0202493 A1 | 8/2011 | Li |

(56)  References Cited

U.S. PATENT DOCUMENTS

| | | |
|---|---|---|
| 2011/0205242 A1 | 8/2011 | Friesen |
| 2011/0213278 A1 | 9/2011 | Horak et al. |
| 2011/0221656 A1 | 9/2011 | Haddick et al. |
| 2011/0221672 A1 | 9/2011 | Osterhout et al. |
| 2011/0224507 A1 | 9/2011 | Banet et al. |
| 2011/0224556 A1 | 9/2011 | Moon et al. |
| 2011/0224564 A1 | 9/2011 | Moon et al. |
| 2011/0230782 A1 | 9/2011 | Bartol et al. |
| 2011/0248914 A1 | 10/2011 | Sherr |
| 2011/0262002 A1 | 10/2011 | Lee |
| 2011/0270135 A1 | 11/2011 | Dooley et al. |
| 2011/0295100 A1 | 12/2011 | Hegde et al. |
| 2011/0313762 A1 | 12/2011 | Ben-David et al. |
| 2012/0002256 A1 | 1/2012 | Lacoste et al. |
| 2012/0007821 A1 | 1/2012 | Zaliva |
| 2012/0029322 A1 | 2/2012 | Wartena et al. |
| 2012/0051005 A1 | 3/2012 | Vanfleteren et al. |
| 2012/0052268 A1 | 3/2012 | Axisa et al. |
| 2012/0053439 A1 | 3/2012 | Ylostalo et al. |
| 2012/0066163 A1 | 3/2012 | Balls et al. |
| 2012/0071092 A1 | 3/2012 | Pasquero et al. |
| 2012/0071780 A1 | 3/2012 | Barachant et al. |
| 2012/0101357 A1 | 4/2012 | Hoskuldsson et al. |
| 2012/0117514 A1 | 5/2012 | Kim et al. |
| 2012/0139817 A1 | 6/2012 | Freeman |
| 2012/0157789 A1 | 6/2012 | Kangas et al. |
| 2012/0157886 A1 | 6/2012 | Tenn et al. |
| 2012/0165695 A1 | 6/2012 | Kidmose et al. |
| 2012/0182309 A1 | 7/2012 | Griffin et al. |
| 2012/0184838 A1 | 7/2012 | John |
| 2012/0188158 A1 | 7/2012 | Tan et al. |
| 2012/0203076 A1 | 8/2012 | Fatta et al. |
| 2012/0209134 A1 | 8/2012 | Morita et al. |
| 2012/0226130 A1 | 9/2012 | De Graff et al. |
| 2012/0249797 A1 | 10/2012 | Haddick et al. |
| 2012/0265090 A1 | 10/2012 | Fink et al. |
| 2012/0265480 A1 | 10/2012 | Oshima |
| 2012/0275621 A1 | 11/2012 | Elko |
| 2012/0283526 A1 | 11/2012 | Gommesen et al. |
| 2012/0283896 A1 | 11/2012 | Persaud et al. |
| 2012/0293548 A1 | 11/2012 | Perez et al. |
| 2012/0302858 A1 | 11/2012 | Kidmose et al. |
| 2012/0320532 A1 | 12/2012 | Wang |
| 2012/0323521 A1 | 12/2012 | De Foras et al. |
| 2013/0004033 A1 | 1/2013 | Trugenberger |
| 2013/0005303 A1 | 1/2013 | Song et al. |
| 2013/0016292 A1 | 1/2013 | Miao et al. |
| 2013/0016413 A1 | 1/2013 | Saeedi et al. |
| 2013/0020948 A1 | 1/2013 | Han et al. |
| 2013/0027341 A1 | 1/2013 | Mastandrea |
| 2013/0038707 A1 | 2/2013 | Cunningham et al. |
| 2013/0077820 A1 | 3/2013 | Marais et al. |
| 2013/0080794 A1 | 3/2013 | Hsieh |
| 2013/0106686 A1 | 5/2013 | Bennett |
| 2013/0123656 A1 | 5/2013 | Heck |
| 2013/0123666 A1 | 5/2013 | Giuffrida et al. |
| 2013/0127708 A1 | 5/2013 | Jung et al. |
| 2013/0131538 A1 | 5/2013 | Gaw et al. |
| 2013/0135223 A1 | 5/2013 | Shai |
| 2013/0135722 A1 | 5/2013 | Yokoyama |
| 2013/0141375 A1 | 6/2013 | Ludwig et al. |
| 2013/0144629 A1 | 6/2013 | Johnston et al. |
| 2013/0165813 A1 | 6/2013 | Chang et al. |
| 2013/0191741 A1 | 7/2013 | Dickinson et al. |
| 2013/0198694 A1 | 8/2013 | Rahman et al. |
| 2013/0207889 A1 | 8/2013 | Chang et al. |
| 2013/0207963 A1 | 8/2013 | Stirbu et al. |
| 2013/0215235 A1 | 8/2013 | Russell |
| 2013/0217998 A1 | 8/2013 | Mahfouz et al. |
| 2013/0221996 A1 | 8/2013 | Poupyrev et al. |
| 2013/0222384 A1 | 8/2013 | Futterer |
| 2013/0232095 A1 | 9/2013 | Tan et al. |
| 2013/0259238 A1 | 10/2013 | Xiang et al. |
| 2013/0265229 A1 | 10/2013 | Forutanpour et al. |
| 2013/0265437 A1 | 10/2013 | Thorn et al. |
| 2013/0271292 A1 | 10/2013 | McDermott |
| 2013/0285901 A1 | 10/2013 | Lee et al. |
| 2013/0285913 A1 | 10/2013 | Griffin et al. |
| 2013/0293580 A1 | 11/2013 | Spivack |
| 2013/0310979 A1 | 11/2013 | Herr et al. |
| 2013/0312256 A1 | 11/2013 | Wesselmann et al. |
| 2013/0317382 A1 | 11/2013 | Le |
| 2013/0317648 A1 | 11/2013 | Assad |
| 2013/0332196 A1 | 12/2013 | Pinsker |
| 2013/0335302 A1 | 12/2013 | Crane et al. |
| 2014/0005743 A1 | 1/2014 | Giuffrida et al. |
| 2014/0020945 A1 | 1/2014 | Hurwitz et al. |
| 2014/0028539 A1 | 1/2014 | Newham et al. |
| 2014/0028546 A1 | 1/2014 | Jeon et al. |
| 2014/0045547 A1 | 2/2014 | Singamsetty et al. |
| 2014/0049417 A1 | 2/2014 | Abdurrahman et al. |
| 2014/0051946 A1 | 2/2014 | Arne et al. |
| 2014/0052150 A1 | 2/2014 | Taylor et al. |
| 2014/0074179 A1 | 3/2014 | Heldman et al. |
| 2014/0092009 A1 | 4/2014 | Yen et al. |
| 2014/0094675 A1 | 4/2014 | Luna et al. |
| 2014/0098018 A1 | 4/2014 | Kim et al. |
| 2014/0100432 A1 | 4/2014 | Golda et al. |
| 2014/0107493 A1 | 4/2014 | Yuen et al. |
| 2014/0121471 A1 | 5/2014 | Walker |
| 2014/0122958 A1 | 5/2014 | Greenebrg et al. |
| 2014/0132512 A1 | 5/2014 | Gomez Sainz-Garcia |
| 2014/0139422 A1 | 5/2014 | Mistry et al. |
| 2014/0142937 A1 | 5/2014 | Powledge et al. |
| 2014/0143064 A1 | 5/2014 | Tran |
| 2014/0147820 A1 | 5/2014 | Snow et al. |
| 2014/0157168 A1 | 6/2014 | Albouyeh et al. |
| 2014/0194062 A1 | 7/2014 | Palin et al. |
| 2014/0196131 A1 | 7/2014 | Lee |
| 2014/0198034 A1 | 7/2014 | Bailey et al. |
| 2014/0198035 A1 | 7/2014 | Bailey et al. |
| 2014/0198944 A1 | 7/2014 | Forutanpour et al. |
| 2014/0200432 A1 | 7/2014 | Banerji et al. |
| 2014/0201666 A1 | 7/2014 | Bedikian et al. |
| 2014/0202643 A1 | 7/2014 | Hikmet et al. |
| 2014/0204455 A1 | 7/2014 | Popovich et al. |
| 2014/0207017 A1 | 7/2014 | Gilmore et al. |
| 2014/0223462 A1 | 8/2014 | Aimone et al. |
| 2014/0226193 A1 | 8/2014 | Sun |
| 2014/0232651 A1 | 8/2014 | Kress et al. |
| 2014/0236031 A1 | 8/2014 | Banet et al. |
| 2014/0240103 A1 | 8/2014 | Lake et al. |
| 2014/0240223 A1 | 8/2014 | Lake et al. |
| 2014/0245200 A1 | 8/2014 | Holz |
| 2014/0249397 A1 | 9/2014 | Lake et al. |
| 2014/0257141 A1 | 9/2014 | Giuffrida et al. |
| 2014/0258864 A1 | 9/2014 | Shenoy et al. |
| 2014/0277622 A1 | 9/2014 | Raniere |
| 2014/0278139 A1 | 9/2014 | Hong et al. |
| 2014/0278441 A1 | 9/2014 | Ton et al. |
| 2014/0279860 A1 | 9/2014 | Pan et al. |
| 2014/0282282 A1 | 9/2014 | Holz |
| 2014/0285326 A1 | 9/2014 | Luna et al. |
| 2014/0285429 A1 | 9/2014 | Simmons |
| 2014/0297528 A1 | 10/2014 | Agrawal et al. |
| 2014/0299362 A1 | 10/2014 | Park et al. |
| 2014/0304665 A1 | 10/2014 | Holz |
| 2014/0310595 A1 | 10/2014 | Acharya et al. |
| 2014/0330404 A1 | 11/2014 | Abdelghani et al. |
| 2014/0334083 A1 | 11/2014 | Bailey |
| 2014/0334653 A1 | 11/2014 | Luna et al. |
| 2014/0337861 A1 | 11/2014 | Chang et al. |
| 2014/0340857 A1 | 11/2014 | Hsu et al. |
| 2014/0344731 A1 | 11/2014 | Holz |
| 2014/0349257 A1 | 11/2014 | Connor |
| 2014/0354528 A1 | 12/2014 | Laughlin et al. |
| 2014/0354529 A1 | 12/2014 | Laughlin et al. |
| 2014/0355825 A1 | 12/2014 | Kim et al. |
| 2014/0358024 A1 | 12/2014 | Nelson et al. |
| 2014/0358825 A1 | 12/2014 | Phillipps et al. |
| 2014/0359540 A1 | 12/2014 | Kelsey et al. |
| 2014/0361988 A1 | 12/2014 | Katz et al. |
| 2014/0364703 A1 | 12/2014 | Kim et al. |
| 2014/0365163 A1 | 12/2014 | Jallon |

(56) References Cited

U.S. PATENT DOCUMENTS

| | | |
|---|---|---|
| 2014/0368424 A1 | 12/2014 | Choi et al. |
| 2014/0368428 A1 | 12/2014 | Pinault |
| 2014/0368474 A1 | 12/2014 | Kim et al. |
| 2014/0368896 A1 | 12/2014 | Nakazono et al. |
| 2014/0375465 A1 | 12/2014 | Fenuccio et al. |
| 2014/0376773 A1 | 12/2014 | Holz |
| 2015/0006120 A1 | 1/2015 | Sett et al. |
| 2015/0010203 A1 | 1/2015 | Muninder et al. |
| 2015/0011857 A1 | 1/2015 | Henson et al. |
| 2015/0019135 A1 | 1/2015 | Kacyvenski et al. |
| 2015/0025355 A1 | 1/2015 | Bailey et al. |
| 2015/0029092 A1 | 1/2015 | Holz et al. |
| 2015/0035827 A1 | 2/2015 | Yamaoka et al. |
| 2015/0036221 A1 | 2/2015 | Stephenson |
| 2015/0045689 A1 | 2/2015 | Barone |
| 2015/0045699 A1 | 2/2015 | Mokaya et al. |
| 2015/0051470 A1 | 2/2015 | Bailey et al. |
| 2015/0057506 A1 | 2/2015 | Luna et al. |
| 2015/0057770 A1 | 2/2015 | Bailey et al. |
| 2015/0065840 A1 | 3/2015 | Bailey |
| 2015/0070270 A1 | 3/2015 | Bailey et al. |
| 2015/0070274 A1 | 3/2015 | Morozov |
| 2015/0072326 A1 | 3/2015 | Mauri et al. |
| 2015/0084860 A1 | 3/2015 | Aleem et al. |
| 2015/0091790 A1 | 4/2015 | Forutanpour et al. |
| 2015/0094564 A1 | 4/2015 | Tashman et al. |
| 2015/0099946 A1 | 4/2015 | Sahin |
| 2015/0106052 A1 | 4/2015 | Balakrishnan et al. |
| 2015/0109202 A1 | 4/2015 | Ataee et al. |
| 2015/0124566 A1 | 5/2015 | Lake et al. |
| 2015/0128094 A1 | 5/2015 | Baldwin et al. |
| 2015/0141784 A1 | 5/2015 | Morun et al. |
| 2015/0148641 A1 | 5/2015 | Morun et al. |
| 2015/0148728 A1 | 5/2015 | Sallum et al. |
| 2015/0157944 A1 | 6/2015 | Gottlieb |
| 2015/0160621 A1 | 6/2015 | Yilmaz |
| 2015/0169074 A1 | 6/2015 | Ataee et al. |
| 2015/0170421 A1 | 6/2015 | Mandella et al. |
| 2015/0177841 A1 | 6/2015 | Vanblon et al. |
| 2015/0182113 A1 | 7/2015 | Utter, II |
| 2015/0182130 A1 | 7/2015 | Utter, II |
| 2015/0182160 A1 | 7/2015 | Kim et al. |
| 2015/0182163 A1 | 7/2015 | Utter |
| 2015/0182164 A1 | 7/2015 | Utter, II |
| 2015/0182165 A1 | 7/2015 | Miller et al. |
| 2015/0185838 A1 | 7/2015 | Camacho-Perez et al. |
| 2015/0185853 A1 | 7/2015 | Clausen et al. |
| 2015/0186609 A1 | 7/2015 | Utter, II |
| 2015/0187355 A1 | 7/2015 | Parkinson et al. |
| 2015/0193949 A1 | 7/2015 | Katz et al. |
| 2015/0199025 A1 | 7/2015 | Holz |
| 2015/0205126 A1 | 7/2015 | Schowengerdt |
| 2015/0205134 A1 | 7/2015 | Bailey et al. |
| 2015/0213191 A1 | 7/2015 | Abdelghani et al. |
| 2015/0216475 A1 | 8/2015 | Luna et al. |
| 2015/0220152 A1 | 8/2015 | Tait et al. |
| 2015/0223716 A1 | 8/2015 | Korkala et al. |
| 2015/0230756 A1 | 8/2015 | Luna et al. |
| 2015/0234426 A1 | 8/2015 | Bailey et al. |
| 2015/0234477 A1 | 8/2015 | Abovitz et al. |
| 2015/0237716 A1 | 8/2015 | Su et al. |
| 2015/0242009 A1 | 8/2015 | Xiao et al. |
| 2015/0242120 A1 | 8/2015 | Rodriguez |
| 2015/0242575 A1 | 8/2015 | Abovitz et al. |
| 2015/0261306 A1 | 9/2015 | Lake |
| 2015/0261318 A1 | 9/2015 | Scavezze et al. |
| 2015/0272483 A1 | 10/2015 | Etemad et al. |
| 2015/0277575 A1 | 10/2015 | Ataee et al. |
| 2015/0288944 A1 | 10/2015 | Nistico et al. |
| 2015/0289995 A1 | 10/2015 | Wilkinson et al. |
| 2015/0293592 A1 | 10/2015 | Cheong et al. |
| 2015/0296553 A1 | 10/2015 | DiFranco et al. |
| 2015/0302168 A1 | 10/2015 | De Sapio et al. |
| 2015/0305672 A1 | 10/2015 | Grey et al. |
| 2015/0309563 A1 | 10/2015 | Connor |
| 2015/0309582 A1 | 10/2015 | Gupta |
| 2015/0310766 A1 | 10/2015 | Alshehri et al. |
| 2015/0312175 A1 | 10/2015 | Langholz |
| 2015/0313496 A1 | 11/2015 | Connor |
| 2015/0323998 A1 | 11/2015 | Kudekar et al. |
| 2015/0325202 A1 | 11/2015 | Lake et al. |
| 2015/0332013 A1 | 11/2015 | Lee et al. |
| 2015/0346701 A1 | 12/2015 | Gordon et al. |
| 2015/0351690 A1 | 12/2015 | Toth et al. |
| 2015/0355716 A1 | 12/2015 | Balasubramanian et al. |
| 2015/0355718 A1 | 12/2015 | Slonneger |
| 2015/0362734 A1 | 12/2015 | Moser et al. |
| 2015/0366504 A1 | 12/2015 | Connor |
| 2015/0370326 A1 | 12/2015 | Chapeskie et al. |
| 2015/0370333 A1 | 12/2015 | Ataee et al. |
| 2015/0378161 A1 | 12/2015 | Bailey et al. |
| 2015/0378162 A1 | 12/2015 | Bailey et al. |
| 2015/0378164 A1 | 12/2015 | Bailey et al. |
| 2015/0379770 A1 | 12/2015 | Haley, Jr. et al. |
| 2016/0011668 A1 | 1/2016 | Gilad-Bachrach et al. |
| 2016/0020500 A1 | 1/2016 | Matsuda |
| 2016/0026853 A1 | 1/2016 | Wexler et al. |
| 2016/0033771 A1 | 2/2016 | Tremblay et al. |
| 2016/0049073 A1 | 2/2016 | Lee |
| 2016/0050037 A1 | 2/2016 | Webb |
| 2016/0071319 A1 | 3/2016 | Fallon et al. |
| 2016/0080897 A1* | 3/2016 | Moore ................... G06V 20/10 |
| | | 340/539.13 |
| 2016/0092504 A1 | 3/2016 | Mitri et al. |
| 2016/0093106 A1 | 3/2016 | Black |
| 2016/0099010 A1 | 4/2016 | Sainath et al. |
| 2016/0107309 A1 | 4/2016 | Walsh et al. |
| 2016/0113587 A1 | 4/2016 | Kothe et al. |
| 2016/0144172 A1 | 5/2016 | Hsueh et al. |
| 2016/0150636 A1 | 5/2016 | Otsubo |
| 2016/0156762 A1 | 6/2016 | Bailey et al. |
| 2016/0162604 A1 | 6/2016 | Xiaoli et al. |
| 2016/0170710 A1 | 6/2016 | Kim et al. |
| 2016/0187992 A1 | 6/2016 | Yamamoto et al. |
| 2016/0195928 A1 | 7/2016 | Wagner et al. |
| 2016/0199699 A1 | 7/2016 | Klassen |
| 2016/0202081 A1 | 7/2016 | Debieuvre et al. |
| 2016/0206206 A1 | 7/2016 | Avila et al. |
| 2016/0207201 A1 | 7/2016 | Herr et al. |
| 2016/0217614 A1 | 7/2016 | Kraver et al. |
| 2016/0235323 A1 | 8/2016 | Tadi et al. |
| 2016/0238845 A1 | 8/2016 | Alexander et al. |
| 2016/0239080 A1 | 8/2016 | Marcolina et al. |
| 2016/0242646 A1 | 8/2016 | Obma |
| 2016/0259407 A1 | 9/2016 | Schick |
| 2016/0262687 A1 | 9/2016 | Vaidyanathan et al. |
| 2016/0263458 A1 | 9/2016 | Mather et al. |
| 2016/0274365 A1 | 9/2016 | Bailey et al. |
| 2016/0274732 A1 | 9/2016 | Bang et al. |
| 2016/0274758 A1 | 9/2016 | Bailey |
| 2016/0282947 A1 | 9/2016 | Schwarz et al. |
| 2016/0291768 A1 | 10/2016 | Cho et al. |
| 2016/0292497 A1 | 10/2016 | Kehtarnavaz et al. |
| 2016/0309249 A1 | 10/2016 | Wu et al. |
| 2016/0313798 A1 | 10/2016 | Connor |
| 2016/0313801 A1 | 10/2016 | Wagner et al. |
| 2016/0313890 A1 | 10/2016 | Walline et al. |
| 2016/0313899 A1 | 10/2016 | Noel |
| 2016/0314623 A1 | 10/2016 | Coleman et al. |
| 2016/0327796 A1 | 11/2016 | Bailey et al. |
| 2016/0327797 A1 | 11/2016 | Bailey et al. |
| 2016/0342227 A1 | 11/2016 | Natzke et al. |
| 2016/0349514 A1 | 12/2016 | Alexander et al. |
| 2016/0349515 A1 | 12/2016 | Alexander et al. |
| 2016/0349516 A1 | 12/2016 | Alexander et al. |
| 2016/0350973 A1 | 12/2016 | Shapira et al. |
| 2016/0377865 A1 | 12/2016 | Alexander et al. |
| 2016/0377866 A1 | 12/2016 | Alexander et al. |
| 2017/0025026 A1 | 1/2017 | Ortiz Catalan |
| 2017/0031502 A1 | 2/2017 | Rosenberg et al. |
| 2017/0035313 A1 | 2/2017 | Hong et al. |
| 2017/0061817 A1 | 3/2017 | Mettler May |
| 2017/0068095 A1 | 3/2017 | Holland et al. |
| 2017/0068445 A1 | 3/2017 | Lee et al. |

(56) References Cited

U.S. PATENT DOCUMENTS

| | | |
|---|---|---|
| 2017/0075426 A1 | 3/2017 | Camacho Perez et al. |
| 2017/0079828 A1 | 3/2017 | Pedtke et al. |
| 2017/0080346 A1 | 3/2017 | Abbas |
| 2017/0090604 A1 | 3/2017 | Barbier |
| 2017/0091567 A1 | 3/2017 | Wang et al. |
| 2017/0095178 A1 | 4/2017 | Schoen et al. |
| 2017/0097753 A1 | 4/2017 | Bailey et al. |
| 2017/0115483 A1 | 4/2017 | Aleem et al. |
| 2017/0119472 A1 | 5/2017 | Herrmann et al. |
| 2017/0123487 A1 | 5/2017 | Hazra et al. |
| 2017/0124474 A1 | 5/2017 | Kashyap |
| 2017/0124816 A1 | 5/2017 | Yang et al. |
| 2017/0127354 A1 | 5/2017 | Garland et al. |
| 2017/0147077 A1 | 5/2017 | Park et al. |
| 2017/0153701 A1 | 6/2017 | Mahon et al. |
| 2017/0161635 A1 | 6/2017 | Oono et al. |
| 2017/0188878 A1 | 7/2017 | Lee |
| 2017/0188980 A1 | 7/2017 | Ash |
| 2017/0197142 A1 | 7/2017 | Stafford et al. |
| 2017/0205876 A1 | 7/2017 | Vidal et al. |
| 2017/0209055 A1 | 7/2017 | Pantelopoulos et al. |
| 2017/0212290 A1 | 7/2017 | Alexander et al. |
| 2017/0212349 A1 | 7/2017 | Bailey et al. |
| 2017/0219829 A1 | 8/2017 | Bailey |
| 2017/0220923 A1 | 8/2017 | Bae et al. |
| 2017/0237789 A1 | 8/2017 | Harner et al. |
| 2017/0237901 A1 | 8/2017 | Lee et al. |
| 2017/0259167 A1 | 9/2017 | Cook et al. |
| 2017/0262064 A1 | 9/2017 | Ofir et al. |
| 2017/0277282 A1 | 9/2017 | Go |
| 2017/0285744 A1 | 10/2017 | Juliato |
| 2017/0285756 A1 | 10/2017 | Wang et al. |
| 2017/0285757 A1 | 10/2017 | Robertson et al. |
| 2017/0285848 A1 | 10/2017 | Rosenberg et al. |
| 2017/0296363 A1 | 10/2017 | Yetkin et al. |
| 2017/0299956 A1 | 10/2017 | Holland et al. |
| 2017/0301630 A1 | 10/2017 | Nguyen et al. |
| 2017/0308118 A1 | 10/2017 | Ito |
| 2017/0312614 A1 | 11/2017 | Tran et al. |
| 2017/0329392 A1 | 11/2017 | Keskin et al. |
| 2017/0329404 A1 | 11/2017 | Keskin et al. |
| 2017/0340506 A1 | 11/2017 | Zhang et al. |
| 2017/0344706 A1 | 11/2017 | Torres et al. |
| 2017/0347908 A1 | 12/2017 | Watanabe et al. |
| 2017/0371403 A1 | 12/2017 | Wetzler et al. |
| 2018/0000367 A1 | 1/2018 | Longinotti-Buitoni |
| 2018/0018825 A1 | 1/2018 | Kim et al. |
| 2018/0020285 A1 | 1/2018 | Zass |
| 2018/0020951 A1 | 1/2018 | Kaifosh et al. |
| 2018/0020978 A1 | 1/2018 | Kaifosh et al. |
| 2018/0020990 A1 | 1/2018 | Park et al. |
| 2018/0024634 A1 | 1/2018 | Kaifosh et al. |
| 2018/0024635 A1 | 1/2018 | Kaifosh et al. |
| 2018/0024641 A1 | 1/2018 | Mao et al. |
| 2018/0064363 A1 | 3/2018 | Morun et al. |
| 2018/0067553 A1 | 3/2018 | Morun et al. |
| 2018/0068489 A1 | 3/2018 | Kim et al. |
| 2018/0074332 A1 | 3/2018 | Li et al. |
| 2018/0081439 A1 | 3/2018 | Daniels |
| 2018/0088675 A1 | 3/2018 | Vogel et al. |
| 2018/0088765 A1 | 3/2018 | Bailey |
| 2018/0092599 A1 | 4/2018 | Kerth et al. |
| 2018/0093181 A1 | 4/2018 | Goslin et al. |
| 2018/0095542 A1 | 4/2018 | Mallinson |
| 2018/0095630 A1 | 4/2018 | Bailey |
| 2018/0101235 A1 | 4/2018 | Bodensteiner et al. |
| 2018/0101289 A1 | 4/2018 | Bailey |
| 2018/0101599 A1 | 4/2018 | Arnold et al. |
| 2018/0107275 A1 | 4/2018 | Chen et al. |
| 2018/0120948 A1 | 5/2018 | Aleem et al. |
| 2018/0133551 A1 | 5/2018 | Chang et al. |
| 2018/0140441 A1 | 5/2018 | Poirters |
| 2018/0150033 A1 | 5/2018 | Lake et al. |
| 2018/0153430 A1 | 6/2018 | Ang et al. |
| 2018/0153444 A1 | 6/2018 | Yang et al. |
| 2018/0154140 A1 | 6/2018 | Bouton et al. |
| 2018/0168905 A1 | 6/2018 | Goodall et al. |
| 2018/0178008 A1 | 6/2018 | Bouton et al. |
| 2018/0217249 A1 | 8/2018 | La Salla et al. |
| 2018/0239430 A1 | 8/2018 | Tadi et al. |
| 2018/0240459 A1 | 8/2018 | Weng et al. |
| 2018/0247443 A1 | 8/2018 | Briggs et al. |
| 2018/0279919 A1 | 10/2018 | Bansbach et al. |
| 2018/0301057 A1 | 10/2018 | Hargrove et al. |
| 2018/0307303 A1 | 10/2018 | Powderly et al. |
| 2018/0307314 A1 | 10/2018 | Connor |
| 2018/0314879 A1 | 11/2018 | Khwaja et al. |
| 2018/0321745 A1 | 11/2018 | Morun et al. |
| 2018/0321746 A1 | 11/2018 | Morun et al. |
| 2018/0330549 A1 | 11/2018 | Brenton |
| 2018/0333575 A1 | 11/2018 | Bouton |
| 2018/0344195 A1 | 12/2018 | Morun et al. |
| 2018/0356890 A1 | 12/2018 | Zhang et al. |
| 2018/0360379 A1 | 12/2018 | Harrison et al. |
| 2019/0008453 A1 | 1/2019 | Spoof |
| 2019/0025919 A1 | 1/2019 | Tadi et al. |
| 2019/0027141 A1 | 1/2019 | Strong et al. |
| 2019/0033967 A1 | 1/2019 | Morun et al. |
| 2019/0033974 A1 | 1/2019 | Mu et al. |
| 2019/0038166 A1 | 2/2019 | Tavabi et al. |
| 2019/0056422 A1 | 2/2019 | Park et al. |
| 2019/0076716 A1 | 3/2019 | Chiou et al. |
| 2019/0089898 A1* | 3/2019 | Kim ..................... G06V 10/82 |
| 2019/0113973 A1 | 4/2019 | Coleman et al. |
| 2019/0121305 A1 | 4/2019 | Kaifosh et al. |
| 2019/0121306 A1 | 4/2019 | Kaifosh et al. |
| 2019/0121522 A1* | 4/2019 | Davis ..................... G06V 40/28 |
| 2019/0146809 A1 | 5/2019 | Lee et al. |
| 2019/0150777 A1 | 5/2019 | Guo et al. |
| 2019/0192037 A1 | 6/2019 | Morun et al. |
| 2019/0196585 A1 | 6/2019 | Laszlo et al. |
| 2019/0196586 A1 | 6/2019 | Laszlo et al. |
| 2019/0197778 A1 | 6/2019 | Sachdeva et al. |
| 2019/0209034 A1 | 7/2019 | Deno et al. |
| 2019/0212817 A1 | 7/2019 | Kaifosh et al. |
| 2019/0216619 A1 | 7/2019 | McDonnall et al. |
| 2019/0223748 A1 | 7/2019 | Al-Natsheh et al. |
| 2019/0227627 A1 | 7/2019 | Kaifosh et al. |
| 2019/0228330 A1 | 7/2019 | Kaifosh et al. |
| 2019/0228533 A1 | 7/2019 | Giurgica-Tiron et al. |
| 2019/0228579 A1 | 7/2019 | Kaifosh et al. |
| 2019/0228590 A1 | 7/2019 | Kaifosh et al. |
| 2019/0228591 A1 | 7/2019 | Giurgica-Tiron et al. |
| 2019/0247650 A1 | 8/2019 | Tran |
| 2019/0279407 A1 | 9/2019 | McHugh et al. |
| 2019/0294243 A1 | 9/2019 | Laszlo et al. |
| 2019/0324549 A1 | 10/2019 | Araki et al. |
| 2019/0332140 A1 | 10/2019 | Wang et al. |
| 2019/0348026 A1 | 11/2019 | Berenzweig et al. |
| 2019/0348027 A1 | 11/2019 | Berenzweig et al. |
| 2019/0357787 A1 | 11/2019 | Barachant et al. |
| 2019/0362557 A1 | 11/2019 | Lacey et al. |
| 2020/0042089 A1 | 2/2020 | Ang et al. |
| 2020/0057661 A1 | 2/2020 | Bendfeldt |
| 2020/0065569 A1 | 2/2020 | Nduka et al. |
| 2020/0069210 A1 | 3/2020 | Berenzweig et al. |
| 2020/0069211 A1 | 3/2020 | Berenzweig et al. |
| 2020/0073483 A1 | 3/2020 | Berenzweig et al. |
| 2020/0077955 A1 | 3/2020 | Shui et al. |
| 2020/0097081 A1 | 3/2020 | Stone et al. |
| 2020/0097083 A1 | 3/2020 | Mao et al. |
| 2020/0111260 A1 | 4/2020 | Osborn et al. |
| 2020/0125171 A1 | 4/2020 | Morun et al. |
| 2020/0142490 A1 | 5/2020 | Xiong et al. |
| 2020/0143795 A1 | 5/2020 | Park et al. |
| 2020/0159322 A1 | 5/2020 | Morun et al. |
| 2020/0163562 A1 | 5/2020 | Neaves |
| 2020/0205932 A1 | 7/2020 | Zar et al. |
| 2020/0225320 A1 | 7/2020 | Belskikh et al. |
| 2020/0245873 A1 | 8/2020 | Frank et al. |
| 2020/0249752 A1 | 8/2020 | Parshionikar |
| 2020/0275895 A1 | 9/2020 | Barachant |
| 2020/0301509 A1 | 9/2020 | Liu et al. |
| 2020/0305795 A1 | 10/2020 | Floyd et al. |

(56)                 References Cited

U.S. PATENT DOCUMENTS

| | | | |
|---|---|---|---|
| 2020/0310540 A1 | 10/2020 | Hussami et al. | |
| 2020/0320335 A1 | 10/2020 | Shamun et al. | |
| 2021/0109598 A1 | 4/2021 | Zhang et al. | |
| 2021/0117523 A1 | 4/2021 | Kim et al. | |
| 2021/0290159 A1 | 9/2021 | Bruinsma et al. | |
| 2021/0311546 A1 | 10/2021 | Kodama et al. | |
| 2022/0256706 A1 | 8/2022 | Xiong et al. | |
| 2025/0095302 A1 | 3/2025 | Wetmore | |

FOREIGN PATENT DOCUMENTS

| | | | |
|---|---|---|---|
| CA | 2939644 A1 | 8/2015 |
| CN | 1838933 A | 9/2006 |
| CN | 101310242 A | 11/2008 |
| CN | 102129343 A | 7/2011 |
| CN | 102246125 A | 11/2011 |
| CN | 102349037 A | 2/2012 |
| CN | 102566756 A | 7/2012 |
| CN | 103501694 A | 1/2014 |
| CN | 103720470 A | 4/2014 |
| CN | 103764021 A | 4/2014 |
| CN | 103777752 A | 5/2014 |
| CN | 103858073 A | 6/2014 |
| CN | 103886215 A | 6/2014 |
| CN | 104107134 A | 10/2014 |
| CN | 104205015 A | 12/2014 |
| CN | 104951069 A | 9/2015 |
| CN | 105009031 A | 10/2015 |
| CN | 105190477 A | 12/2015 |
| CN | 105190578 A | 12/2015 |
| CN | 105511615 A | 4/2016 |
| CN | 106061369 A | 10/2016 |
| CN | 106067178 A | 11/2016 |
| CN | 106102504 A | 11/2016 |
| CN | 106108898 A | 11/2016 |
| CN | 107203272 A | 9/2017 |
| CN | 107209566 A | 9/2017 |
| CN | 107589782 A | 1/2018 |
| CN | 107864440 A | 3/2018 |
| CN | 107928980 A | 4/2018 |
| CN | 108431736 A | 8/2018 |
| CN | 108463271 A | 8/2018 |
| CN | 108665956 A | 10/2018 |
| CN | 109243572 A | 1/2019 |
| CN | 109620651 A | 4/2019 |
| CN | 110300542 A | 10/2019 |
| CN | 111616847 A | 9/2020 |
| CN | 112074225 A | 12/2020 |
| CN | 112469469 A | 3/2021 |
| CN | 112789577 A | 5/2021 |
| CN | 112822992 A | 5/2021 |
| CN | 113632176 A | 11/2021 |
| CN | ZL2019800218996 | 8/2023 |
| DE | 4412278 A1 | 10/1995 |
| EP | 0301790 A2 | 2/1989 |
| EP | 1345210 A2 | 9/2003 |
| EP | 1408443 B1 | 10/2006 |
| EP | 2198521 B1 | 6/2012 |
| EP | 2541763 A1 | 1/2013 |
| EP | 2733578 A2 | 5/2014 |
| EP | 2959394 A1 | 12/2015 |
| EP | 3104737 A1 | 12/2016 |
| EP | 3200051 A1 | 8/2017 |
| EP | 3487395 A1 | 5/2019 |
| EP | 3697297 A4 | 12/2020 |
| EP | 2959394 B1 | 5/2021 |
| EP | 3948881 A1 | 2/2022 |
| JP | S61198892 A | 9/1986 |
| JP | H05277080 A | 10/1993 |
| JP | H0639754 A | 2/1994 |
| JP | H07248873 A | 9/1995 |
| JP | 3103427 B2 | 10/2000 |
| JP | 2001051726 A | 2/2001 |
| JP | 2001054507 A | 2/2001 |
| JP | 2002287869 A | 10/2002 |
| JP | 2003303047 A | 10/2003 |
| JP | 2005095561 A | 4/2005 |
| JP | 2005352739 A | 12/2005 |
| JP | 2008192004 A | 8/2008 |
| JP | 2009050679 A | 3/2009 |
| JP | 2010520561 A | 6/2010 |
| JP | 2013160905 A | 8/2013 |
| JP | 2015512550 A | 4/2015 |
| JP | 2015514467 A | 5/2015 |
| JP | 2016507098 A | 3/2016 |
| JP | 2016507851 A | 3/2016 |
| JP | 2016150118 A | 8/2016 |
| JP | 2016540276 A | 12/2016 |
| JP | 2017509386 A | 4/2017 |
| JP | 2018511122 A | 4/2018 |
| JP | 2018190127 A | 11/2018 |
| JP | 2019023941 A | 2/2019 |
| JP | 2019185531 A | 10/2019 |
| JP | 2021072136 A | 5/2021 |
| KR | 20110040165 A | 4/2011 |
| KR | 20120094870 A | 8/2012 |
| KR | 20120097997 A | 9/2012 |
| KR | 20150123254 A | 11/2015 |
| KR | 20160121552 A | 10/2016 |
| KR | 20170067873 A | 6/2017 |
| KR | 20170107283 A | 9/2017 |
| KR | 101790147 B1 | 10/2017 |
| KR | 20190022329 A | 3/2019 |
| WO | WO-9527341 A1 | 10/1995 |
| WO | WO-2006086504 A2 | 8/2006 |
| WO | WO-2008109248 A2 | 9/2008 |
| WO | WO-2009042313 A1 | 4/2009 |
| WO | WO-2010095636 A1 | 8/2010 |
| WO | WO-2010104879 A2 | 9/2010 |
| WO | WO-2011011750 A1 | 1/2011 |
| WO | WO-2011070554 A2 | 6/2011 |
| WO | WO-2012155157 A1 | 11/2012 |
| WO | WO-2013154864 A1 | 10/2013 |
| WO | WO-2014130871 A1 | 8/2014 |
| WO | WO-2014155288 A2 | 10/2014 |
| WO | WO-2014186370 A1 | 11/2014 |
| WO | WO-2014194257 A1 | 12/2014 |
| WO | WO-2014197443 A1 | 12/2014 |
| WO | WO-2015027089 A1 | 2/2015 |
| WO | WO-2015063520 A1 | 5/2015 |
| WO | WO-2015073713 A1 | 5/2015 |
| WO | WO-2015081113 A1 | 6/2015 |
| WO | WO-2015100172 A1 | 7/2015 |
| WO | WO-2015123445 A1 | 8/2015 |
| WO | WO-2015123775 A1 | 8/2015 |
| WO | WO-2015184760 A1 | 12/2015 |
| WO | WO-2015192117 A1 | 12/2015 |
| WO | WO-2015199747 A1 | 12/2015 |
| WO | WO-2016041088 A1 | 3/2016 |
| WO | WO-2017062544 A1 | 4/2017 |
| WO | WO-2017075611 A1 | 5/2017 |
| WO | WO-2017092225 A1 | 6/2017 |
| WO | WO-2017120669 A1 | 7/2017 |
| WO | WO-2017172185 A1 | 10/2017 |
| WO | WO-2017208167 A1 | 12/2017 |
| WO | WO-2018022602 A1 | 2/2018 |
| WO | WO-2018098046 A2 | 5/2018 |
| WO | WO-2018175257 A1 | 9/2018 |
| WO | WO-2019099758 A1 | 5/2019 |
| WO | WO-2019147953 A1 | 8/2019 |
| WO | WO-2019147958 A1 | 8/2019 |
| WO | WO-2019147996 A1 | 8/2019 |
| WO | WO-2019217419 A2 | 11/2019 |
| WO | WO-2019226259 A1 | 11/2019 |
| WO | WO-2019231911 A1 | 12/2019 |
| WO | WO-2020047429 A1 | 3/2020 |
| WO | WO-2020061440 A1 | 3/2020 |

(56) References Cited

FOREIGN PATENT DOCUMENTS

WO     WO-2020061451 A1     3/2020
WO     WO-2020072915 A1     4/2020

OTHER PUBLICATIONS

Office Action mailed Feb. 4, 2025 for European Patent Application No. 20824840.1, filed on Nov. 19, 2020, 7 pages.

Al-Jumaily A., et al., "Electromyogram(EMG) Driven System based Virtual Reality for Prosthetic and Rehabilitation Devices," Proceedings of the 11th Internationalconference on Information Integration Andweb-Based Applications & Services, Jan. 1, 2009, pp. 582-586.

Al-Mashhadany Y.I., "Inverse Kinematics Problem (IKP) of 6-DOF Manipulator By Locally Recurrent Neural Networks (LRNNs)," Management and Service Science (MASS), International Conference on Management and Service Science., IEEE, Aug. 24, 2010, 5 pages.

Al-Timemy A.H., et al., "Improving the Performance Against Force Variation of EMG Controlled Multifunctional Upper-Limb Prostheses for Transradial Amputees," IEEE Transactions on Neural Systems and Rehabilitation Engineering, Jun. 2016, vol. 24 (6), 12 Pages.

Amitai Y., "P-27: A Two-Dimensional Aperture Expander for Ultra-Compact, High-Performance Head-Worn Displays," SID Symposium Digest of Technical Papers, 2005, vol. 36 (1), pp. 360-363.

Arkenbout E.A., et al., "Robust Hand Motion Tracking through Data Fusion of 5DT Data Glove and Nimble VR Kinect Camera Measurements," Sensors, 2015, vol. 15, pp. 31644-31671.

Ayras P., et al., "Exit Pupil Expander With a Large Field of View Based on Diffractive Optics," Journal of the SID, 2009, vol. 17 (8), pp. 659-664.

Bailey ct al., Wearable Muscle Interface Systems, Devices and Methods That Interact With Content Displayed on an Electronic Display, Office Action mailed Mar. 31, 2015, for U.S. Appl. No. 14/155,107, 17 pages.

Bailey et al., "Muscle Interface Device and Method for Interacting With Content Displayed on Wearable Head Mounted Displays," Amendment filed Aug. 25, 2015, for U.S. Appl. No. 14/155,087, 10 pages.

Bailey et al., "Muscle Interface Device and Method for Interacting With Content Displayed on Wearable Head Mounted Displays," Amendment filed Aug. 9, 2016, for U.S. Appl. No. 14/155,087, 8 pages.

Bailey et al., "Muscle Interface Device and Method for Interacting With Content Displayed on Wearable Head Mounted Displays," Amendment filed May 17, 2016, for U.S. Appl. No. 14/155,087, 13 pages.

Bailey et al., "Muscle Interface Device and Method for Interacting With Content Displayed on Wearable Head Mounted Displays," Office Action dated Feb. 17, 2016, for U.S. Appl. No. 14/155,087, 16 pages.

Bailey et al., "Muscle Interface Device and Method for Interacting With Content Displayed on Wearable Head Mounted Displays," Office Action dated Jul. 20, 2015, for U.S. Appl. No. 14/155,087, 14 pages.

Balley et al., "Muscle Interface Device and Method for Interacting With Content Displayed on Wearable Head Mounted Displays," Office Action dated Jul. 8, 2016, for U.S. Appl. No. 14/155,087, 16 pages.

Bailey et al., "Muscle Interface Device and Method for Interacting With Content Displayed on Wearable Head Mounted Displays," Office Action dated Mar. 31, 2015, for U.S. Appl. No. 14/155,087, 15 pages.

Bailey et al., "Muscle Interface Device and Method for Interacting With Content Displayed on Wearable Head Mounted Displays," Preliminary Amendment filed Jan. 28, 2014, for U.S. Appl. No. 14/155,087, 8 pages.

Bailey et al., "Wearable Muscle Interface Systems, Devices and Methods That Interact With. Content Displayed on an Electronic Display," Amendment filed Aug. 9, 2016, for U.S. Appl. No. 14/155,107, 8 pages.

Balley et al., "Wearable Muscle Interface Systems, Devices and Methods That Interact With Content Displayed on an Electronic Display," Amendment filed May 11, 2016, for U.S. Appl. No. 14/155,107, 15 pages.

Bailey et al., Wearable Muscle Interface Systems, Devices and Methods That Interact With Content Displayed on an Electronic Display/ Office Action mailed Feb. 11, 2016, for U.S. Appl. No. 14/155,107, 20 pages.

Bailey et al., Wearable Muscle Interface Systems, Devices and Methods That Interact With Content Displayed on an Electronic Display, Office Action mailed Jul. 16, 2015, for U.S. Appl. No. 14/155,107, 20 pages.

Bailey et al., Wearable Muscle Interface Systems. Devices and Methods That Interact With Content Displayed on an Electronic Display/ Office Action mailed Jul. 8, 2016, for 14/155,107, 21 pages.

Bailey., et al., "Wearable Muscle Interface Systems, Devices And Methods That Interact With Content Displayed on An Electronic Display," Office Action mailed Mar. 31, 2015, for U.S. Appl. No. 14/155,107, 17 pages.

Benko H., et al., "Enhancing Input On and Above the Interactive Surface with Muscle Sensing," The ACM International Conference on Interactive Tabletops and Surfaces (ITS), Nov. 23-25, 2009, pp. 93-100.

Berenzweig A., et al., "Wearable Devices and Methods for Improved Speech Recognition," U.S. Appl. No. 16/785,680, filed Feb. 10, 2020, 67 pages.

Boyali A., et al., "Spectral Collaborative Representation based Classification for Hand Gestures Recognition on Electromyography Signals," Biomedical Signal Processing and Control, 2016, vol. 24, pp. 11-18.

Brownlee J., "Finite State Machines (FSM): Finite State Machines as a Control Technique in Artificial Intelligence (AI)," FSM, Jun. 2002, 12 pages.

Cannan J., et al., "A Wearable Sensor Fusion Armband for Simple Motion Control and Selection for Disabled and Non-Disabled Users," Computer Science and Electronic Engineering Conference, IEEE, Sep. 12, 2012, pp. 216-219, XP032276745.

Chellappan K.V., et al., "Laser-Based Displays: A Review," Applied Optics, Sep. 1, 2010, vol. 49 (25), pp. F79-F98.

Cheng J., et al., "A Novel Phonology- and Radical-Coded Chinese Sign Language Recognition Framework Using Accelerometer and Surface Electromyography Sensors," Sensors, 2015, vol. 15, pp. 23303-23324.

Communication Pursuant to Article 94(3) for European Patent Application No. 17835112.8, dated Dec. 14, 2020, 6 Pages.

Communication Pursuant to Rule 164(1) EPC, Partial Supplementary European Search Report for European Application No. 14753949. 8, mailed Sep. 30, 2016, 7 pages.

Co-pending U.S. Appl. No. 15/659,072, inventors Patrick; Kaifosh et al., filed Jul. 25, 2017.

Co-pending U.S. Appl. No. 15/816,435, inventors Ning; Guo et al., filed Nov. 17, 2017.

Co-pending U.S. Appl. No. 15/882,858, inventors Stephen; Lake et al., filed Jan. 29, 2018.

Co-pending U.S. Appl. No. 15/974,430, inventors Adam; Berenzweig et al., filed May 8, 2018.

Co-pending U.S. Appl. No. 16/353,998, inventors Patrick; Kaifosh et al., filed Mar. 14, 2019.

Co-pending U.S. Appl. No. 16/557,383, inventors Adam; Berenzweig et al., filed Aug. 30, 2019.

Co-pending U.S. Appl. No. 16/557,427, inventors Adam; Berenzweig et al., filed Aug. 30, 2019.

Co-Pending U.S. Appl. No. 15/974,430, filed May 8, 2018, 44 Pages.

Co-Pending U.S. Appl. No. 16/353,998, filed Mar. 14, 2019, 43 pages.

Co-Pending U.S. Appl. No. 16/557,383, filed Aug. 30, 2019, 94 Pages.

(56) References Cited

OTHER PUBLICATIONS

Co-Pending U.S. Appl. No. 16/557,427, filed Aug. 30, 2019, 93 Pages.

Co-Pending U.S. Appl. No. 16/577,207, filed Sep. 20, 2019, 67 Pages.

Co-Pending U.S. Appl. No. 14/505,836, filed Oct. 3, 2014, 59 Pages.

Co-Pending U.S. Appl. No. 15/816,435, filed Nov. 17, 2017, 24 Pages.

Co-Pending U.S. Appl. No. 15/882,858, filed Jan. 29, 2018, 54 Pages.

Co-Pending U.S. Appl. No. 15/974,384, filed May 8, 2018, 44 Pages.

Co-Pending U.S. Appl. No. 15/974,454, filed May 8, 2018, 45 Pages.

Co-Pending U.S. Appl. No. 16/557,342, filed Aug. 30, 2019, 93 Pages.

Co-Pending U.S. Appl. No. 16/430,299, filed Jun. 3, 2019, 42 Pages.

Corazza S., et al.," A Markerless Motion Capture System to Study Musculoskeletal Biomechanics: Visual Hull and Simulated Annealing Approach," Annals of Biomedical Engineering, Jul. 2006, vol. 34 (6), pp. 1019-1029, [Retrieved on Dec. 11, 2019], 11 pages, Retrieved from the Internet: URL: https://www.researchgate.net/publication/6999610_A_Markerless_Motion_Capture_System_to_Study_Musculoskeletal_Biomechanics_Visual_Hull_and_Simulated_Annealing_Approach.

Costanza E., et al., "EMG as a Subtle Input Interface for Mobile Computing," Mobile HCI, LNCS, 3160, 2004, pp. 426-430.

Costanza E., et al., "Toward Subtle Intimate Interfaces for Mobile Devices Using an EMG Controller," CHI, Proceedings of the SIGCHI Conference on Human Factors in Computing Systems, Apr. 2-7, 2005, pp. 481-489.

Cote-Allard U., et al., "Deep Learning for Electromyographic Hand Gesture Signal Classification Using Transfer Learning," IEEE Transactions on Neural Systems and Rehabilitation Engineering, Jan. 26, 2019, vol. 27 (4), 11 Pages.

Csapo A.B., et al., "Evaluation of Human-Myo Gesture Control Capabilities in Continuous Search and Select Operations," 7th IEEE International Conference on Cognitive Infocommunications, Oct. 16-18, 2016, pp. 000415-000420.

Cui L., et al., "Diffraction From Angular Multiplexing Slanted vol. Hologram Gratings," Optik, 2005, vol. 116, pp. 118-122.

Curatu C., et al., "Dual Purpose Lens for an Eye-Tracked Projection Head-Mounted Display," International Optical Design Conference SPIE-OSA, 2006, vol. 6342, pp. 63420X-1-63420X-7.

Curatu C., et al., "Projection-Based Head-Mounted Display With Eye-Tracking Capabilities," Proceedings of SPIE, 2005, vol. 5875, pp. 58750J-1-58750J-9.

Davoodi R., et al., "Development of a Physics-Based Target Shooting Game to Train Amputee Users of Multi joint Upper Limb Prostheses," Presence, Massachusetts Institute of Technology, 2012, vol. 21 (1), pp. 85-95.

Delis A.L., et al., "Development of a Myoelectric Controller Based on Knee Angle Estimation," Biodevices, International Conference on Biomedical Electronics and Devices, Jan. 17, 2009, 7 pages.

Diener L., et al., "Direct Conversion From Facial Myoelectric Signals to Speech Using Deep Neural Networks," International Joint Conference on Neural Networks (IJCNN), Oct. 1, 2015, 7 pages.

Ding I-J., et al., "HMM with Improved Feature Extraction-Based Feature Parameters for Identity Recognition of Gesture Command Operators by Using a Sensed Kinect-Data Stream," Neurocomputing, 2017, vol. 262, pp. 108-119.

Essex D., "Tutorial on Optomechanical Beam Steering Mechanisms," OPTI 521 Tutorial, College of Optical Sciences, University of Arizona, 2006, 8 pages.

European Search Report for European Application No. 19861903.3, dated Oct. 12, 2021, 2 pages.

European Search Report for European Application No. 19863248.1, dated Oct. 19, 2021, 2 pages.

European Search Report for European Application No. 19868789.9, mailed May 9, 2022, 9 pages.

European Search Report for European Application No. 19890394.0, mailed Apr. 29, 2022, 9 pages.

European Search Report for European Patent Application No., 23186202.0. dated Aug. 2, 2023, 7 pages.

Extended European Search Report for European Application No. 18879156.0, mailed Mar. 12, 2021. 11 pages.

Extended European Search Report for European Application No. 19743717.1, mailed Mar. 3, 2021, 12 pages.

Extended European Search Report for European Application No. 19744404.5, mailed Mar. 29, 2021, 11 pages.

Extended European Search Report for European Application No. 19799947.7, mailed May 26, 2021, 10 pages.

Extended European Search Report for European Application No. 17835111.0, mailed Nov. 21, 2019, 6 pages.

Extended European Search Report for European Application No. 17835112.8, mailed Feb. 5, 2020, 17 pages.

Extended European Search Report for European Application No. 17835140.9, mailed Nov. 26, 2019, 10 Pages.

Extended European Search Report for European Application No. 18869441.8, mailed Nov. 17, 2020, 20 Pages.

Extended European Search Report for European Application No. 19806723.3, mailed Jul. 7, 2021. 13 pages.

Extended European Search Report for European Application No. 19810524.9, mailed Mar. 17, 2021, 11 pages.

Extended European Search Report for European Application No. 19850130.6, mailed Sep. 1, 2021, 14 Pages.

Extended European Search Report for European Application No. 19855191.3, dated Dec. 6, 2021, 11 pages.

Extended European Search Report for European Application No. 19883839.3, mailed Dec. 15, 2021, 7 pages.

Farina D., et al., "Man/Machine Interface Based on the Discharge Timings of Spinal Motor Neurons After Targeted Muscle Reinnervation," Nature Biomedical Engineering, Feb. 6, 2017, vol. 1, Article No. 0025, pp. 1-12.

Farina D., et al., "The Extraction of Neural Information from the Surface EMG for the Control of Upper-Limb Prostheses: Emerging Avenues and Challenges," IEEE Transactions on Neural Systems Andrehabilitation Engineering, vol. 22, No. 4, Jul. 1, 2014, pp. 797-809.

Favorskaya M., et al., "Localization and Recognition of Dynamic Hand Gestures Based on Hierarchy of Manifold Classifiers," International Archives of the Photogrammetry, Remote Sensing and Spatial Information Sciences, May 25-27, 2015, vol. XL-5/W6, pp. 1-8.

Fernandez E., et al., "Optimization of a Thick Polyvinyl Alcohol-Acrylamide Photopolymer for Data Storage Using a Combination of Angular and Peristrophic Holographic Multiplexing," Applied Optics, Oct. 10, 2009, vol. 45 (29), pp. 7661-7666.

Final Office Action mailed Jun. 2, 2020 for U.S. Appl. No. 15/882,858, filed Jan. 29, 2018, 127 Pages.

Final Office Action mailed Jun. 2, 2020 for U.S. Appl. No. 16/557,383, filed Aug. 30, 2019, 66 Pages.

Final Office Action mailed Jan. 3, 2019 for U.S. Appl. No. 14/465,194, filed Aug. 21, 2014, 61 Pages.

Final Office Action mailed Nov. 3, 2020 for U.S. Appl. No. 15/974,430, filed May 8, 2018, 27 Pages.

Final Office Action mailed Feb. 4, 2020 for U.S. Appl. No. 16/577,207, filed Sep. 20, 2019, 76 Pages.

Final Office Action mailed Feb. 4, 2021 for U.S. Appl. No. 15/882,858, filed Jan. 29, 2018, 42 Pages.

Final Office Action mailed Jun. 5, 2020 for U.S. Appl. No. 16/557,427, filed Aug. 30, 2019, 95 Pages.

Final Office Action mailed Oct. 8, 2020 for U.S. Appl. No. 16/557,342, filed Aug. 30, 2019, 73 Pages.

Final Office Action mailed Apr. 9, 2020 for U.S. Appl. No. 15/974,454, filed May 8, 2018, 19 Pages.

Final Office Action mailed Jan. 10, 2018 for U.S. Appl. No. 14/465,194, filed Aug. 21, 2014, 50 Pages.

Final Office Action mailed Dec. 11, 2019 for U.S. Appl. No. 15/974,430, filed May 8, 2018, 30 Pages.

(56) References Cited

OTHER PUBLICATIONS

Final Office Action mailed Jan. 13, 2021 for U.S. Appl. No. 16/577,207, filed Sep. 20, 2019, 91 Pages.
Final Office Action mailed Dec. 18, 2019 for U.S. Appl. No. 16/258,279, filed Jan. 25, 2019, 45 Pages.
Final Office Action mailed Nov. 18, 2020 for U.S. Appl. No. 14/461,044, filed Aug. 15, 2014, 14 Pages.
Final Office Action mailed Feb. 19, 2021 for U.S. Appl. No. 16/258,279, filed Jan. 25, 2019, 58 Pages.
Final Office Action mailed Oct. 21, 2021 for U.S. Appl. No. 16/899,843, filed Jun. 12, 2020, 29 Pages.
Final Office Action mailed Jul. 23, 2021 for U.S. Appl. No. 14/461,044, filed Aug. 15, 2014, 15 Pages.
Final Office Action mailed Sep. 23, 2020 for U.S. Appl. No. 15/816,435, filed Nov. 17, 2017, 70 Pages.
Final Office Action mailed Jan. 28, 2020 for U.S. Appl. No. 16/557,342, filed Aug. 30, 2019, 15 Pages.
Final Office Action mailed Jul. 28, 2017 for U.S. Appl. No. 14/505,836, filed Oct. 3, 2014, 52 Pages.
Final Office Action mailed Jun. 28, 2021 for U.S. Appl. No. 16/557,342, filed Aug. 30, 2019, 11 Pages.
Final Office Action mailed Nov. 29, 2019 for U.S. Appl. No. 15/659,072, filed Jul. 25, 2017, 36 Pages.
Final Office Action mailed Nov. 29, 2019 for U.S. Appl. No. 16/353,998, filed Mar. 14, 2019, 33 Pages.
Final Office Action received for U.S. Appl. No. 14/155,087 dated Dec. 16, 2016, 32 pages.
Final Office Action received for U.S. Appl. No. 14/155,087 dated Jul. 20, 2015, 27 pages.
Final Office Action received for U.S. Appl. No. 14/155,087 dated Jul. 8, 2016, 27 pages.
Final Office Action received for U.S. Appl. No. 14/155,087 dated Nov. 27, 2017, 40 pages.
Final Office Action received for U.S. Appl. No. 14/155,107 dated Dec. 19, 2016, 35 pages.
Final Office Action received for U.S. Appl. No. 14/155,107 dated Jan. 17, 2019, 46 pages.
Final Office Action received for U.S. Appl. No. 14/155,107 dated Jul. 16, 2015, 28 pages.
Final Office Action received for U.S. Appl. No. 14/155,107 dated Jul. 8, 2016, 31 pages.
Final Office Action received for U.S. Appl. No. 14/155,107 dated Nov. 27, 2017, 44 pages.
First Office Action mailed Nov. 25, 2020, for Canadian Application No. 2921954, filed Aug. 21, 2014, 4 pages.
Fong H.C., et al., "PepperGram With Interactive Control," 22nd International Conference Onvirtual System & Multimedia (VSMM), Oct. 17, 2016, 5 pages.
Gallina A., et al., "Surface EMG Biofeedback," Surface Electromyography: Physiology, Engineering, and Applications, 2016, pp. 485-500.
Gargiulo G., et al., "Giga-Ohm High-Impedance FET Input Amplifiers for Dry Electrode Biosensor Circuits and Systems," Integrated Microsystems: Electronics, Photonics, and Biotechnolgy, Dec. 19, 2017, 41 Pages.
Gargiulo G., et al., "Giga-Ohm High-Impedance FET Input Amplifiers for Dry Electrode Biosensor Circuits and Systems," Integrated Microsystems: Electronics, Photonics, and Biotechnology, Jan. 2011, 41 pages.
Ghasemzadeh H., et al., "A Body Sensor Network With Electromyogram and Inertial Sensors: Multimodal Interpretation of Muscular Activities," IEEE Transactions on Information Technology in Biomedicine, Mar. 2010, vol. 14 (2), pp. 198-206.
Gopura R.A.R.C., et al., "A Human Forearm and Wrist Motion Assist Exoskeleton Robot With EMG-Based Fuzzy-Neuro Control," Proceedings of the 2nd Biennial IEEE/RAS-EMBS International Conference on Biomedical Robotics and Biomechatronics, Oct. 19-22, 2008, 6 pages.

Gourmelon L., et al., "Contactless Sensors for Surface Electromyography," Proceedings of the 28th IEEE EMBS Annual International Conference, New York City, NY, Aug. 30-Sep. 3, 2006, pp. 2514-2517.
Hainich R.R., et al., "Chapter 10: Near-Eye Displays," Displays: Fundamentals & Applications, AK Peters/CRC Press, 2011, 65 pages.
Hauschild M., et al., "A Virtual Reality Environment for Designing and Fitting Neural Prosthetic Limbs," IEEE Transactions on Neural Systems and Rehabilitation Engineering, Mar. 2007, vol. 15 (1), pp. 9-15.
Hornstein S., et al., "Maradin's Micro-Mirror—System Level Synchronization Notes," SID Digest, 2012, pp. 981-984.
"IEEE 100 The Authoritative Dictionary of IEEE Standards Terms," Seventh Edition, Standards Information Network IEEE Press, Dec. 2000, 3 pages.
International Search Report and Written Opinion for International Application No. PCT/US2014/017799, mailed May 16, 2014, 9 pages.
International Search Report and Written Opinion for International Application No. PCT/US2014/037863, mailed Aug. 21, 2014, 10 pages.
International Preliminary Report on Patentability for International Application No. PCT/US2017/043693, mailed Feb. 7, 2019, 7 Pages.
International Preliminary Report on Patentability for International Application No. PCT/US2017/043791, mailed Feb. 7, 2019, 9 Pages.
International Preliminary Report on Patentability for International Application No. PCT/US2019/031114, mailed Nov. 19, 2020, 16 pages.
International Preliminary Report on Patentability for International Application No. PCT/US2019/049094, mailed Mar. 11, 2021, 24 Pages.
International Preliminary Report on Patentability for International Application No. PCT/US2019/052151, mailed Apr. 1, 2021, 9 pages.
International Preliminary Report on Patentability for International Application No. PCT/US2014/017799, mailed Sep. 3, 2015, 8 Pages.
International Preliminary Report on Patentability for International Application No. PCT/US2014/037863, mailed Nov. 26, 2015, 8 pages.
International Preliminary Report on Patentability for International Application No. PCT/US2014/052143, mailed Mar. 3, 2016, 7 pages.
International Preliminary Report on Patentability for International Application No. PCT/US2014/067443, mailed Jun. 9, 2016, 7 pages.
International Preliminary Report on Patentability for International Application No. PCT/US2015/015675, mailed Aug. 25, 2016, 8 Pages.
International Preliminary Report on Patentability for International Application No. PCT/US2017/043686, mailed Feb. 7, 2019, 8 pages.
International Preliminary Report on Patentability for International Application No. PCT/US2017/043792, mailed Feb. 7, 2019, 8 Pages.
International Preliminary Report on Patentability for International Application No. PCT/US2018/056768, mailed Apr. 30, 2020, 7 pages.
International Preliminary Report on Patentability for International Application No. PCT/US2018/061409, mailed May 28, 2020, 10 pages.
International Preliminary Report on Patentability for International Application No. PCT/US2019/015174, mailed Aug. 6, 2020, 7 pages.
International Preliminary Report on Patentability for International Application No. PCT/US2019/015183, mailed Aug. 6, 2020, 7 pages.
International Preliminary Report on Patentability for International Application No. PCT/US2019/015238, mailed Aug. 6, 2020, 7 pages.

(56) References Cited

OTHER PUBLICATIONS

International Preliminary Report on Patentability for International Application No. PCT/US2019/028299, mailed Dec. 10, 2020, 11 pages.
International Preliminary Report on Patentability for International Application No. PCT/US2019/034173, mailed Dec. 10, 2020, 9 pages.
International Preliminary Report on Patentability for International Application No. PCT/US2019/046351, mailed Feb. 25, 2021, 8 pages.
International Preliminary Report on Patentability for International Application No. PCT/US2019/052131, mailed on Apr. 1, 2021, 8 pages.
International Preliminary Report on Patentability for International Application No. PCT/US2019/054716, mailed on Apr. 15, 2021, 10 pages.
International Preliminary Report on Patentability for International Application No. PCT/US2019/061759, mailed May 27, 2021, 12 pages.
International Preliminary Report on Patentability for International Application No. PCT/US2019/063587, mailed Jun. 10, 2021, 13 pages.
International Preliminary Report on Patentability for International Application No. PCT/US2020/049274, mailed Mar. 17, 2022, 14 pages.
International Preliminary Report on Patentability for International Application No. PCT/US2020/061392, mailed Jun. 9, 2022, 11 pages.
International Search Report and Written Opinion for International Application No. PCT/US2014/052143, mailed Nov. 21, 2014, 8 Pages.
International Search Report and Written Opinion for International Application No. PCT/US2014/067443, mailed Feb. 27, 2015, 8 pages.
International Search Report and Written Opinion for International Application No. PCT/US2015/015675, mailed May 27, 2015, 9 Pages.
International Search Report and Written Opinion for International Application No. PCT/US2016/018293, mailed Jun. 8, 2016, 17 Pages.
International Search Report and Written Opinion for International Application No. PCT/US2016/018298, mailed Jun. 8, 2016, 14 Pages.
International Search Report and Written Opinion for International Application No. PCT/US2016/018299, mailed Jun. 8, 2016, 12 Pages.
International Search Report and Written Opinion for International Application No. PCT/US2016/067246, mailed Apr. 25, 2017, 10 Pages.
International Search Report and Written Opinion for International Application No. PCT/US2017/043686, mailed Oct. 6, 2017, 9 Pages.
International Search Report and Written Opinion for International Application No. PCT/US2017/043693, mailed Oct. 6, 2017, 7 Pages.
International Search Report and Written Opinion for International Application No. PCT/US2017/043791, mailed Oct. 5, 2017, 10 Pages.
International Search Report and Written Opinion for International Application No. PCT/US2018/056768, mailed Jan. 15, 2019, 8 pages.
International Search Report and Written Opinion for International Application No. PCT/US2018/061409, mailed Mar. 12, 2019, 11 pages.
International Search Report and Written Opinion for International Application No. PCT/US2018/063215, mailed Mar. 21, 2019, 17 Pages.
International Search Report and Written Opinion for International Application No. PCT/US2019/015167, mailed May 21, 2019, 7 Pages.

International Search Report and Written Opinion for International Application No. PCT/US2019/015174, mailed May 21, 2019, 8 pages.
International Search Report and Written Opinion for International Application No. PCT/US2019/015244, mailed May 16, 2019, 8 Pages.
International Search Report and Written Opinion for International Application No. PCT/US2019/020065, mailed May 16, 2019, 10 Pages.
International Search Report and Written Opinion for International Application No. PCT/US2019/028299, mailed Aug. 9, 2019, 12 pages.
International Search Report and Written Opinion for International Application No. PCT/US2019/031114, mailed Dec. 20, 2019, 18 Pages.
International Search Report and Written Opinion for International Application No. PCT/US2019/034173, mailed Sep. 18, 2019, 10 Pages.
International Search Report and Written Opinion for International Application No. PCT/US2019/037302, mailed Oct. 11, 2019, 13 Pages.
International Search Report and Written Opinion for International Application No. PCT/US2019/042579, mailed Oct. 31, 2019, 8 Pages.
International Search Report and Written Opinion for International Application No. PCT/US2019/046351, mailed Nov. 7, 2019, 9 pages.
International Search Report and Written Opinion for International Application No. PCT/US2019/049094, mailed Jan. 9, 2020, 27 Pages.
International Search Report and Written Opinion for International Application No. PCT/US2019/052131, mailed on Dec. 6, 2019, 8 pages.
International Search Report and Written Opinion for International Application No. PCT/US2019/052151, mailed Jan. 15, 2020, 10 pages.
International Search Report and Written Opinion for International Application No. PCT/US2019/054716, mailed Dec. 20, 2019, 11 Pages.
International Search Report and Written Opinion for International Application No. PCT/US2019/061759, mailed Jan. 29, 2020, 12 pages.
International Search Report and Written Opinion for International Application No. PCT/US2019/063587, mailed Mar. 25, 2020, 16 pages.
International Search Report and Written Opinion for International Application No. PCT/US2020/025735, mailed Jun. 22, 2020, 10 pages.
International Search Report and Written Opinion for International Application No. PCT/US2020/025772, mailed Aug. 3, 2020, 11 pages.
International Search Report and Written Opinion for International Application No. PCT/US2020/025797, mailed Jul. 9, 2020, 10 pages.
International Search Report and Written Opinion for International Application No. PCT/US2020/049274, mailed Feb. 1, 2021, 17 pages.
International Search Report and Written Opinion for International Application No. PCT/US2020/061392, mailed Mar. 12, 2021, 12 pages.
International Search Report and Written Opinion for International Application No. PCT/US2017/043792, mailed Oct. 5, 2017, 9 Pages.
International Search Report and Written Opinion for International Application No. PCT/US2019/015134, mailed May 15, 2019, 11 Pages.
International Search Report and Written Opinion for International Application No. PCT/US2019/015180, mailed May 28, 2019, 10 Pages.
International Search Report and Written Opinion for International Application No. PCT/US2019/015183, mailed May 3, 2019, 8 Pages.

(56) References Cited

OTHER PUBLICATIONS

International Search Report and Written Opinion for International Application No. PCT/US2019/015238, mailed May 16, 2019, 8 Pages.

Invitation to Pay Additional Fees for International Application No. PCT/US2019/031114, mailed Aug. 6, 2019, 7 pages.

Invitation to Pay Additional Fees for International Application No. PCT/US2019/049094, mailed Oct. 24, 2019, 2 Pages.

Itoh Y., et al., "Interaction-Free Calibration for Optical See-Through Head-Mounted Displays based on 3D Eye Localization," IEEE Symposium on 3D User Interfaces (3DUI), 2014, pp. 75-82.

Janssen C., "Radio Frequency (RF)," 2013, [Retrieved on Jul. 12, 2017], 2 pages, Retrieved from the Internet: URL: https://web.archive.org/web/20130726153946/https://www.techopedia.com/definition/5083/radio-frequency-rf.

Jiang H., "Effective and Interactive Interpretation of Gestures by Individuals with Mobility Impairments," Thesis/Dissertation Acceptance, Purdue University Graduate School, Graduate School Form 30, Updated on Jan. 15, 2015, 24 pages.

Kainz et al., "Approach to Hand Tracking and Gesture Recognition Based on Depth-Sensing Cameras and EMG Monitoring," ACTA Informatica Pragensia, vol. 3, Jan. 1, 2014, pp. 104-112, Retrieved from the Internet: URL: https://aip.vse.cz/pdfs/aip/2014/01/08.pdf.

Kawaguchi J., et al., "Estimation of Finger Joint Angles Based on Electromechanical Sensing of Wrist Shape," IEEE Transactions on Neural Systems and Rehabilitation Engineering, Sep. 2017, vol. 25 (9), pp. 1409-1418.

Kessler D., "Optics of Near to Eye Displays (NEDs)," Presentation—Oasis, Tel Aviv, Feb. 19, 2013, 37 pages.

Khezri M. et al., "A Novel Approach to Recognize Hand Movements Via SEMG Patterns," 2007 Annual International Conference of the IEEE Engineering in Medicine and Biology Society. Aug. 22, 2007, pp. 4907-4910.

Kim H., et al., "Real-Time Human Pose Estimation and Gesture Recognition from Depth Images Using Superpixels and SVM Classifier," Sensors, 2015, vol. 15, pp. 12410-12427.

Kipke D.R., et al., "Silicon-Substrate Intracortical Microelectrode Arrays for Long-Term Recording of Neuronal Spike Activity in Cerebral Cortex," IEEE Transactions on Neural Systems and Rehabilitation Engineering, Jun. 2003, vol. 11 (2), 5 pages, Retrieved on Oct. 7, 2019 [Jul. 10, 2019] Retrieved from the Internet: URL: https://www.ece.uvic.ca/-bctill/papers/neurimp/Kipke_etal_2003_01214707.pdf.

Koerner M.D., "Design and Characterization of the Exo-Skin Haptic Device: A Novel Tendon Actuated Textile Hand Exoskeleton," Abstract of thesis for Drexel University Masters Degree [online], Nov. 2, 2017, 5 pages, Retrieved from the Internet: URL: https://dialog.proquest.com/professional/docview/1931047627?accountid=153692.

Krees B.C., et al., "Diffractive and Holographic Optics as Optical Combiners in Head Mounted Displays," UbiComp, Zurich, Switzerland, Sep. 8-12, 2013, pp. 1479-1482.

Kress B., et al., "A Review of Head-Mounted Displays (HMD) Technologies and Applications for Consumer Electronics," Proceedings of SPIE, 2013, vol. 8720, pp. 87200A-1-87200A-13.

Kress B., "Optical Architectures for See-Through Wearable Displays," Presentation, Bay Area SID Seminar, Apr. 30, 2014, 156 pages.

Lake et al., "Method and Apparatus for Analyzing Capacitive EMG and IMU Sensor Signals for Gesture Control," Amendment filed Aug. 21, 2015, for U.S. Appl. No. 14/186,878, 13 pages.

Lake et al., "Method and Apparatus for Analyzing Capacitive EMG and IMU Sensor Signals for Gesture Control," Office Action dated Jun. 17, 2015, for U.S. Appl. No. 14/186,878, 13 pages.

Lake et al. "Method and Apparatus for Analyzing Capacitive EMG and IMU Sensor Signals for Gesture Control," Preliminary Amendment filed May 9, 2014, for U.S. Appl. No. 14/186,878, 9 pages.

Lake et al., "Method and Apparatus for Analyzing Capacitive EMG and IMU Sensor Signals for Gesture Control," U.S. Appl. No. 14/186,878, filed Feb. 21, 2014, 29 pages.

Lake et al., "Methods and Devices for Combining Muscle Activity Sensor Signals and Inertial Sensor Signals for Gesture-Based Control," Amendment filed Jan. 8, 2016, for U.S. Appl. No. 14/186,889, 16 pages.

Lake et al., "Methods and Devices for Combining Muscle Activity Sensor Signals and Inertial Sensor Signals for Gesture-Based Control," Amendment filed Jul. 13, 2016, for U.S. Appl. No. 14/186,889, 12 pages.

Lake et al., "Methods and Devices for Combining Muscle Activity Sensor Signals and Inertial Sensor Signals for Gesture-Based Control," Office Action dated Jun. 16, 2016, for U.S. Appl. No. 14/186,889, 13 pages.

Lake et al., "Methods and Devices for Combining Muscle Activity Sensor Signals and Inertial Sensor Signals for Gesture-Based Control," Office Action dated Nov. 5, 2015, for U.S. Appl. No. 14/186,889, 11 pages.

Lake et al., "Methods and Devices That Combine Muscle Activity Sensor Signals and Inertial Sensor Signals for Gesture-Based Control," U.S. Appl. No. 14/186,889, filed Feb. 21, 2014, 58 pages.

Lee D.C., et al., "Motion and Force Estimation System of Human Fingers," Journal of Institute of Control, Robotics and Systems, 2011, vol. 17 (10), pp. 1014-1020.

Levola T., "7.1: Invited Paper: Novel Diffractive Optical Components for Near to Eye Displays," SID Symposium Digest of Technical Papers, 2006, vol. 37 (1), pp. 64-67.

Li Y., et al., "Motor Function Evaluation of Hemiplegic Upper-Extremities Using Data Fusion from Wearable Inertial and Surface EMG Sensors," Sensors, MDPI, 2017, vol. 17 (582), pp. 1-17.

Liao C.D., et al., "The Evolution of MEMS Displays," IEEE Transactions on Industrial Electronics, Apr. 2009, vol. 56 (4), pp. 1057-1065.

Lippert T.M., "Chapter 6: Display Devices: RSD™ (Retinal Scanning Display)," The Avionics Handbook, CRC Press, 2001, 8 pages.

Lopes J., et al., "Hand/Arm Gesture Segmentation by Motion Using IMU and EMG Sensing," ScienceDirect, Jun. 27-30, 2017, vol. 11, pp. 107-113.

Machine Translation of CN102238282A, 2011, 42 pages.

Majaranta P., et al., "Chapter 3: Eye Tracking and Eye-Based Human-Computer Interaction," Advances in Physiological Computing, Springer-Verlag London, 2014, pp. 39-65.

Marcard T.V., et al., "Sparse Inertial Poser: Automatic 3D Human Pose Estimation from Sparse IMUs," arxiv.org, Computer Graphics Forum, 2017, vol. 36 (2), 12 pages, XP080759137.

Martin H., et al., "A Novel Approach of Prosthetic Arm Control using Computer Vision, Biosignals, and Motion Capture," IEEE Symposium on Computational Intelligence in Robotic Rehabilitation and Assistive Technologies (CIR2AT), 2014, 5 pages.

Mcintee S.S., "A Task Model of Free-Space Movement-Based Geastures," Dissertation, Graduate Faculty of North Carolina State University, Computer Science, 2016, 129 pages.

Mendes Jr.J.J.A., et al., "Sensor Fusion and Smart Sensor in Sports and Biomedical Applications," Sensors, 2016, vol. 16 (1569), pp. 1-31.

Merriam-Webster, "Radio Frequencies," download date Jul. 12, 2017, 2 pages, Retrieved from the Internet: URL: https://www.merriam-webster.com/table/collegiate/radiofre.htm.

Mohamed O.H., "Homogeneous Cognitive Based Biometrics for Static Authentication," Dissertation submitted to University of Victoria, Canada, 2010, [last accessed Oct. 11, 2019], 149 pages, Retrieved from the Internet: URL: http://hdl.handle.net/1828/321.

Morris D., et al., "Emerging Input Technologies for Always-Available Mobile Interaction," Foundations and Trends in Human-Computer Interaction, 2010, vol. 4 (4), pp. 245-316.

Morun C., et al., "Systems, Articles, and Methods for Capacitive Electromyography Sensors." U.S. Appl. No. 16/437,351, filed Jun. 11, 2019, 51 pages.

Naik. G.R., et al., "SEMG for Identifying Hand Gestures using ICA," In Proceedings of the 2nd International Workshop on Biosignal Processing and Classification, Jan. 31, 2006, pp. 61-67.

Naik G.R., et al., "Source Separation and Identification issues in Bio Signals: A Solution using Blind Source Separation," Chapter 4 of Recent Advances in Biomedical Engineering, Intech, 2009, 23 pages.

(56) References Cited

OTHER PUBLICATIONS

Naik G.R., et al., "Real-Time Hand Gesture Identification for Human Computer Interaction Based on ICA of Surface Electromyogram," IADIS International Conference Interfaces and Human Computer Interaction, 2007, pp. 83-90.
Naik G.R., et al., "Subtle Hand Gesture Identification for HCI Using Temporal Decorrelation Source Separation BSS of Surface EMG," Digital Image Computing Techniques and Applications, IEEE Computer Society, 2007, pp. 30-37.
Negro F., et al., "Multi-Channel Intramuscular and Surface EMG Decomposition by Convolutive Blind Source Separation," Journal of Neural Engineering, Feb. 29, 2016, vol. 13, 18 Pages.
Non-Final Office Action mailed Mar. 1, 2018 for U.S. Appl. No. 14/553,657, filed Nov. 25, 2014, 29 Pages.
Non-Final Office Action mailed Mar. 2, 2021 for U.S. Appl. No. 15/974,430, filed May 8, 2018, 32 Pages.
Non-Final Office Action mailed May 2, 2018 for U.S. Appl. No. 15/799,628, filed Oct. 31, 2017, 25 Pages.
Non-Final Office Action mailed Sep. 2, 2020 for U.S. Appl. No. 15/882,858, filed Jan. 29, 2018, 66 Pages.
Non-Final Office Action mailed Aug. 3, 2020 for U.S. Appl. No. 16/593,446, filed Oct. 4, 2019, 44 pages.
Non-Final Office Action mailed Jun. 3, 2021 for U.S. Appl. No. 15/816,435, filed Nov. 17, 2017, 32 Pages.
Non-Final Office Action mailed Jun. 5, 2020 for U.S. Appl. No. 15/659,072, filed Jul. 25, 2017, 59 Pages.
Non-Final Office Action mailed Oct. 5, 2022 for U.S. Appl. No. 17/576,815, filed Jan. 14, 2022, 14 pages.
Non-Final Office Action mailed Nov. 6, 2018 for U.S. Appl. No. 16/057,573, filed Aug. 7, 2018, 14 Pages.
Non-Final Office Action mailed Sep. 6, 2019 for U.S. Appl. No. 16/424,144, filed May 28, 2019, 11 Pages.
Non-Final Office Action mailed May 7, 2021 for U.S. Appl. No. 16/899,843, filed Jun. 12, 2020, 24 Pages.
Non-Final Office Action mailed Oct. 7, 2022 for U.S. Appl. No. 17/141,646, filed Jan. 5, 2021, 6 pages.
Non-Final Office Action mailed Feb. 8, 2021 for U.S. Appl. No. 16/557,342, filed Aug. 30, 2019, 11 Pages.
Non-Final Office Action mailed Oct. 8, 2020 for U.S. Appl. No. 16/577,207, filed Sep. 20, 2019, 51 Pages.
Non-Final Office Action mailed Apr. 9, 2019 for U.S. Appl. No. 16/258,409, filed Jan. 25, 2019, 71 Pages.
Non-Final Office Action mailed Aug. 11, 2021 for U.S. Appl. No. 16/577,207, filed Sep. 20, 2019, 35 Pages.
Non-Final Office Action mailed Sep. 11, 2019 for U.S. Appl. No. 14/465,194, filed Aug. 21, 2014, 72 Pages.
Non-Final Office Action mailed May 12, 2022 for U.S. Appl. No. 16/899,843, filed Jun. 12, 2020, 34 Pages.
Non-Final Office Action mailed Jun. 13, 2019 for U.S. Appl. No. 16/258,279, filed Jan. 25, 2019, 38 Pages.
Non-Final Office Action mailed Sep. 14, 2017 for U.S. Appl. No. 14/539,773, filed Nov. 12, 2014, 28 pages.
Non-Final Office Action mailed Aug. 15, 2018 for U.S. Appl. No. 14/465,194, filed Aug. 21, 2014, 64 Pages.
Non-Final Office Action mailed Jun. 15, 2020 for U.S. Appl. No. 16/292,609, filed Mar. 5, 2019, 26 Pages.
Non-Final Office Action mailed Jun. 15, 2020 for U.S. Appl. No. 16/557,342, filed Aug. 30, 2019, 46 Pages.
Non-Final Office Action mailed Jan. 16, 2020 for U.S. Appl. No. 16/389,419, filed Apr. 19, 2019, 26 Pages.
Non-Final Office Action mailed May 16, 2019 for U.S. Appl. No. 15/974,384, filed May 8, 2018, 13 Pages,.
Non-Final Office Action mailed May 16, 2019 for U.S. Appl. No. 15/974,430, filed May 8, 2018, 12 Pages.
Non-Final Office Action mailed Aug. 17, 2017 for U.S. Appl. No. 14/465,194, filed Aug. 21, 2014, 81 Pages.
Non-Final Office Action mailed Dec. 17, 2018 for U.S. Appl. No. 16/137,960, filed Sep. 21, 2018, 10 pages.
Non-Final Office Action mailed Jan. 18, 2018 for U.S. Appl. No. 15/799,621, filed Oct. 31, 2017, 10 pages.

Non-Final Office Action mailed Nov. 19, 2019 for U.S. Appl. No. 16/577,207, filed Sep. 20, 2019, 32 Pages.
Non-Final Office Action mailed Aug. 20, 2020 for U.S. Appl. No. 15/974,454, filed May 8, 2018, 59 Pages.
Non-Final Office Action mailed Dec. 20, 2019 for U.S. Appl. No. 15/974,454, filed May 8, 2018, 41 Pages.
Non-Final Office Action mailed Jan. 22, 2020 for U.S. Appl. No. 15/816,435, filed Nov. 17, 2017, 35 Pages.
Non-Final Office Action mailed Jun. 22, 2017 for U.S. Appl. No. 14/461,044, filed Aug. 15, 2014, 21 Pages.
Non-Final Office Action mailed Oct. 22, 2019 for U.S. Appl. No. 16/557,342, filed Aug. 30, 2019, 16 Pages.
Non-Final Office Action mailed Dec. 23, 2019 for U.S. Appl. No. 16/557,383, filed Aug. 30, 2019, 53 Pages.
Non-Final Office Action mailed Dec. 23, 2019 for U.S. Appl. No. 16/557,427, filed Aug. 30, 2019, 52 Pages.
Non-Final Office Action mailed Feb. 23, 2017 for U.S. Appl. No. 14/505,836, filed Oct. 3, 2014, 54 Pages.
Non-Final Office Action mailed Jul. 23, 2020 for U.S. Appl. No. 16/593,446, filed Oct. 4, 2019, 28 pages.
Non-Final Office Action mailed May 24, 2019 for U.S. Appl. No. 16/353,998, filed Mar. 14, 2019, 20 Pages.
Non-Final Office Action mailed Feb. 25, 2021 for U.S. Appl. No. 14/461,044, filed Aug. 15, 2014, 17 Pages.
Non-Final Office Action mailed May 26, 2020 for U.S. Appl. No. 16/353,998, filed Mar. 14, 2019, 60 Pages.
Non-Final Office Action mailed Nov. 27, 2020 for U.S. Appl. No. 16/258,279, filed Jan. 25, 2019, 44 Pages.
Non-Final Office Action mailed Aug. 28, 2018 for U.S. Appl. No. 16/023,276, filed Jun. 29, 2018, 10 pages.
Non-Final Office Action mailed Aug. 28, 2018 for U.S. Appl. No. 16/023,300, filed Jun. 29, 2018, 11 pages.
Non-Final Office Action mailed Jun. 28, 2021 for U.S. Appl. No. 16/550,905, filed Aug. 26, 2019, 5 Pages.
Non-Final Office Action mailed Apr. 29, 2019 for U.S. Appl. No. 16/257,979, filed Jan. 25, 2019, 63 Pages.
Non-Final Office Action mailed Apr. 30, 2019 for U.S. Appl. No. 15/659,072, filed Jul. 25, 2017, 99 Pages.
Non-Final Office Action mailed Apr. 30, 2020 for U.S. Appl. No. 15/974,430, filed May 8, 2018, 57 Pages.
Non-Final Office Action mailed Dec. 30, 2019 for U.S. Appl. No. 16/593,446, filed Oct. 4, 2019, 43 pages.
Non-Final Office Action mailed Jun. 30, 2016 for U.S. Appl. No. 14/505,836, filed Oct. 3, 2014, 37 Pages.
Non-Final Office Action mailed Oct. 30, 2019 for U.S. Appl. No. 15/882,858, filed Jan. 29, 2018, 22 Pages.
Non-Final Office Action received for U.S. Appl. No. 14/155,087 dated Aug. 16, 2016, 28 pages.
Non-Final Office Action received for U.S. Appl. No. 14/155,087 dated Aug. 7, 2017, 28 pages.
Non-Final Office Action received for U.S. Appl. No. 14/155,087 dated Feb. 17, 2016, 26 pages.
Non-Final Office Action received for U.S. Appl. No. 14/155,087 dated Mar. 31, 2015, 22 pages.
Non-Final Office Action received for U.S. Appl. No. 14/155,107 dated Aug. 17, 2016, 37 pages.
Non-Final Office Action received for U.S. Appl. No. 14/155,107 dated Aug. 7, 2017, 34 pages.
Non-Final Office Action received for U.S. Appl. No. 14/155,107 dated Feb. 11, 2016, 42 pages.
Non-Final Office Action received for U.S. Appl. No. 14/155,107 dated Jul. 13, 2018, 45 pages.
Non-Final Office Action received for U.S. Appl. No. 14/155,107 dated Mar. 31, 2015, 26 pages.
Notice of Allowance mailed May 1, 2019 for U.S. Appl. No. 16/137,960, filed Sep. 21, 2018, 14 pages.
Notice of Allowance mailed Nov. 2, 2020 for U.S. Appl. No. 15/974,454, filed May 8, 2018, 24 Pages.
Notice of Allowance mailed Nov. 4, 2019 for U.S. Appl. No. 15/974,384, filed May 8, 2018, 39 Pages.
Notice of Allowance mailed Mar. 5, 2019 for U.S. Appl. No. 16/057,573, filed Aug. 7, 2018, 31 Pages.

(56) References Cited

OTHER PUBLICATIONS

Notice of Allowance mailed Feb. 6, 2020 for U.S. Appl. No. 16/424,144, filed May 28, 2019, 28 Pages.

Notice of Allowance mailed Feb. 8, 2019 for U.S. Appl. No. 16/023,276, filed Jun. 29, 2018, 15 pages.

Notice of Allowance mailed Feb. 9, 2022 for U.S. Appl. No. 15/882,858, filed Jan. 29, 2018, 9 pages.

Notice of Allowance mailed Nov. 10, 2021 for U.S. Appl. No. 15/882,858, filed Jan. 29, 2018, 6 pages.

Notice of Allowance mailed Mar. 11, 2020 for U.S. Appl. No. 14/465,194, filed Aug. 21, 2014, 29 Pages.

Notice of Allowance mailed Dec. 14, 2022 for U.S. Appl. No. 15/882,858, filed Jan. 29, 2018, 10pages.

Notice of Allowance mailed Jul. 15, 2021 for U.S. Appl. No. 15/882,858, filed Jan. 29, 2018, 2 pages.

Notice of Allowance mailed Jun. 15, 2018 for U.S. Appl. No. 15/799,621, filed Oct. 31, 2017, 27 pages.

Notice of Allowance mailed Dec. 16, 2020 for U.S. Appl. No. 16/593,446, filed Oct. 4, 2019, 44 pages.

Notice of Allowance mailed Jul. 18, 2022 for U.S. Appl. No. 16/550,905, filed Aug. 26, 2019, 7 pages.

Notice of Allowance mailed May 18, 2020 for U.S. Appl. No. 16/258,279, filed Jan. 25, 2019, 42 Pages.

Notice of Allowance mailed May 18, 2022 for U.S. Appl. No. 15/882,858, filed Jan. 29, 2018, 10 pages.

Notice of Allowance mailed Aug. 19, 2020 for U.S. Appl. No. 16/557,427, filed Aug. 30, 2019, 22 Pages.

Notice of Allowance mailed Jul. 19, 2019 for U.S. Appl. No. 16/258,409, filed Jan. 25, 2019, 36 Pages.

Notice of Allowance mailed Apr. 20, 2022 for U.S. Appl. No. 14/461,044, filed Aug. 15, 2014, 08 pages.

Notice of Allowance mailed May 20, 2020 for U.S. Appl. No. 16/389,419, filed Apr. 19, 2019, 28 Pages.

Notice of Allowance mailed Aug. 22, 2022 for U.S. Appl. No. 15/882,858, filed Jan. 29, 2018, 9 pages.

Notice of Allowance mailed Oct. 22, 2021 for U.S. Appl. No. 15/882,858, filed Jan. 29, 2018 , 8 pages.

Notice of Allowance mailed Aug. 23, 2021 for U.S. Appl. No. 15/974,430, filed May 8, 2018, 12 pages.

Notice of Allowance mailed Dec. 23, 2020 for U.S. Appl. No. 15/659,072, filed Jul. 25, 2017, 26 Pages.

Notice of Allowance mailed Sep. 24, 2020 for U.S. Appl. No. 16/292,609, filed Mar. 5, 2019, 20 Pages.

Notice of Allowance mailed Mar. 25, 2022 for U.S. Appl. No. 16/550,905, filed Aug. 26, 2019, 7 pages.

Notice of Allowance mailed Sep. 25, 2018 for U.S. Appl. No. 14/553,657, filed Nov. 25, 2014, 25 Pages.

Notice of Allowance mailed Jan. 28, 2019 for U.S. Appl. No. 16/023,300, filed Jun. 29, 2018, 31 pages.

Notice of Allowance mailed Jun. 28, 2021 for U.S. Appl. No. 15/882,858, filed Jan. 29, 2018, 18 pages.

Notice of Allowance mailed Nov. 3, 2022 for U.S. Appl. No. 16/899,843, filed Jun. 12, 2020, 10 pages.

Notice of Allowance mailed Mar. 30, 2018 for U.S. Appl. No. 14/539,773, filed Nov. 12, 2014, 17 pages.

Notice of Allowance mailed Nov. 30, 2018 for U.S. Appl. No. 15/799,628, filed Oct. 31, 2017, 19 Pages.

Notice of Allowance mailed Jul. 31, 2019 for U.S. Appl. No. 16/257,979, filed Jan. 25, 2019, 22 Pages.

Notice of Allowance received for U.S. Appl. No. 14/155,107 dated Aug. 30, 2019, 16 pages.

Office action for European Application No. 17835112.8, dated Feb. 11, 2022, 11 Pages.

Office Action for European Application No. 19606723.3, mailed Oct. 27, 2022, 8 pages.

Office Action for European Patent Application No. 19743717.1, mailed Apr. 11, 2022, 10 pages.

Office Action mailed 03 January 2024 for Chinese Application No. 201980061965.2, filed 20 September 2019, 11 pages.

Office Action mailed Feb. 6, 2024 for Japanese Patent Application No. 2021 ~534135, filed on Mar. 30, 2020, 8 pages.

Office Action mailed Mar. 7, 2024 for Chinese Application No. 202080025699.0, filed Mar. 30, 2020, 9 pages.

Office Action mailed Feb. 9, 2024 for Chinese Application No. 201980049646.X, filed Apr. 19, 2019, 9 pages.

Office Action mailed Jan. 12, 2024 for Chinese Application No. 201980072093.X, filed Aug. 30, 2019, 13 pages.

Office Action mailed Sep. 14, 2023 for Chinese Application No. 201980035465.1, filed May 28, 2019, 9 pages.

Office Action mailed Aug. 15, 2023 for Japanese Patent Application No. 2021-507757, filed on Feb. 15, 2021,9 pages.

Office Action mailed Aug. 16, 2023 for Chinese Application No. 201880082887.X, filed Oct. 19, 2018, 17 pages.

Office Action mailed Aug. 16, 2023 for Chinese Application No. 202080062417.4, filed Sep. 3, 2020, 11 pages.

Office Action mailed 20 January 2023 for Chinese Application No. 201780059093.7, filed 25 July 2017,16 pages.

Office Action mailed Aug. 21, 2023 for Chinese Patent Application No. 201980062920.7, filed Sep. 20, 2019, 21 pages.

Office Action mailed Jun. 22, 2023 for European Patent Application No. 19863248.1, filed on Sep. 20, 2019, 5 pages.

Office /Action mailed Jan. 23, 2024 for Japanese Patent Application No. 2021533832, filed on Mar. 30, 2020, 5 pages.

Office Action mailed 24 January 2024 for Chinese Application No. 201980065646.9, filed 04 October 2019, 11 pages.

Office Action mailed Dec. 27, 2023 for Chinese Application No. 201980053249 X, filed Aug. 13, 2019, 10 pages.

Office Action mailed Nov. 28, 2023 for Japanese Patent Application No. 2021-534144, filed on Jun. 14, 2021, 5 pages.

Office Action mailed Sep. 28, 2022 for Chinese Application No. 201780059093.7, filed Jul. 25, 2017, 16 pages.

Office Action mailed Sep. 28, 2023 for Chinese Application No. 201980022051.5, filed Jan. 25, 2019, 18 pages.

Office Action mailed Aug. 29, 2023 for Japanese Application No. 2021-506985, filed Feb. 9, 2021,6 pages.

Office Action mailed Dec. 29, 2023 for Chinese Application No. 201980089431.0, filed Nov. 15, 2019, 26 pages.

Office Action mailed Dec. 29, 2023 for Chinese Application No. 201980090473.6, filed Jul. 27, 2021, 7 pages.

Office Action mailed Aug. 31, 2023 for Chinese Application No., 201 980045972.3 filed May 7, 2021,20 pages.

Office Action mailed Feb. 7, 2023 for European Application No. 19810524.9, filed May 28, 2019, 7 pages.

Partial Supplementary European Search Report for European Application No. 18879156.0, mailed Dec. 7, 2020, 9 pages.

Picard R.W., et al., "Affective Wearables," Proceedings of the IEEE 1st International Symposium on Wearable Computers, ISWC, Cambridge, MA, USA, Oct. 13-14, 1997, pp. 90-97.

Preinterview First Office Action mailed Jun. 24, 2020 for U.S. Appl. No. 16/785,680, filed Feb. 10, 2020, 90 Pages.

Rekimoto J., "GestureWrist and GesturePad: Unobtrusive Wearable Interaction Devices," ISWC Proceedings of the 5th IEEE International Symposium on Wearable Computers, 2001, 7 pages.

Restriction Requirement mailed Aug. 8, 2017 for U.S. Appl. No. 14/553,657, filed Nov. 25, 2014, 7 Pages.

Saponas T.S., et al., "Demonstrating the Feasibility of Using Forearm Electromyography for Muscle-Computer Interfaces," CHI Proceedings, Physiological Sensing for Input, Apr. 5-10, 2008, pp. 515-524.

Saponas T.S., et al., "Enabling Always-Available Input with Muscle-Computer Interfaces," Conference: Proceedings of the 22nd Annual ACM Symposium on User Interface Software and Technology, Oct. 7, 2009, pp. 167-176.

Saponas T.S., et al., "Making Muscle-Computer Interfaces More Practical," CHI, Atlanta, Georgia, USA, Apr. 10-15, 2010, 4 pages.

Sartori M., et al., "Neural Data-Driven Musculoskeletal Modeling for Personalized Neurorehabilitation Technologies," IEEE Transactions on Biomedical Engineering, May 5, 2016, vol. 63 (5), pp. 879-893.

Sato M., et al., "Touche: Enhancing Touch Interaction on Humans, Screens, Liquids, and Everyday Objects," CHI, Austin, Texas, May 5-10, 2012, 10 pages.

(56)     References Cited

OTHER PUBLICATIONS

Sauras-Perez P., et al., "A Voice and Pointing Gesture Interaction System for Supporting Human Spontaneous Decisions in Autonomous Cars," Clemson University, All Dissertations, May 2017, 174 pages.

Schowengerdt B.T., et al., "Stereoscopic Retinal Scanning Laser Display With Integrated Focus Cues for Ocular Accommodation," Proceedings of SPIE-IS&T Electronic Imaging, 2004, vol. 5291, pp. 366-376.

Shen S., et al., "I Am a Smartwatch and I Can Track My User's Arm," University of Illinois at Urbana-Champaign, MobiSys, Jun. 25-30, 2016, 12 pages.

Silverman N.L., et al., "58.5L: Late-News Paper: Engineering a Retinal Scanning Laser Display with Integrated Accommodative Depth Cues," SID 03 Digest, 2003, pp. 1538-1541.

Son M., et al., "EValuating the Utility of Two Gestural Discomfort Evaluation Methods," PLOS One, Apr. 19, 2017, 21 pages.

Strbac M., et al., "Microsoft Kinect-Based Artificial Perception System for Control of Functional Electrical Stimulation Assisted Grasping." Hindawi Publishing Corporation, BioMed Research International [online], 2014, Article No. 740469, 13 pages, Retrieved from the Internet: URL: https://dx.doi.org/10.1155/2014/740469.

Takatsuka Y., et al., "Retinal Projection Display Using Diffractive Optical Element," Tenth International Conference on Intelligent Information Hiding and Multimedia Signal Processing, IEEE, 2014, pp. 403-406.

Tibold R., et al., "Prediction of Muscle Activity during Loaded Movements of The Upper Limb," Journal of NeuroEngineering Rehabilitation, 2015 vol. 12, No. 6, DOI: https://doi.org/10.1186/1743-0003-12-6 , 12 pages.

Torres T., "Myo Gesture Control Armband," PCMag, Jun. 8, 2015, 9 pages, Retrieved from the Internet: URL: https://www.pcmag.com/article2/0,2817,2485462,00.asp.

Ueno A., et al., "A Capacitive Sensor System for Measuring Laplacian Electromyogram through Cloth: A Pilot Study," Proceedings of the 29th Annual International Conference of the IEEE EMBS, Cite Internationale, Lyon, France, Aug. 23-26, 2007, pp. 5731-5734.

Ueno A., et al., "Feasibility of Capacitive Sensing of Surface Electromyographic Potential through Cloth," Sensors and Materials, 2012, vol. 24 (6), pp. 335-346.

Urey H., "Diffractive Exit-Pupil Expander for Display Applications," Applied Optics, Nov. 10, 2001, vol. 40 (32), pp. 5840-5851.

Urey H., et al., "Optical Performance Requirements for MEMS-Scanner Based Microdisplays," Conferences on MOEMS and Miniaturized Systems, SPIE, 2000, vol. 4178, pp. 176-185.

Valero-Cuevas F. J., et al. "Computational Models for Neuromuscular Function," IEEE reviews in Biomedical Engineering. Dec. 31, 2009, vol. 2, pp. 110-135.

Valero-Cuevas F.J., et al., "Computational Models for Neuromuscular Function," IEEE Reviews in Biomedical Engineering, 2009, vol. 2, NIH Public Access Author Manuscript [online], Jun. 16, 2011 [Retrieved on Jul. 29, 2019], 52 pages, Retrieved from the Internet: URL: https://www.ncbi.nlm.nih.gov/pmc/articles/PMC3116649/.

Viirre E., et al., "The Virtual Retinal Display: A New Technology for Virtual Reality and Augmented Vision in Medicine," Proceedings of Medicine Meets Virtual Reality, IOS Press and Ohmsha, 1998, pp. 252-257.

Wijk U., et al., "Forearm Amputee's Views of Prosthesis Use and Sensory Feedback," Journal of Hand Therapy, Jul. 2015, vol. 28 (3), pp. 269-278.

Wittevrongel B., et al., "Spatiotemporal Beamforming: A Transparent and Unified Decoding Approach to Synchronous Visual Brain-Computer Interfacing," Frontiers in Neuroscience, Nov. 15, 2017, vol. 11, Article No. 630, 13 Pages.

Wodzinski M., et al., "Sequential Classification of Palm Gestures Based on A* Algorithm and MLP Neural Network for Quadrocopter Control," Metrology and Measurement Systems, 2017, vol. 24 (2), pp. 265-276.

Written Opinion for International Application No. PCT/US2014/057029, mailed Feb. 24, 2015, 9 Pages.

Xiong A., et al., "A Novel HCI based on EMG and IMU," Proceedings of the 2011 IEEE International Conference on Robotics and Biomimetics, Phuket, Thailand, Dec. 7-11, 2011, pp. 2653-2657.

Xu Z., et al., "Hand Gesture Recognition and Virtual Game Control Based on 3D Accelerometer and EMG Sensors," Proceedings of the 14th International Conference on Intelligent User Interfaces, D211 Sanibel Island, Florida, Feb. 8-11, 2009, pp. 401-406.

Xue Y., et al., "Multiple Sensors Based Hand Motion Recognition Using Adaptive Directed Acyclic Graph," Applied Sciences, MDPI, 2017, vol. 7 (358), pp. 1-14.

Yang Z., et al., "Surface EMG Based Handgrip Force Predictions Using Gene Expression Programming," Neurocomputing, 2016, vol. 207, pp. 568-579.

Zacharaki E.I., et al., "Spike Pattern Recognition by Supervised Classification in Low Dimensional Embedding Space," Brain Informatics, 2016, vol. 3, pp. 73-83.

Zhang X., et al., "A Framework for Hand Gesture Recognition Based on Accelerometer and EMG Sensors," IEEE Transactions on Systems, Man, and Cybernetics—Part A: Systems and Humans, Nov. 2011, vol. 41 (6), pp. 1064-1076.

Amma C., et al., "Airwriting: A Wearable Handwriting Recognition System," Personal and Ubiquitous Computing, Springer Verlag, Jan. 1, 2014, vol. 18, No. 1, pp. 191-203.

European Search Report for European Patent Application No. 24203369.4, dated Mar. 20, 2025, 10 pages.

Notice of Allowance mailed Jul. 1, 2025 for U.S. Appl. No. 18/890,622, filed Sep. 19, 2024, 9 pages.

* cited by examiner

400

420

430

410

420

430

210

700

User's Arm/Hand
710

720
Hand Segments

750
Camera View

730
Forearm Segment

740
EMG Sensors

760
Camera

1000

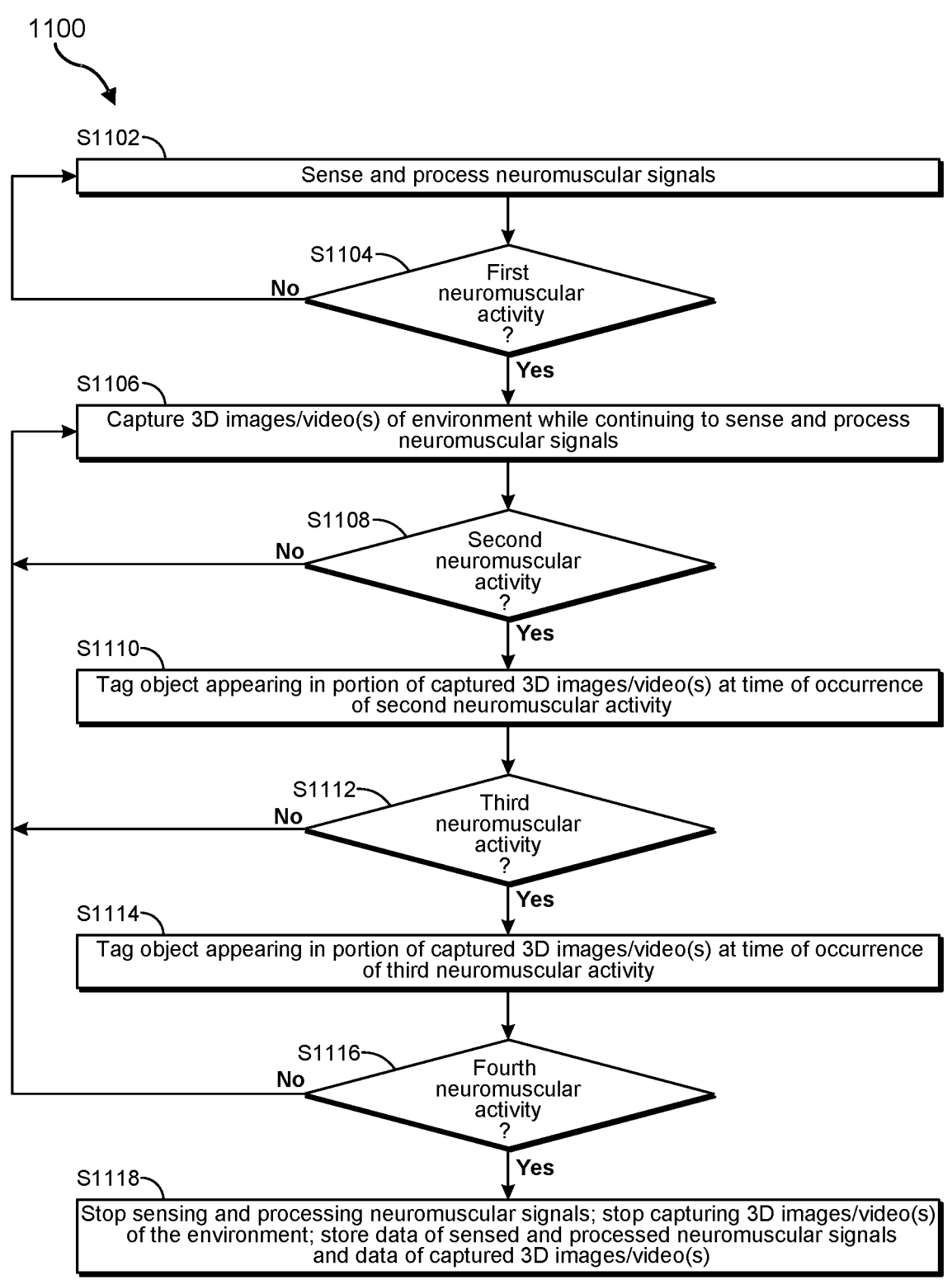

1100

S1102 — Sense and process neuromuscular signals

S1104 — First neuromuscular activity? — No / Yes

S1106 — Capture 3D images/video(s) of environment while continuing to sense and process neuromuscular signals S1108 — Second neuromuscular activity? — No / Yes S1110 — Tag object appearing in portion of captured 3D images/video(s) at time of occurrence of second neuromuscular activity S1112 — Third neuromuscular activity? — No / Yes S1114 — Tag object appearing in portion of captured 3D images/video(s) at time of occurrence of third neuromuscular activity S1116 — Fourth neuromuscular activity? — No / Yes S1118 — Stop sensing and processing neuromuscular signals; stop capturing 3D images/video(s) of the environment; store data of sensed and processed neuromuscular signals and data of captured 3D images/video(s)

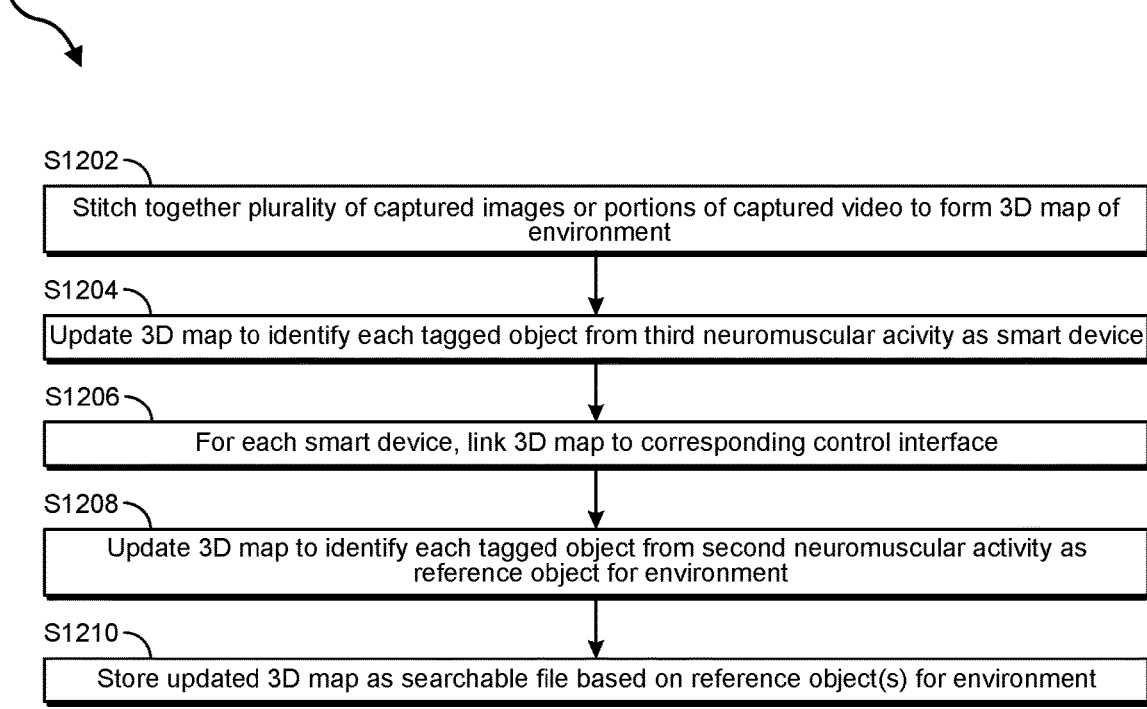

S1202

Stitch together plurality of captured images or portions of captured video to form 3D map of environment

S1204

Update 3D map to identify each tagged object from third neuromuscular acivity as smart device

S1206

For each smart device, link 3D map to corresponding control interface

S1208

Update 3D map to identify each tagged object from second neuromuscular activity as reference object for environment

S1210

Store updated 3D map as searchable file based on reference object(s) for environment

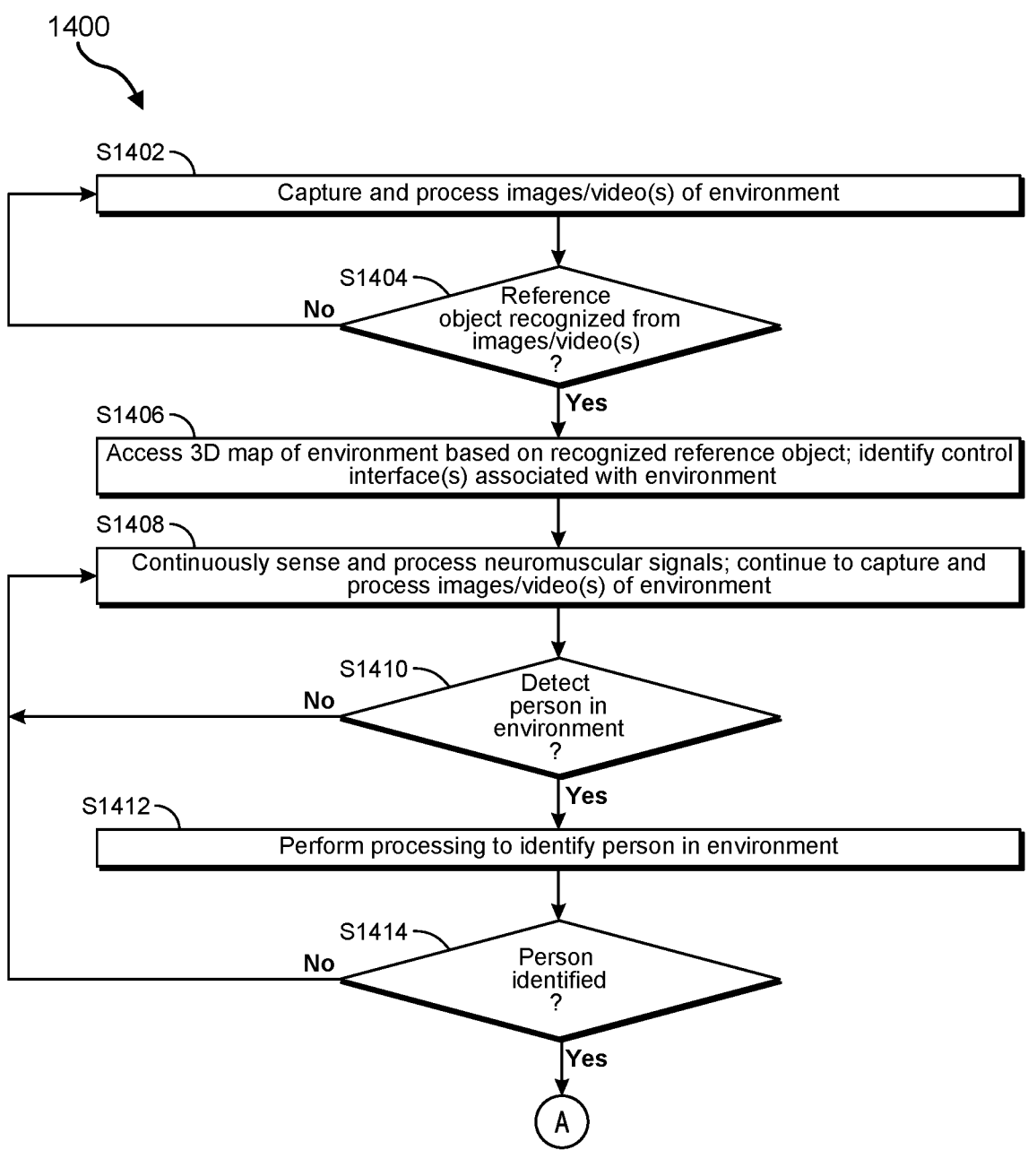

S1402 — Capture and process images/video(s) of environment

S1404 — Reference object recognized from images/video(s)? — No

Yes

S1406 — Access 3D map of environment based on recognized reference object; identify control interface(s) associated with environment S1408 — Continuously sense and process neuromuscular signals; continue to capture and process images/video(s) of environment S1410 — Detect person in environment? — No Yes S1412 — Perform processing to identify person in environment S1414 — Person identified? — No Yes

System
1600

SYSTEMS AND METHODS FOR CONTEXTUALIZED INTERACTIONS WITH AN ENVIRONMENT

CROSS-REFERENCE TO RELATED APPLICATIONS

This application is a Continuation of U.S. application Ser. No. 17/094,712 filed on Nov. 10, 2020, which claims priority to and the benefit of U.S. Provisional Patent Application No. 62/940,121, filed on Nov. 25, 2019, which application is incorporated by reference in its entirety herein.

FIELD OF THE INVENTION

The present technology relates generally to systems and methods that enable interactions with an environment in which an object may be controlled remotely. The environment may be a real-world environment or an extended reality (XR) environment, such as an augmented reality (AR) environment, a virtual reality (VR) environment, and/ or a mixed reality (MR) environment. More specifically, the present technology relates to systems and methods that enable a three-dimensional (3D) map of the environment to be generated, based on neuromuscular activities of a user, as well as systems and methods that utilize such a 3D map to enable a user to perform control operations in the environment via the user's neuromuscular activities, as well to perform interactions with objects and/or one or more other person(s) in the environment via the user's neuromuscular activities.

BACKGROUND

A real-world environment may be controlled remotely via so-called "Internet of Things" (IoT) technology. Typically, a controllable object (referred to as a "smart device" herein) is connected to a network, e.g., the Internet or a dedicated local-area network (LAN) of the environment, and is controlled via signals delivered to the smart device via the network, either wirelessly or via a hard-wired connection. Without physically touching the smart device, a user may control the smart device via an instruction inputted to a computer, a smartphone, a tablet, and the like, and/or via a voice command via, e.g., Ski® (Apple, Inc., Cupertino, California, US), Alexa® (Amazon.com, Inc., Seattle, Washington, US), and the like (collectively referred to as "Siri/ Alexa" herein). In order to input the instructions, a number of steps may be required to be performed in order to access a particular control interface so that the instructions may be inputted for the smart device. As will be appreciated, control of different smart devices may require different control interfaces to be accessed. Also as will be appreciated, voice instructions may be inconvenient where background noise (e.g., at a loud party) requires the voice command to be yelled in order to be picked up by Siri/Alexa, or where silence is desired (e.g., while recording a plano performance).

An XR environment provides users with an interactive experience of a real-world environment supplemented with virtual information, in which computer-generated perceptual or virtual information is overlaid on aspects of the real-world environment. Various techniques exist for controlling operations of an XR system used to produce the XR environment as well as for interacting with the XR environment. Current techniques for controlling operations of XR systems and/or interacting with XR environments have many flaws, so improved techniques are needed.

SUMMARY

According to aspects of the technology described herein, a computerized system for obtaining a 3D map is provided. The system comprises: a plurality of neuromuscular sensors; at least one camera; and at least one computer processor. The plurality of neuromuscular sensors may be configured to sense neuromuscular signals from a user, and may be arranged on at least one wearable device structured to be worn by the user to obtain the neuromuscular signals. The at least one camera may be configured to capture information about objects in an environment. The at least one computer processor may be coupled to a memory and may be programmed to: generate a 3D map of the environment based on the information captured by the at least one camera, and cause the 3D map to be stored in the memory. The 3D map may comprise information identifying the objects in the environment. For example, the identified objects may be smart devices. Methods and computer-readable storage media storing executable code for implementing the methods also are provided for these aspects.

According to aspects of the technology described herein, a computerized system for remote control of devices is provided. The system comprises: a plurality of neuromuscular sensors; at least one camera; and at least one computer processor. The plurality of neuromuscular sensors may be configured to sense neuromuscular signals from a user, and may be arranged on at least one wearable device structured to be worn by the user to obtain the neuromuscular signals. The at least one camera may be configured to capture information about an environment. The at least one computer processor may be programmed to access map information of the environment based on the information about the environment captured by the at least one camera. The map information may comprise information for controlling at least one controllable object in the environment. The at least one computer processor also may be programmed to, in response to a predetermined or targeted neuromuscular activity recognized from the neuromuscular signals sensed by the plurality of neuromuscular sensors, control the at least one controllable object to change from a first state to a second state. Methods and computer-readable storage media storing executable code for implementing the methods also are provided for these aspects.

According to aspects of the technology described herein, an electronic apparatus is provided. The apparatus comprises: a wearable carrier; a plurality of neuromuscular sensors attached to the carrier; a camera system; and at least one computer processor configured to communicate electronically with the plurality of neuromuscular sensors and the camera system.

According to aspects of the technology described herein, a computerized system for performing interactions is provided. The system comprises: a plurality of neuromuscular sensors, a camera system, and at least one computer processor. The plurality of neuromuscular sensors may be configured to sense neuromuscular signals from a user, and may be arranged on at least one wearable device worn by the user to obtain the neuromuscular signals. The camera system may be configured to capture information about an environment, and may comprise an imaging portion and a depth determination portion. The at least one computer processor may be programmed to: receive the captured information from the camera system and the neuromuscular signals from the plurality of neuromuscular sensors; recognize the environment from the captured information; access control information associated with the environment recognized from the captured information, the control information comprising information for performing at least one function associated with the environment; and, in response to a predetermined or targeted neuromuscular activity recognized from the neuromuscular signals, cause the at least one function to be performed. Methods and computer-readable storage media storing executable code for implementing the methods also are provided for these aspects.

It should be appreciated that all combinations of the foregoing concepts and additional concepts discussed in greater detail below (provided such concepts are not mutually inconsistent) are contemplated as being part of the inventive technology disclosed herein. Further, all combinations of the subject matter claimed at the end of this specification are contemplated as being part of the inventive technology disclosed herein.

BRIEF DESCRIPTION OF DRAWINGS

Various non-limiting embodiments of the technology are described below with reference to the following figures. It should be appreciated that the figures are not necessarily drawn to scale.

FIG. 11 shows a flowchart of a process in which neuromuscular signals and camera data are used to capture information of an environment to generate a 3D map of the environment, in accordance with some embodiments of the technology described herein;

FIG. 12 shows a flowchart of a process to generate a 3D map usable to control smart devices of an environment, in accordance with some embodiments of the technology described herein;

FIGS. 14A and 14B show a flowchart of a process in which neuromuscular signals and camera data are used to control interactions in an environment, including interactions with another person in the environment, in accordance with some embodiments of the technology described herein.

DETAILED DESCRIPTION

Figure 1:
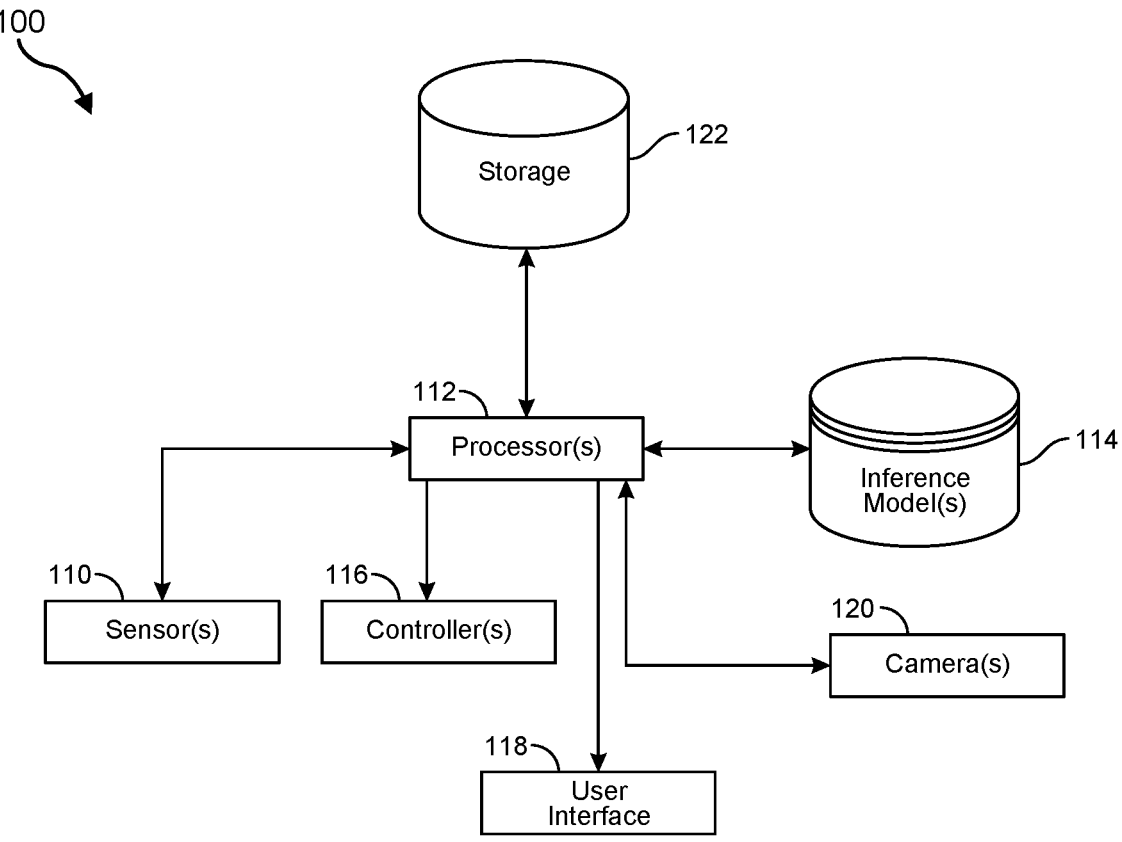
FIG. 1 is a block diagram of a computer-based system for processing sensor data and camera data, such as sensed signals obtained from neuromuscular sensors and image data obtained from a camera, in accordance with some embodiments of the technology described herein.

The present technology disclosed herein provides mapping systems and mapping methods that enable a user to create an electronic 3D map of an environment through a combination of neuromuscular sensing technology and imaging technology. A 3D map may be generated in which objects in the environment are mapped. As described below, the 3D map may include image information as well as location and depth information for the objects. The 3D map also may include additional information, e.g., information identifying which of the objects is a remotely controllable object, i.e., a smart device. The 3D map also may include self-identification information, in which an object in the environment may serve as a reference object for the environment and also may serve as a searchable object used to identify a 3D map corresponding to the environment.

In some embodiments of the present technology, the 3D map may be a map of a real-world environment, and may be employed to control one or more smart device(s) in the real-world environment via neuromuscular activities of a user. In some embodiments, the 3D map may comprise a map of an XR environment, and may include information regarding virtual objects as well as real-world objects in the XR environment.

The present technology also provides systems and methods that utilize a 3D map of an environment to enable a user to control or interact with one or more object(s) in the environment remotely via neuromuscular activities of the user. For example, in the case of a real-world environment that contains a plurality of objects, certain neuromuscular activities of the user (e.g., a pointing of a finger of the user, a closing of a hand of the user to form a fist, a turning of a wrist of the user, etc.) may be targeted or used to select a smart device to be controlled (e.g., a remotely controllable window shade), and also may be used to control the smart device (e.g., to raise or lower the window shade).

In another example, a 3D map of an environment may be used with a XR-based system, described below, such that the environment is an XR environment. The XR environment may be an AR environment, or a VR environment, or an MR environment, or any other type of environment that enables a user to experience aspects of a real-world environment in combination with aspects of a virtual environment. In the XR environment, the user may interact with a virtual object (e.g., paint on a virtual canvas) and also may interact with a real-world smart device (e.g., to adjust the remotely controllable window shade) via certain neuromuscular activities. In some embodiments, the user may interact with another person, in the real-world environment or in the XR environment, via neuromuscular activities performed by the user.

In some embodiments of the present technology, neuromuscular signals corresponding to neuromuscular activity of the user may be sensed by one or more wearable sensors worn by the user, as described in more detail below. The neuromuscular signals may be used to determine information about the user's desired remote interaction with one or more object(s) in the environment. As mentioned above, the environment may be a real-world one or one generated by an XR-based system, or a combination of both. Such neuromuscular signals may also be referred to as "sensed signals" herein. Sensed signals may be used directly as an input to a control system for the environment (e.g., by using motor-unit action potentials as an input signal) and/or the sensed signals may be processed (including by using an inference model as described herein) for the purpose of determining a movement, a force, and/or a position of a part of the user's body (e.g., fingers, hand, wrist, etc.).

For example, neuromuscular signals obtained by neuromuscular sensors arranged on a wearable device worn by the user may be used to determine a force (e.g., a grasping force) applied by the user to a physical object. A number of muscular activation states of the user may be identified from the sensed signals and/or from information derived from the sensed signals, to provide an improved user experience in the environment. The muscular activation states may include, but are not limited to, a static gesture or pose performed by the user, a dynamic gesture or motion performed by the user, a sub-muscular activation state of the user, a muscular tensing or relaxation performed by the user, or any combination of the foregoing. The user's interaction with one or more object(s) in the environment can take many forms, including but not limited to: selection of one or more object(s), control of one or more object(s), activation or deactivation of one or more object(s), adjustment of settings or features relating to one or more object(s), etc. The user's interaction(s) may also be with another person in the environment.

As will be appreciated, the user's interaction may take other forms enabled by the control system for the environment, and need not be the interactions specifically listed herein. For instance, a control operation performed in the environment may include control based on activation of one or more individual motor units, e.g., control based on a sensed or detected sub-muscular activation state of the user, such as a sensed tensing of a muscle.

It should be understood that the phrases "sensed", "detected", "obtained", "collected", "sensed and recorded", "measured", "recorded", and the like, when used herein in conjunction with a sensed signal from a neuromuscular sensor comprises a signal detected by the sensor. Also as will be appreciated, a sensed signal may be stored in a nonvolatile memory before being processed, or processed before being stored in the nonvolatile memory. A sensed signal may be cached before being processed. For example, after detection, the sensed signal may be stored in a memory of the neuromuscular sensor "as-detected" (i.e., raw), or the sensed signal may undergo processing at the neuromuscular sensor prior to storage of the sensed signal and/or storage of a processed signal in the memory of the neuromuscular sensor, or the sensed signal may be communicated (e.g., via a wireless technology, a direct wired connection, and/or other know communication technologies) to an external device for processing and/or storage, or any combination of the foregoing. Optionally, the sensed signal may be processed and utilized without storage in a nonvolatile memory.

Identification of one or more muscular activation state(s) of the user may allow a layered or multi-level approach to interacting remotely with an object in the environment. For instance, in an XR environment, at a first layer/level, one muscular activation state may indicate that the user is interacting with or intends to interact with an object (e.g., a window shade of a window); at a second layer/level, another muscular activation state may indicate a desired control operation (e.g., to open the window shade); at a third layer/level, yet another activation state may indicate that the user wants to activate a set of virtual controls and/or features for the object (e.g., a set of virtual scenery images for different seasons to appear on panes of the window); and at a fourth layer/level, yet another muscular activation state may indicate which of the activated set of virtual controls and/or features the user wants to use when interacting with the object (e.g., virtual scenery images for summer). It should be appreciated that any number of muscular activation states and layers may be used without departing from the scope of this disclosure. For example, in some embodiments, one or more muscular activation state(s) may correspond to a concurrent gesture based on activation of one or more motor units, e.g., the user's hand bending at the wrist while pointing the index finger at the object. In some embodiments, one or more muscular activation state(s) may correspond to a sequence of gestures based on activation of one or more motor units, e.g., the user's hand grasping the object and lifting the object. In some embodiments, a single muscular activation state may both indicate a user's desire to interact with an object and to activate a set of controls and/or features for interacting with the object.

As an example, neuromuscular sensors may sense signals for neuromuscular activities of the user. The sensed signals may be inputted to a computer processor of the control system, which may identify or detect a first muscular activation state of the user using, for example, a trained inference model, as discussed below. The first muscular activation state may correspond to, e.g., a first gesture performed by the user, and may indicate that the user is interacting with or intends to interact with a particular object (e.g., a lamp) in the environment. Optionally, in response to the detecting the first muscular activation state, feedback may be provided to identify the interaction with the object indicated by the first muscular activation state. The neuromuscular sensors may continue to sense signals for neuromuscular activity of the user, and a second muscular activation state may be determined from the sensed signals. Responsive to identifying the second muscular activation state (e.g., corresponding to a second gesture, which may be the same as or different from the first gesture), the control system may activate a set of virtual controls for the object (e.g., controls for turning the lamp on or off, selecting a lamplight brightness level, selecting a lamplight color, etc.). The neuromuscular sensors may continue to sense signals for neuromuscular activity of the user, and a third muscular activation state may be determined, and so on.

In some embodiments of the present technology, muscular activation states may be identified, at least in part, from raw (e.g., unprocessed) sensor signals collected by one or more wearable sensor(s). In some embodiments, muscular activation states may be identified, at least in part, from information based on or derived from raw sensor signals (e.g., processed sensor signals), where the raw sensor signals collected by the one or more of the wearable sensor(s) are processed using one or more technique(s), e.g., amplification, filtering, rectification, and/or other forms of signal processing. In some embodiments, muscular activation states may be identified, at least in part, from one or more output(s) of a trained inference model that receives the sensor signals (raw or processed versions of the sensor signals) as inputs.

In some embodiments of the present technology, muscular activation states of a user, as determined based on sensed signals in accordance with one or more techniques described herein, may be used to interact with one or more object(s) in an environment without requiring the user to rely on cumbersome, inefficient, and/or inconvenient input devices. For example, sensor data (e.g., sensed signals or data derived from such signals) may be obtained from neuromuscular sensors worn by or mounted on the user, and muscular activation states may be identified from the sensor data without the user having to carry a controller and/or other input device(s), and without having the user remember complicated button or key manipulation sequences. Also, the identification of the muscular activation states (e.g., poses, gestures, etc.) from the sensor data can be performed relatively fast, thereby reducing response times and latency associated with issuing control signals to the control system, thus enabling the user to have real-time or nearly real-time interactions in the environment.

As mentioned above, sensed signals obtained by neuromuscular sensors placed at locations on the user's body may be provided as input(s) to one or more inference model(s) trained to generate spatial information for rigid segments of a multi-segment articulated rigid-body model of a human body (i.e., a model of a human musculoskeletal system). The spatial information may include, for example, position information of one or more segments, orientation information of one or more segments, joint angles between segments, and the like. All or portions of the human musculo skeletal system can be modeled as a multi-segment articulated rigid body system, with joints forming the interfaces between the different segments, and with joint angles defining the spatial relationships between connected segments in the model. Based on the input(s), and as a result of training, the inference model(s) may implicitly represent inferred motion of the articulated rigid body under defined movement constraints. The trained inference model(s) may output data useable for applications such as applications for rendering a representation of the user's body, or a portion thereof, in an XR game environment, and/or applications that utilize certain muscular activation states to control smart devices in a real-world environment.

For instance, movement data obtained by a single movement sensor positioned on the user (e.g., on the user's wrist or arm) may be provided as input data to a trained inference model. Corresponding output data generated by the trained inference model may be used to determine spatial information for one or more segments of a multi-segment articulated rigid-body model for the user. For example, the output data may be used to determine the position and/or the orientation of the user's upper arm segment and lower arm segment, which are connected by an elbow joint. The output data may be used to determine an angle between these two connected segments via the multi-segment articulated rigid-body model for the user. Different types of sensors may be used to provide input data to a trained inference model, as discussed below.

In some embodiments of the present technology, sensed signals provided to one or more trained inference model(s) may determine that the user is standing with an outstretched forearm pointing forward. The trained inference model(s) also may determine that a finger of the outstretched forearm has moved from a relaxed bent position to a flexed and pointing position, or that a wrist of the outstretched arm has bent upward or downward, or that the outstretched forearm has rotated clockwise or counterclockwise, etc. As discussed below, muscular activation states identified from the sensed signals may be used in conjunction with a 3D map of an environment to enable the user to, e.g., enter the environment and interact with a smart device remotely via neuromuscular signals. Further, as will be discussed below, by orienting the user in the environment (e.g., via locating a reference object in the environment relative to the user), the user may control and/or interact with a plurality of different smart devices individually (e.g., by using a finger to point at a smart-device window shade in the environment and bending the wrist upward to open the window shade) or collectively (e.g., by using a finger to point at one of several smart-device lamps in the environment and performing a pinching motion with two or more fingers to dim all of the lamps in the environment). As will be appreciated, the output data from the trained inference model(s) may be used for applications other than those specifically identified herein.

In some embodiments of the present technology, various muscular activation states may be identified directly from sensed signals. In other embodiments, as discussed above, muscular activation states, which may comprise handstates (described below), gestures, postures, and the like, may be identified based, at least in part, on results from processing the sensed signals using one or more trained inference model(s). For example, the trained inference model(s) may output motor-unit or muscle activations and/or position, orientation, and/or force estimates for segments of a computer-generated musculoskeletal model. As used herein, the term "gestures" may refer to a static or dynamic configuration of one or more body parts including a position of the one or more body parts and forces associated with the configuration. For example, gestures may include discrete gestures, such as placing or pressing the palm of a hand down on a solid surface or grasping a ball, continuous gestures, such as waving a finger back and forth, grasping and throwing a ball, or a combination of discrete and continuous gestures. Gestures may include covert gestures that may be imperceptible to another person, such as slightly tensing a joint by cocontracting opposing muscles or using sub-muscular activations. In training an inference model, gestures may be defined using an application configured to prompt a user to perform the gestures or, alternatively, gestures may be arbitrarily defined by a user. The gestures performed by the user may include symbolic gestures (e.g., gestures mapped to other gestures, interactions, or commands, for example, based on a gesture vocabulary that specifies the mapping). In some cases, hand and arm gestures may be symbolic and used to communicate according to cultural standards.

In some embodiments of the present technology, sensed signals may be used to predict information about a position and/or a movement of a portion of a user's arm and/or the user's hand, which may be represented as a multi-segment articulated rigid-body system with joints connecting the multiple segments of the rigid-body system. For example, in the case of a hand movement, sensed signals obtained by neuromuscular sensors placed at locations on the user's body (e.g., the user's arm and/or wrist) may be provided as input to an inference model trained to predict estimates of the position (e.g., absolute position, relative position, orientation) and the force(s) associated with a plurality of rigid segments in a computer-based musculoskeletal representation associated with a hand when the user performs one or more hand movements. The combination of position information and force information associated with segments of a musculoskeletal representation associated with a hand may be referred to herein as a "handstate" of the musculoskeletal representation. As a user performs different movements, a trained inference model may interpret neuromuscular signals as position and force estimates (handstate information) that may be output as control signals to control or interact with a smart device in the environment or with another person in the environment. Because the user's neuromuscular signals may be continuously sensed, the user's handstate may be updated in real time and a visual representation of the user's hand (e.g., within an XR environment) may be rendered in real time based on current estimates of the user's handstate. As will be appreciated, an estimate of the user's handstate may be used to determine a gesture being performed by the user and/or to predict a gesture that the user will perform.

Constraints on movement at a joint are governed by the type of joint connecting the segments and the biological structures (e.g., muscles, tendons, ligaments) that may restrict the range of movement at the joint. For example, a shoulder joint connecting the upper arm segment to a torso of a human subject, and a hip joint connecting an upper leg segment to the torso, are ball and socket joints that permit extension and flexion movements as well as rotational movements. In contrast, an elbow joint connecting the upper arm segment and a lower arm segment (or forearm), and a knee joint connecting the upper leg segment and a lower leg segment of the human subject, allow for a more limited range of motion. In this example, a multi-segment articulated rigid body system may be used to model portions of the human musculoskeletal system. However, it should be appreciated that although some segments of the human musculoskeletal system (e.g., the forearm) may be approximated as a rigid body in the articulated rigid body system, such segments may each include multiple rigid structures (e.g., the forearm may include ulna and radius bones), which may enable more complex movements within the segment that may not be explicitly considered by the rigid body model. Accordingly, a model of an articulated rigid body system for use with some embodiments of the technology described herein may include segments that represent a combination of body parts that are not strictly rigid bodies. It will be appreciated that physical models other than the multi-segment articulated rigid body system discussed herein may be used to model portions of the human musculoskeletal system without departing from the scope of this disclosure.

Continuing with the example above, in kinematics, rigid bodies are objects that exhibit various attributes of motion (e.g., position, orientation, angular velocity, acceleration). Knowing the motion attributes of one segment of a rigid body enables the motion attributes for other segments of the rigid body to be determined based on constraints in how the segments are connected. For example, the hand may be modeled as a multi-segment articulated body, with joints in the wrist and each finger forming interfaces between the multiple segments in the model. In some embodiments, movements of the segments in the rigid body model can be simulated as an articulated rigid body system in which position (e.g., actual position, relative position, or orientation) information of a segment relative to other segments in the model are predicted using a trained inference model.

For some embodiments of the present technology, the portion of the human body approximated by a musculoskeletal representation may be a hand or a combination of a hand with one or more arm segments. As mentioned above, the information used to describe a current state of the positional relationships between segments, force relationships for individual segments or combinations of segments, and muscle and motor unit activation relationships between segments, in the musculoskeletal representation is referred to as the handstate of the musculoskeletal representation. It should be appreciated, however, that the techniques described herein are also applicable to musculoskeletal representations of portions of the body other than the hand, including, but not limited to, an arm, a leg, a foot, a torso, a neck, or any combination of the foregoing.

In addition to spatial (e.g., position and/or orientation) information, some embodiments of the present technology enable a prediction of force information associated with one or more segments of the musculoskeletal representation. For example, linear forces or rotational (torque) forces exerted by one or more segments may be estimated. Examples of linear forces include, but are not limited to, the force of a finger or hand pressing on a solid object such as a table, and a force exerted when two segments (e.g., two fingers) are pinched together. Examples of rotational forces include, but are not limited to, rotational forces created when a segment, such as in a wrist or a finger, is twisted or flexed relative to another segment. In some embodiments, the force information determined as a portion of a current handstate estimate includes one or more of pinching force information, grasping force information, and information about co-contraction forces between muscles represented by the musculoskeletal representation. In some embodiments, force information may be used to set of speed for controlling a smart device. For instance, in the previous example of a window shade, a light touching of two fingers may be used as an instruction to close the window shade slowly, whereas a more forceful or strong pinching of the two fingers may be used as an instruction to close the window shade quickly.

Turning now to the figures, FIG. 1 schematically illustrates a system 100 (e.g., a neuromuscular activity system), in accordance with some embodiments of the technology described herein. The system 100 may comprise one or more sensor(s) 110 configured to sense signals resulting from activation of motor units within one or more portion(s) of a human body. The sensor(s) 110 may include one or more neuromuscular sensor(s) configured to sense signals arising from neuromuscular activities in skeletal muscle of a human body. The term "neuromuscular activity" as used herein refers to neural activation of spinal motor neurons or units that innervate a muscle, muscle activation, muscle contraction, or any combination of the neural activation, muscle activation, and muscle contraction. The one or more neuromuscular sensor(s) may include one or more electromyography (EMG) sensors, one or more mechanomyography (MMG) sensors, one or more sonomyography (SMG) sensors, a combination of two or more types of EMG sensors, MMG sensors, and SMG sensors, and/or one or more sensors of any suitable type able to detect neuromuscular signals. In some embodiments, information relating to an interaction of a user in an environment corresponding to a 3D map may be determined from neuromuscular signals sensed by the one or more neuromuscular sensor(s). Spatial information (e.g., position and/or orientation information) and force information relating to movement (readily visible or covert) may be predicted based on the sensed signals as the user interacts with the environment over time. In some embodiments, the neuromuscular sensor(s) may sense muscular activity related to movement caused by external objects, for example, movement of the user's hand being pushed by an external object.

The sensor(s) 110 may include one or more auxiliary sensor(s), such as one or more Inertial Measurement Unit(s) or IMU(s), which measure a combination of physical aspects of motion, using, for example, an accelerometer, a gyroscope, a magnetometer, or any combination of one or more accelerometers, gyroscopes and magnetometers. In some embodiments of the present technology, one or more IMU(s) may be used to sense data about movement of the part of the user's body on which the IMU(s) is or are attached, and information derived from the sensed IMU data (e.g., position and/or orientation information) may be tracked as the user moves over time. For example, one or more IMU(s) may be used to track movements of portions (e.g., arms, legs) of the user's body proximal to the user's torso relative to the IMU(s) as the user moves over time.

In embodiments that include at least one IMU and one or more neuromuscular sensor(s), the IMU(s) and the neuromuscular sensor(s) may be arranged to detect movement of different parts of a human body. For example, the IMU(s) may be arranged to detect movements of one or more body segments proximal to the user's torso (e.g., movements of an upper arm), whereas the neuromuscular sensors may be arranged to detect motor unit activity within one or more body segments distal to the user's torso (e.g., movements of a lower arm (forearm) or a wrist). It should be appreciated, however, that the sensors (i.e., the IMU(s) and the neuromuscular sensor(s)) may be arranged in any suitable way, and embodiments of the technology described herein are not limited based on any particular sensor arrangement. For example, in some embodiments, at least one IMU and a plurality of neuromuscular sensors may be co-located on a body segment of the user to track motor-unit activity and/or movements of the body segment using different types of measurements. In one implementation, an IMU and a plurality of EMG sensors may be arranged on a wearable device structured to be worn around the lower arm or the wrist of the user. In such an arrangement, the IMU may be configured to track, over time, movement information (e.g., positioning and/or orientation) associated with one or more arm segments, to determine, for example, whether the user has raised or lowered his/her arm, whereas the EMG sensors may be configured to determine finer-grained or more subtle movement information and/or sub-muscular information associated with activation of muscular or sub-muscular structures in muscles of the wrist and/or the hand.

As the tension of a muscle increases during performance of a motor task, the firing rates of active neurons increases and additional neurons may become active, which is a process that may be referred to as motor-unit recruitment. The pattern by which neurons become active and increase their firing rate is stereotyped, such that expected motor-unit recruitment patterns, may define an activity manifold associated with standard or normal movement. In some embodiments of the present technology, sensed signals may identify activation of a single motor unit or a group of motor units that are "off-manifold," in that the pattern of motor-unit activation is different from an expected or typical motor-unit recruitment pattern. Such off-manifold activation may be referred to herein as "sub-muscular activation" or "activation of a sub-muscular structure," where a sub-muscular structure refers to the single motor unit or the group of motor units associated with the off-manifold activation. Examples of off-manifold motor-unit recruitment patterns include, but are not limited to, selectively activating a higher-threshold motor unit without activating a lower-threshold motor unit that would normally be activated earlier in the recruitment order, and modulating the firing rate of a motor unit across a substantial range without modulating the activity of other neurons that would normally be co-modulated in typical motor-unit recruitment patterns. In some embodiments, one or more neuromuscular sensor(s) may be arranged relative to the user's body and used to sense sub-muscular activations without observable movement, i.e., without a corresponding movement of the user's body that can be readily observed. Sub-muscular activation may be used, at least in part, to interact with objects in a real-world environment as well as an XR environment, in accordance with some embodiments of the present technology.

Some or all of the sensor(s) 110 may each include one or more sensing components configured to sense information about the user. In the case of IMUs, the sensing component(s) of an IMU may include any one or any combination of: an accelerometer, a gyroscope, a magnetometer, which may be used to measure or sense characteristics of body motion of the user, examples of which include, but are not limited to, acceleration, angular velocity, and a magnetic field around the user's body during the body motion. In the case of neuromuscular sensors, the sensing component(s) may include, but are not limited to, electrodes that detect electric potentials on the surface of the body (e.g., for EMG sensors), vibration sensors that measure skin surface vibrations (e.g., for MMG sensors), acoustic sensing components that measure ultrasound signals (e.g., for SMG sensors) arising from muscle activity, or any combination thereof. Optionally, the sensor(s) 110 may include any one or any combination of: a thermal sensor that measures the user's skin temperature (e.g., a thermistor); a cardio sensor that measures the user's pulse and/or heart rate, a moisture sensor that measures the user's state of perspiration, and the like. Exemplary sensors that may be used as part of the one or more sensor(s) 110, in accordance with some embodiments of the technology disclosed herein, are described in more detail in U.S. Pat. No. 10,409,371 entitled "METHODS AND APPARATUS FOR INFERRING USER INTENT BASED ON NEURO-MUSCULAR SIGNALS," which is incorporated by reference herein.

In some embodiments, the one or more sensor(s) 110 may comprise a plurality of sensors 110, and at least some of the plurality of sensors 110 may be arranged as a portion of a wearable device structured to be worn on or around a part of the user's body. For example, in one non-limiting example, an IMU and a plurality of neuromuscular sensors may be arranged circumferentially on an adjustable band (e.g., an elastic band), such as a wristband or an armband structured to be worn around the user's wrist or arm, as described in more detail below. In some embodiments, multiple wearable devices, each having one or more IMU(s) and/or one or more neuromuscular sensor(s) included thereon, may be used to determine information relating to an interaction of the user with an object based on activation from sub-muscular structures and/or based on movement(s) that involve multiple parts of the user's body. Alternatively, at least some of the plurality of sensors 110 may be arranged on a wearable patch structured to be affixed to a portion of the user's body.

Figure 2A:
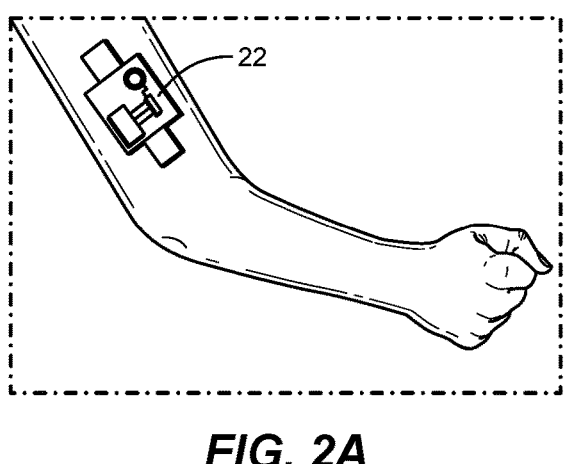
FIG. 2A-2D schematically illustrate patch type wearable systems with sensor electronics incorporated thereon, in accordance with some embodiments of the technology described herein.
Figure 2B:
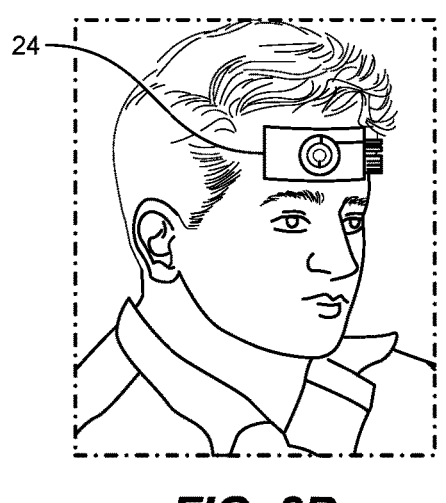
Figure 2C:
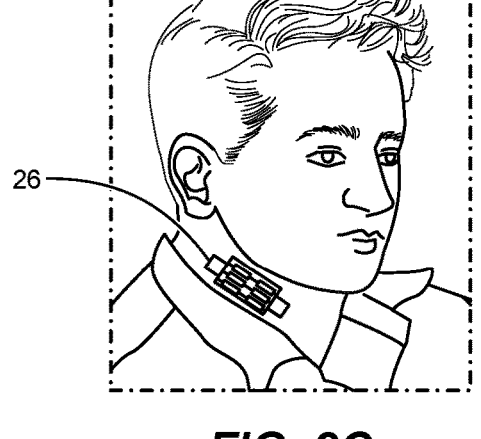
Figure 2D:
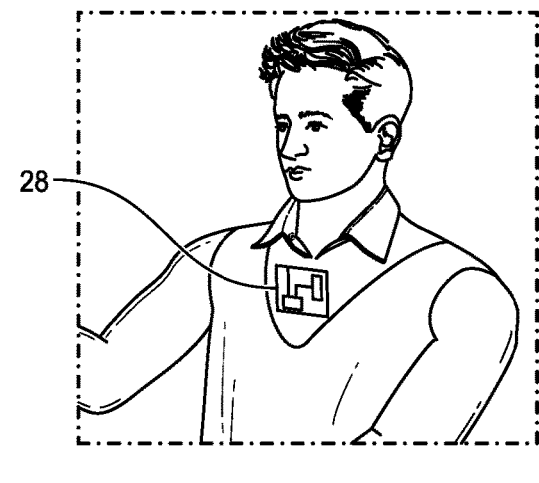

FIGS. 2A-2D show various types of wearable patches. FIG. 2A shows a wearable patch 22 in which circuitry for an electronic sensor may be printed on a flexible substrate that is structured to adhere to an arm, e.g., near a vein to sense blood flow in the user. The wearable patch 22 may be an RFID-type patch, which may transmit sensed information wirelessly upon interrogation by an external device. FIG. 2B shows a wearable patch 24 in which an electronic sensor may be incorporated on a substrate that is structured to be worn on the user's forehead, e.g., to measure moisture from perspiration. The wearable patch 24 may include circuitry for wireless communication, or may include a connector structured to be connectable to a cable, e.g., a cable attached to a helmet, a heads-mounted display, or another external device. The wearable patch 24 may be structured to adhere to the user's forehead or to be held against the user's forehead by, e.g., a headband, skullcap, or the like. FIG. 2C shows a wearable patch 26 in which circuitry for an elec-tronic sensor may be printed on a substrate that is structured to adhere to the user's neck, e.g., near the user's carotid artery to sense flood flow to the user's brain. The wearable patch 26 may be an RFID-type patch or may include a connector structured to connect to external electronics. FIG. 2D shows a wearable patch 28 in which an electronic sensor may be incorporated on a substrate that is structured to be worn near the user's heart, e.g., to measure the user's heartrate or to measure blood flow to/from the user's heart. As will be appreciated, wireless communication is not limited to RFID technology, and other communication tech-nologies may be employed. Also, as will be appreciated, the sensor(s) 110 may be incorporated on other types of wear-able patches that may be structured differently from those shown in FIGS. 2A-2D.

Figure 3:
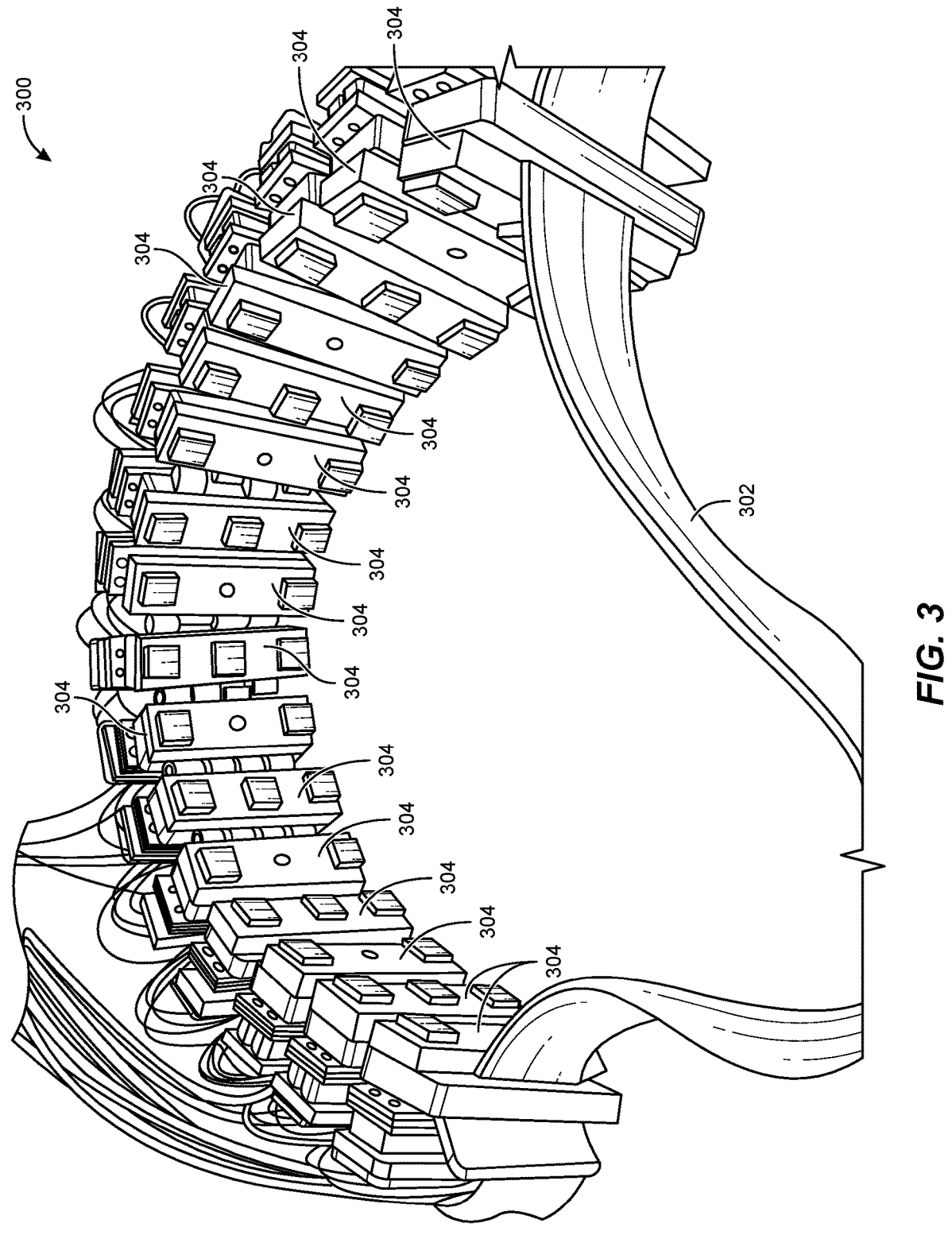
FIG. 3 illustrates a wearable system with neuromuscular sensors arranged on an adjustable belt, in accordance with some embodiments of the technology described herein.

In some embodiments of the present technology, the sensor(s) 110 may include sixteen neuromuscular sensors arranged circumferentially around a band (e.g., an elastic band, an adjustable belt, etc.) structured to be worn around the user's lower arm (e.g., encircling the user's forearm). For example, FIG. 3 shows an embodiment of a wearable system 300 in which neuromuscular sensors 304 (e.g., EMG sensors) are arranged on an adjustable belt 302. It should be appreciated that any suitable number of neuromuscular sensors may be used, and the number and arrangement of neuromuscular sensors used may depend on the particular application for which the wearable system 300 is used. For example, a wearable armband or wristband may be used to sense information for controlling a robot, controlling a vehicle, scrolling through text, controlling a virtual avatar, or any other suitable control task. In some embodiments, the adjustable belt 302 may also include one or more IMU(s) (not shown).

Figures 4A, 4B:
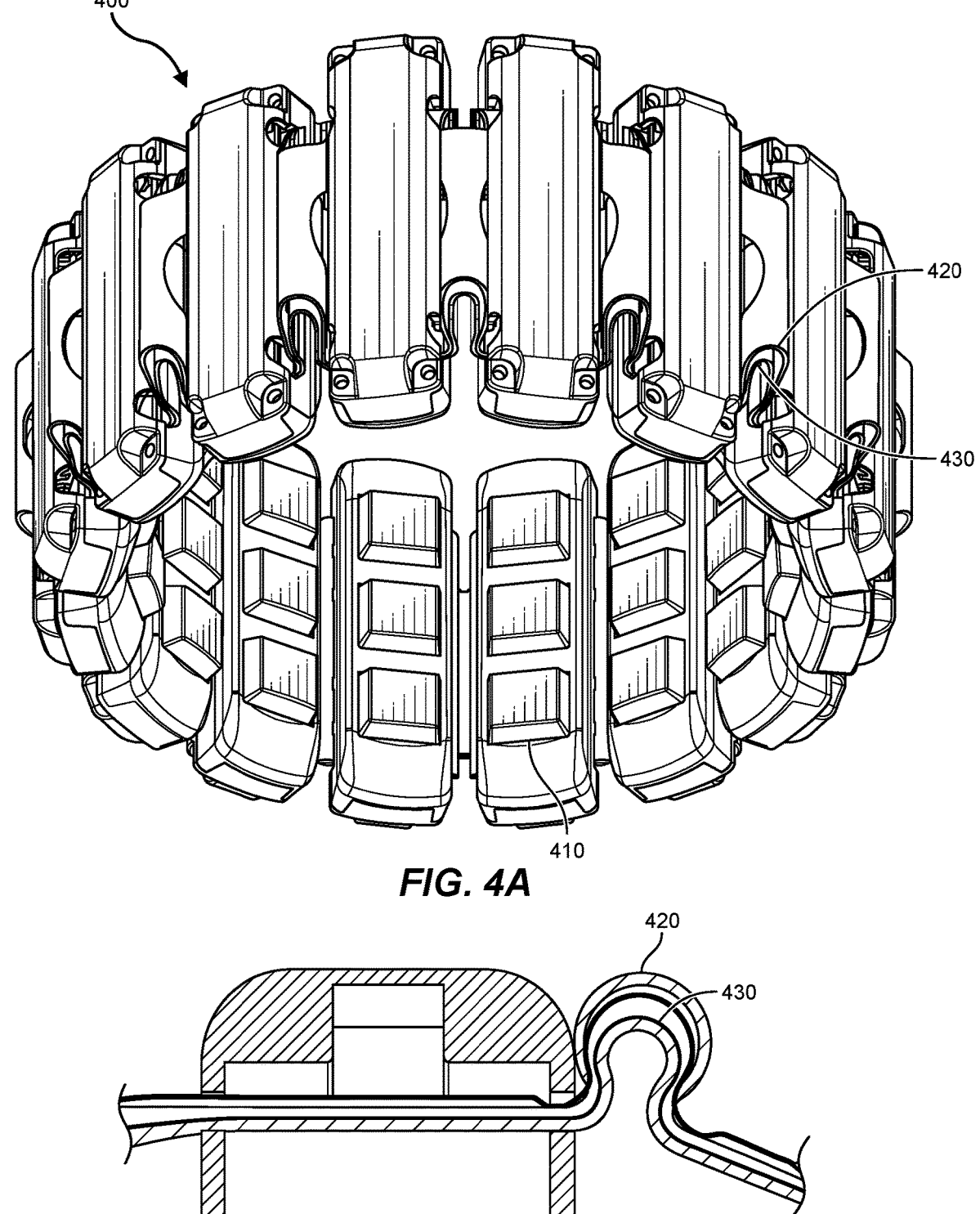
FIG. 4A illustrates a wearable system with sixteen neuromuscular sensors arranged circumferentially around a band, in accordance with some embodiments of the technology described herein.
FIG. 4B is a cross-sectional view through one of the sixteen neuromuscular sensors illustrated in FIG. 4A.

FIGS. 4A, 4B, 5A, and 5B show other embodiments of a wearable system of the present technology. In particular, FIG. 4A illustrates a wearable system 400 that includes a plurality of sensors 410 arranged circumferentially around an elastic band 420 structured to be worn around the user's lower arm or wrist. The sensors 410 may be neuromuscular sensors (e.g., EMG sensors). As shown, there may be sixteen sensors 410 arranged circumferentially around the elastic band 420 at a regular spacing. It should be appreciated that any suitable number of the sensors 410 may be used, and the spacing need not be regular. The number and arrangement of the sensors 410 may depend on the particular application for which the wearable system is used. For instance, the number and arrangement of the sensors 410 may differ when the wearable system is to be worn on a wrist in comparison with a thigh. As mentioned above, the wearable system (e.g., armband, wristband, thighband, etc.) can be used to sense information for controlling a robot, controlling a vehicle, scrolling through text, controlling a virtual avatar, and/or performing any other suitable control task.

In some embodiments of the present technology, the sensors 410 may include only a set of neuromuscular sensors (e.g., EMG sensors). In other embodiments, the sensors 410 may include a set of neuromuscular sensors and at least one auxiliary device. The auxiliary device(s) may be configured to continuously or intermittently collect one or a plurality of auxiliary signal(s). Examples of auxiliary devices include, but are not limited to, IMUs, microphones, imaging devices (e.g., cameras), radiation-based sensors for use with a radia-tion-generation device (e.g., a laser-scanning device), heart-rate monitors, and other types of devices, which may capture the user's condition or other characteristics of the user. As shown in FIG. 4A, the sensors 410 may be coupled together using flexible electronics 430 incorporated into the wearable system. FIG. 4B illustrates a cross-sectional view through one of the sensors 410 of the wearable system shown in FIG. 4A.

In some embodiments of the present technology, the output(s) of one or more of sensing component(s) of the sensors 410 can be optionally processed using hardware signal-processing circuitry (e.g., to perform amplification, filtering, and/or rectification). In other embodiments, at least some signal processing of the output(s) of the sensing component(s) can be performed using software. Thus, signal processing of sensed signals detected by the sensors 410 can be performed by hardware or by software, or by any suitable combination of hardware and software, as aspects of the technology described herein are not limited in this respect. A non-limiting example of a signal-processing procedure used to process recorded data from the sensors 410 is discussed in more detail below in connection with FIGS. 5A and 5B.

Figure 5:
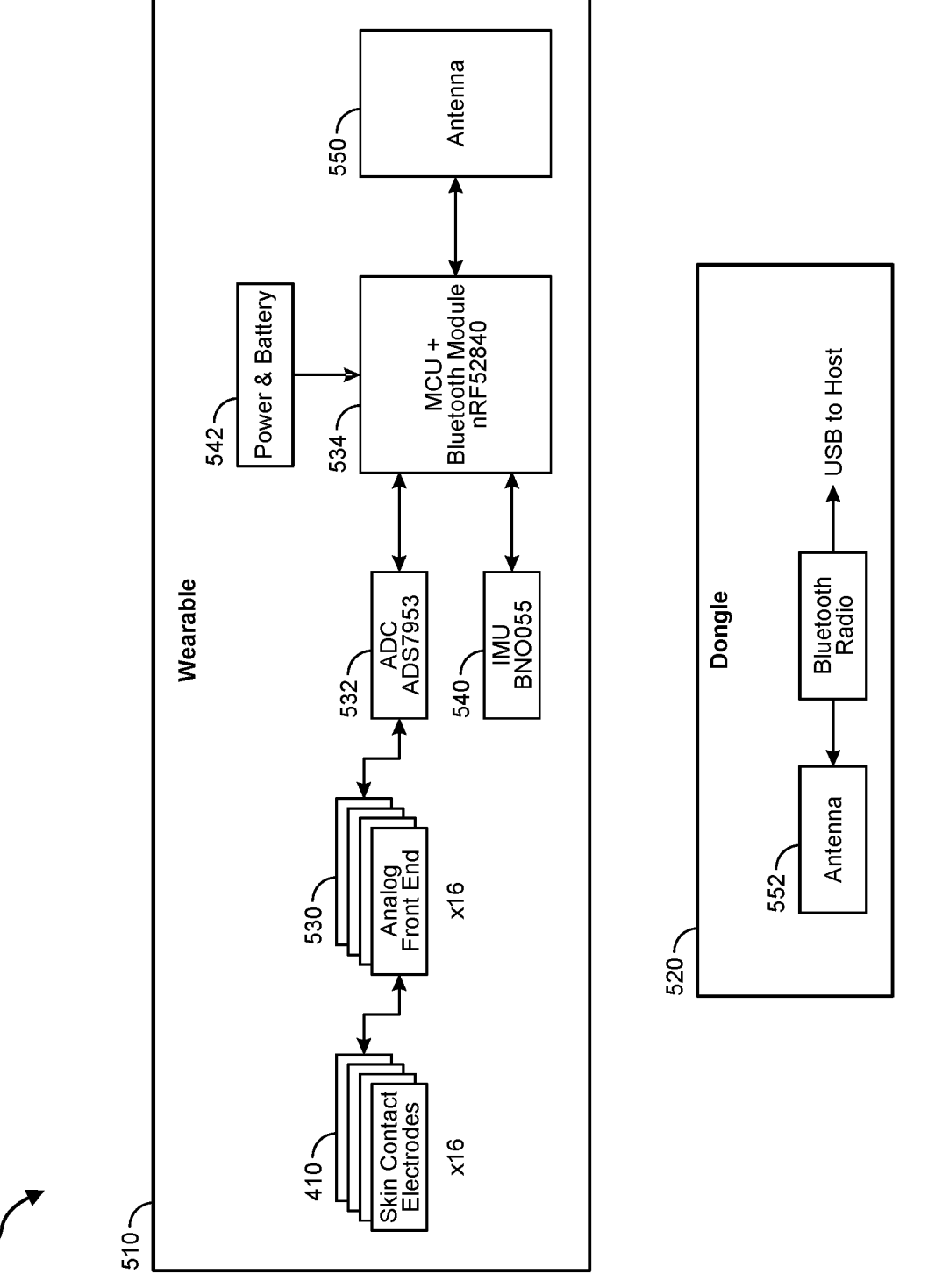
FIG. 5 is a block diagram illustrating components of a computer-based system that includes a wearable portion and a dongle portion, in accordance with some embodiments of the technology described herein.

FIG. 5 is a block diagram illustrating internal components of a wearable system 500 with sixteen sensors (e.g., EMG sensors), in accordance with some embodiments of the technology described herein. As shown, the wearable system 500 includes a wearable portion 510 and a dongle portion 520. Although not specifically illustrated, the dongle portion 520 is in communication with the wearable portion 510 (e.g., via Bluetooth or another suitable short-range wireless com-munication technology). The wearable portion 510 may include the sensors 410, examples of which are described above in connection with FIGS. 4A and 4B. The sensors 410 provide output (e.g., sensed signals) to an analog front end 530, which perform analog processing (e.g., noise reduction, filtering, etc.) on the sensed signals. Processed analog sig-nals produced by the analog front end 530 are then provided to an analog-to-digital converter 532, which converts the processed analog signals to digital signals that can be processed by one or more computer processor(s). An example of a computer processor that may be used in accordance with some embodiments is a microcontroller (MCU) 534. The MCU 534 may also receive inputs from other sensors (e.g., an IMU 540) and from a power and battery module 542. As will be appreciated, the MCU 534 may receive data from other devices not specifically shown. A processing output by the MCU 534 may be provided to an antenna 550 for transmission to the dongle portion 520.

The dongle portion 920 includes an antenna 952 that communicates with the antenna 550 of the wearable portion 510. Communication between the antennas 550 and 552 may occur using any suitable wireless technology and protocol, non-limiting examples of which include radiofrequency signaling and Bluetooth. As shown, the signals received by the antenna 552 of the dongle portion 520 may be provided to a host computer for further processing, for display, and/or for effecting control of a particular object or objects (e.g., to perform a control operation in an environment for which smart devices and other controllable objects are identifiable in a 3D map of the environment). Although the examples provided with reference to FIGS. 4A, 4B, and 5 are discussed in the context of interfaces with EMG sensors, it is to be understood that the wearable systems described herein can also be implemented with other types of sensors, including, but not limited to, mechanomyography (MMG) sensors, sonomyography (SMG) sensors, and electrical impedance tomography (EIT) sensors.

Returning to FIG. 1, in some embodiments, sensed signals obtained by the sensor(s) 110 may be optionally processed to compute additional derived measurements, which may then be provided as input to an inference model, as mentioned above described in more detail below. For example, sensed signals obtained from an IMU may be processed to derive an orientation signal that specifies an orientation of a segment of a rigid body over time. The sensor(s) 110 may implement signal processing using components integrated with the sensing components of the sensor(s) 110, or at least a portion of the signal processing may be performed by one or more other component(s) in communication with, but not directly integrated with, the sensing components of the sensor(s) 110.

The system 100 also includes one or more computer processor(s) 112 programmed to communicate with the sensor(s) 110. For example, sensed signals obtained by one or more of the sensor(s) 110 may be output from the sensor(s) 110 (in raw form or in processed form, as discussed above) and provided to the processor(s) 112, which may be programmed to execute one or more machine-learning algorithm(s) to process the sensed signals. The algorithm(s) may process the sensed signals to train (or retrain) one or more inference model(s) 114, and the trained (or retrained) inference model(s) 114 may be stored for later use in generating selection signals and/or control signals for controlling an object in an environment of a 3D map, as described below. As will be appreciated, in some embodiments, the inference model(s) 114 may include at least one statistical model.

In some embodiments of the present technology, the inference model(s) 114 may include a neural network and, for example, may be a recurrent neural network. In some embodiments, the recurrent neural network may be a long short-term memory (LSTM) neural network. It should be appreciated, however, that the recurrent neural network is not limited to being an LSTM neural network and may have any other suitable architecture. For example, in some embodiments, the recurrent neural network may be any one or any combination of: a fully recurrent neural network, a gated recurrent neural network, a recursive neural network, a Hopfield neural network, an associative memory neural network, an Elman neural network, a Jordan neural network, an echo state neural network, and a second-order recurrent neural network, and/or another suitable type of recurrent neural network. In other embodiments, neural networks that are not recurrent neural networks may be used. For example, deep neural networks, convolutional neural networks, and/or feedforward neural networks may be used.

In some embodiments of the present technology, the inference model(s) 114 may produce discrete outputs. Discrete outputs (e.g., discrete classifications) may be used, for example, when a desired output is to know whether a particular pattern of activation (including individual neural spiking events) is detected in the sensed neuromuscular signals. For example, the inference model(s) 114 may be trained to estimate whether the user is activating a particular motor unit, activating a particular motor unit with a particular timing, activating a particular motor unit with a particular firing pattern, or activating a particular combination of motor units. On a shorter timescale, a discrete classification may be used in some embodiments to estimate whether a particular motor unit fired an action potential within a given amount of time. In such a scenario, these estimates may then be accumulated to obtain an estimated firing rate for that motor unit.

In embodiments in which an inference model is implemented as a neural network configured to output a discrete output (e.g., a discrete signal), the neural network may include an output layer that is a softmax layer, such that outputs of the inference model add up to one and may be interpreted as probabilities. For instance, outputs of the softmax layer may be a set of values corresponding to a respective set of control signals, with each value indicating a probability that the user wants to perform a particular control action. As one non-limiting example, the outputs of the softmax layer may be a set of three probabilities (e.g., 0.92, 0.05, and 0.03) indicating the respective probabilities that a detected pattern of activity is one of three known patterns. However, it should be appreciated that when an inference model is a neural network configured to output a discrete output (e.g., a discrete signal), the neural network is not required to produce outputs that add up to one. For example, instead of a softmax layer, the output layer of the neural network may be a sigmoid layer, which does not restrict the outputs to probabilities that add up to one. In such embodiments, the neural network may be trained with a sigmoid cross-entropy cost. Such an implementation may be advantageous in cases where, for example, multiple different control actions may occur within a threshold amount of time and it is not important to distinguish an order in which these control actions occur (e.g., a user may activate two patterns of neural activity within the threshold amount of time). It should be understood that any other suitable non-probabilistic multi-class classifier may be used, as aspects of the technology described herein are not limited in this respect.

In some embodiments of the present technology, an output of the inference model(s) 114 may be a continuous signal rather than a discrete output (e.g., a discrete signal). For example, the inference model(s) 114 may output an estimate of a firing rate of each motor unit, or the inference model(s) 114 may output a time-series electrical signal corresponding to each motor unit or sub-muscular structure.

It should be understood that aspects of the technology described herein are not limited to using neural networks, as other types of inference models may be employed in some embodiments. For example, in some embodiments, the inference model(s) 114 may comprise a hidden Markov model (HMM), a switching HMM in which switching allows for toggling among different dynamic systems, dynamic Bayesian networks, and/or another suitable graphical model having a temporal component. Any such inference model may be trained using sensed signals obtained by the sensor(s) 110.

As another example, in some embodiments, the inference model(s) 114 may be or may include a classifier that takes, as input, features derived from the sensed signals obtained by the sensor(s) 110. In such embodiments, the classifier may be trained using features extracted from the sensed signals. The classifier may be, e.g., a support vector machine, a Gaussian mixture model, a regression-based classifier, a decision tree classifier, a Bayesian classifier, and/or another suitable classifier, as the present technology is not limited in this respect. Input data to be provided to the classifier may be derived from the sensed signals in any suitable way. For example, the sensed signals may be analyzed as timeseries data using wavelet analysis techniques (e.g., continuous wavelet transform, discrete-time wavelet transform, etc.), Fourier-analytic techniques (e.g., short-time Fourier transform, Fourier transform, etc.), and/ or another suitable type of time-frequency analysis technique. As one non-limiting example, the sensed signals may be transformed using a wavelet transform, and the resulting wavelet coefficients may be provided as input data to the classifier.

In some embodiments of the present technology, values for parameters of the inference model(s) 114 may be estimated from training data. For example, when the inference model(s) 114 is or includes a neural network, parameters of the neural network (e.g., weights) may be estimated from the training data. In some embodiments, parameters of the inference model(s) 114 may be estimated using gradient descent, stochastic gradient descent, and/or another suitable iterative optimization technique. In embodiments where the inference model(s) 114 is or includes a recurrent neural network (e.g., an LSTM), the inference model(s) 114 may be trained using stochastic gradient descent and backpropagation through time. The training may employ a cross-entropy loss function and/or another suitable loss function, as aspects of the present technology are not limited in this respect.

The system 100 also may include one or more controller(s) 116. For example, the controller(s) 116 may include a display controller configured to display a visual representation (e.g., a representation of a hand) on a display device (e.g., a display monitor). As discussed herein, the one or more computer processor(s) 112 may implement one or more of the inference model(s) 114, which receive, as input, sensed signals obtained by the sensor(s) 110, and which provide, as output, information (e.g., predicted handstate information) that may be used to generate control signals that may be used to control, for example, a smart device or other controllable object in an environment defined by a 3D map.

The system 100 also may optionally include a user interface 118. Feedback determined based on the sensed signals obtained by the sensor(s) 110 and processed by the processor(s) 112 may be provided to the user via the user interface 118, to facilitate a user's understanding of how the system 100 is interpreting the user's muscular activity (e.g., an intended muscle movement). The user interface 118 may be implemented in any suitable way, including, but not limited to, an audio interface, a video interface, a tactile interface, and electrical stimulation interface, or any combination of the foregoing.

The system 100 may have an architecture that may take any suitable form. Some embodiments of the present technology may employ a thin architecture, in which the processor(s) 112 is or are included as a portion of a device separate from and in communication with the sensor(s) 110, which may be arranged on one or more wearable device(s). The sensor(s) 110 may be configured to wirelessly stream, in substantially real time, sensed signals (in raw or processed form) and/or information derived from the sensed signals to the processor(s) 112 for processing. The device separate from and in communication with the sensors(s) 110 may be, for example, any one or any combination of: a remote server, a desktop computer, a laptop computer, a smartphone, a wearable electronic device such as a smartwatch, a health monitoring device, smart glasses, an XR-based system, and a control system of an environment for which a 3D map may be used to identify smart devices and other controllable objects in the environment.

Some embodiments of the present technology may employ a thick architecture in which the processor(s) 112 may be integrated with the one or more wearable device(s) on which the sensor(s) 110 is or are arranged. In yet further embodiments, processing of sensed signals obtained by the sensor(s) 110 may be divided between multiple processors, at least one of which may be integrated with the sensor(s) 110, and at least one of which may be included as a portion of a device separate from and in communication with the sensor(s) 110. In such an implementation, the sensor(s) 110 may be configured to transmit at least some of the sensed signals to a first computer processor remotely located from the sensor(s) 110. The first computer processor may be programmed to train, based on the sensed signals transmitted to the first computer processor, at least one inference model of the inference model(s) 114. The first computer processor may be programmed to transmit the trained at least one inference model to a second computer processor integrated with the one or more wearable device(s) on which the sensor(s) 110 is or are arranged. The second computer processor may be programmed to determine information relating to an interaction between the user wearing the one or more wearable device(s) and an object in an environment of a 3D map using the trained at least one inference model transmitted from the first computer processor. In this way, the training process and a real-time process that utilizes the trained at least one inference model may be performed separately by using different processors.

In some embodiments of the present technology, the controller(s) 116 may instruct a computer application of an XR system that simulates an XR environment to provide a visual representation by displaying a virtual object. For example, the virtual object may be a character (e.g., an avatar), an imaginary image (e.g., a scene representing a desired season), a tool (e.g., a paintbrush). In one example, positioning, movement, and/or forces applied by portions of a virtual character within the XR environment may be displayed based on an output of the trained at least one inference model. The visual representation may be dynamically updated through use of continuously sensed signals obtained by the sensor(s) 110 and processed by the trained inference model(s) 114 to provide a computer-generated representation of the virtual character's movement that is updated in real-time.

Information obtained by or provided to the system 100, (e.g., inputs obtained from a camera, inputs obtained from the sensor(s) 110, etc.) can be used to improve user experience when the user interacts with in an environment of a 3D map, including accuracy of interactions and/or control operations, feedback, inference models, calibration functions, and other aspects of the system 100. To this end, for an XR environment generated by an XR system that operates with the system 100, the XR system may include at least one processor, at least one camera, and at least one display that provides XR information within a view of the user. The at least one display may be the user interface 118, a display interface provided to the user via AR glasses, or another viewing device viewable by the user. The system 100 may include system elements that couple the XR system with a computer-based system that generates musculoskeletal representations based on sensor data (e.g., sensed signals from at least one neuromuscular sensor). In some embodiments of the present technology, these systems may be incorporated as subsystems of the system 100. In other embodiments, these systems may be coupled via a special-purpose or other type of computer system that receives inputs from the XR system and the computer-based system, and that generates XR musculoskeletal representations from the inputs. Such a system may include a gaming system, a robotic control system, a personal computer, or another system that is capable of interpreting XR information and musculoskeletal information. In some embodiments, the XR system and the computer-based system may be configured to communicate directly with each other, such that the computer-based system generates XR musculoskeletal representations for the XR environment. In this regard, information may be communicated using any number of interfaces, protocols, and/or media.

In some embodiments of the present technology, the system 100 may include one or more camera(s) 120, which may be used in conjunction with sensed signals from the sensor(s) 110 to provide an enhanced user experience in an environment containing smart devices. In various embodiments, such smart devices may be identifiable via a 3D map of the environment. In various other embodiments, such smart devices may be identified via the sensed signals and information obtained by the camera(s) 120 to enable such a 3D map of the environment to be generated, as discussed in more detail below.

As noted above, in some embodiments of the present technology an inference model may be used to predict information used to generate a computer-based musculoskeletal representation and/or to update in real-time a computer-based musculoskeletal representation. For example, the predicted information may be predicted handstate information. The inference model may be used to predict the information based on IMU signals, neuromuscular signals (e.g., EMG, MMG, and/or SMG signals), camera signals, external or auxiliary device signals (e.g., laser-scanning signals), or a combination of such signals when such signals are detected as the user performs one or more movement(s) and/or as the user undergoes other types of neuromuscular activity. For example, the camera(s) 120 may be used with an XR system to capture data of an actual position of the user's hand. The captured data may be used to generate a computer-based musculoskeletal representation of the user's hand, and such actual-position information may be used by an inference model to improve the accuracy of the representation and to generate a visual representation (e.g., a virtual hand) in an XR environment produced by the XR system. For example, a visual representation of muscle groups firing, force being applied, an object being lifted via movement of the user, and/or other information relating to the computer-based musculoskeletal representation may be rendered in a visual display of in the XR environment of the XR system.

In some embodiments of the present technology, an inference model may be used to map muscular activation state information, which is information identified from sensed neuromuscular signals obtained by neuromuscular sensors, to control signals. The inference model may receive as input IMU signals, neuromuscular signals (e.g., EMG, MMG, and SMG signals), camera signals, external or auxiliary device signals, or a combination of such signals, which are detected and/or captured as the user performs one or more sub-muscular activation(s), one or more movement(s), and/or one or more gesture(s). The inference model may be used to predict control information without the user having to make perceptible movements.

According to some embodiments of the present technology, the camera(s) 120 may be used to capture information to improve interpretation of neuromuscular signals and their relationship to movement, position, and force generation, to capture information in response to certain neuromuscular signals, to capture information that may be used to identify an environment corresponding to a 3D map, and/or to capture information use to generate a 3D map of an environment. As will be appreciated, the captured information may be, for example, an image signal corresponding to images captured by the camera(s) 120. The camera(s) 120 may comprise a still camera, a video camera, an infrared camera, a stereoscopic camera, a panoramic camera, and the like, which is or are able to capture one or more 3D image(s) of the user and/or one or more 3D images of an environment of interest to the user or surrounding the user. Optionally, the camera(s) 120 may be equipped with one or more filter(s) so that the camera(s) 120 may capture 3D images only within a particular range of wavelengths of light.

The information captured by the camera(s) 120 may include a sequence of still 3D images (image sequence) and/or one more 3D moving image(s) (video sequence(s)), which may be captured as one or more signal(s); thus, reference to capturing an image should be understood to encompass capturing an image signal. The terms "camera information," "camera data," and "camera signal," may be used herein to represent information about the user and/or information about the user's environment, which may be captured by a camera. It should be understood that although various embodiments may refer to "a" camera or "the" camera, such embodiments may utilize two or more cameras instead of one camera. Further, the camera information may relate to any one or any combination of: a 3D image produced by visible light, a 3D image produced by non-visible (e.g., infrared) light, a 3D image produced by light of a certain range of wavelengths, a 3D image produced by light of two or more different ranges of wavelengths, a 3D image produced using stereoscopic technologies, a 3D image produced by providing a 2D image with depth information, etc. For example, non-visible light may be used to capture a 3D image of an object that has a different heat distribution from other nearby objects (e.g., a radiator) user's body, which may provide an indication of blood flow within the user, which in turn may be used to infer a condition of the user (e.g., a force being exerted by a finger of the user may have a different blood-flow pattern than a finger that is not exerting force).

Figure 6:
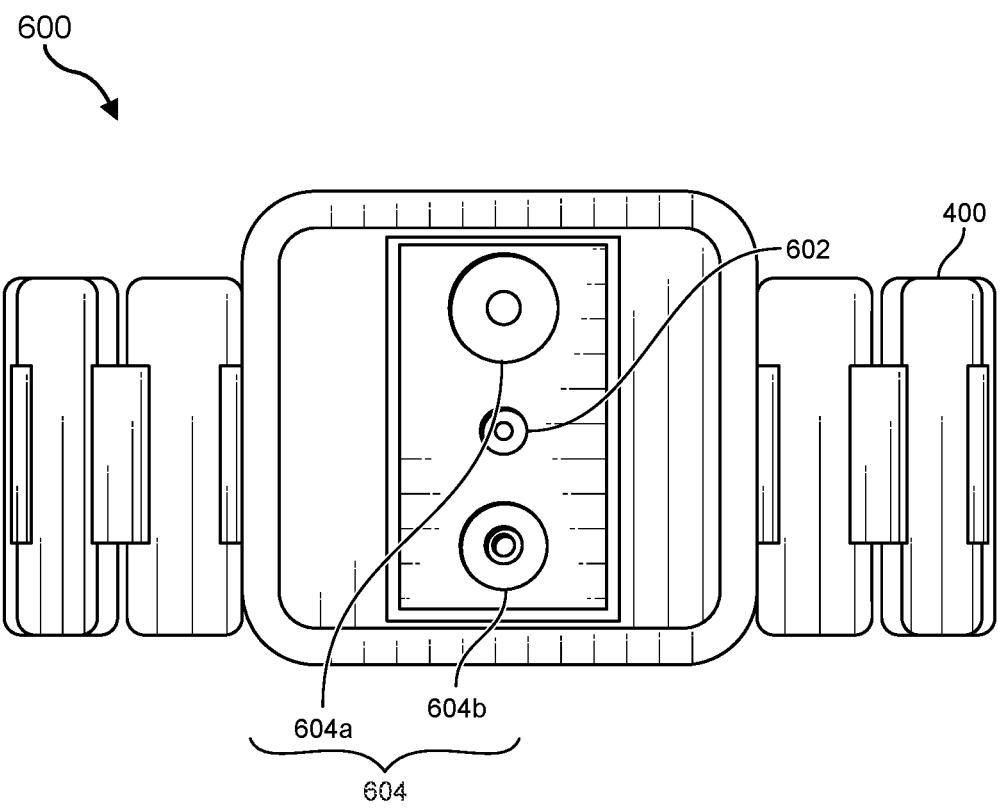
FIG. 6 schematically illustrates a camera usable in one or more system(s), in accordance with some embodiments of the technology described herein.

In some embodiments, the camera(s) 120 may comprise a camera 600 as schematically shown in FIG. 6. The camera

600 may include an imaging portion 602 configured to capture one or more digital image(s) comprising a plurality of pixels of image data. For example, the imaging portion 602 may comprise a red-green-blue (RGB) camera and/or a near-infrared (NIR) camera. The camera 600 may further include a depth portion 604 configured to detect a distance from the camera 600 to one or more surface(s) in a field of view of the camera. For example, the depth portion 604 may include an illumination device 604*a* (e.g., an infrared (IR) diode) configured to transmit IR light, and a detector 604*b* configured to receive IR light reflected from the surface(s) in the field of view. Distance or depth may be determined using known time-of-flight techniques. The depth portion 604 and the imaging portion 602 may be arranged to capture image data and detect depth data in the same field of view, such that the pixels of image data may each be provided with corresponding depth data.

The camera 600 may be mounted on the user's head (e.g., on a headband, a hat, a cap, a helmet, eyewear, etc.) so that the user's head may be used to aim the camera 600 in desired directions to capture images. Alternatively, the camera 600 may be mounted on the user's arm (e.g., on a glove, a wristband, an armband, etc.) so that the user's arm may be used to aim the camera 600 in desired directions to capture images. The images may be captured as still images or as scans of video images. The camera 600 may also include other types of lights, bulbs, or lamps, including but not limited to halogen, UV, black, incandescent, metal halide, fluorescent, neon, and/or light emitting diodes (LEDs). The camera 600 may communicate with on-board processors and/or remote processors, such that the captured images may either be processed on, e.g., the armband worn by the user or via remote computers or processing units in communication with the armband.

The camera(s) 120 (e.g., the camera 600) may include circuitry (e.g., a controller) configured to receive control signals from the processor(s) 112 based on one or more neuromuscular activation state(s) determined from sensed signals. For example, a first activation state may be recognized by the processor(s) 112 as the user's desire to capture an image or initiate a video scan; a second activation state may be recognized by the processor(s) 112 as the user's desire to stop a video scan; a third activation state may be recognized by the processor(s) 112 as the user's desire to identify a specific object (e.g., a smart device or controllable object amongst other objects); a fourth activation state may be recognized by the processor(s) 112 as the user's desire to control a designated smart device or controllable object to perform a specific function; a fifth activation state may be recognized by the processor(s) 112 as the user's desire to perform an interaction with another person. The foregoing activation states may be in any order or may be stand-alone steps. As will be appreciated, the camera(s) 120 and the processor(s) may communicate wirelessly (e.g., via Bluetooth technologies, near-field communication (NFC) technologies, etc.) or through a wired connection.

Figure 7:
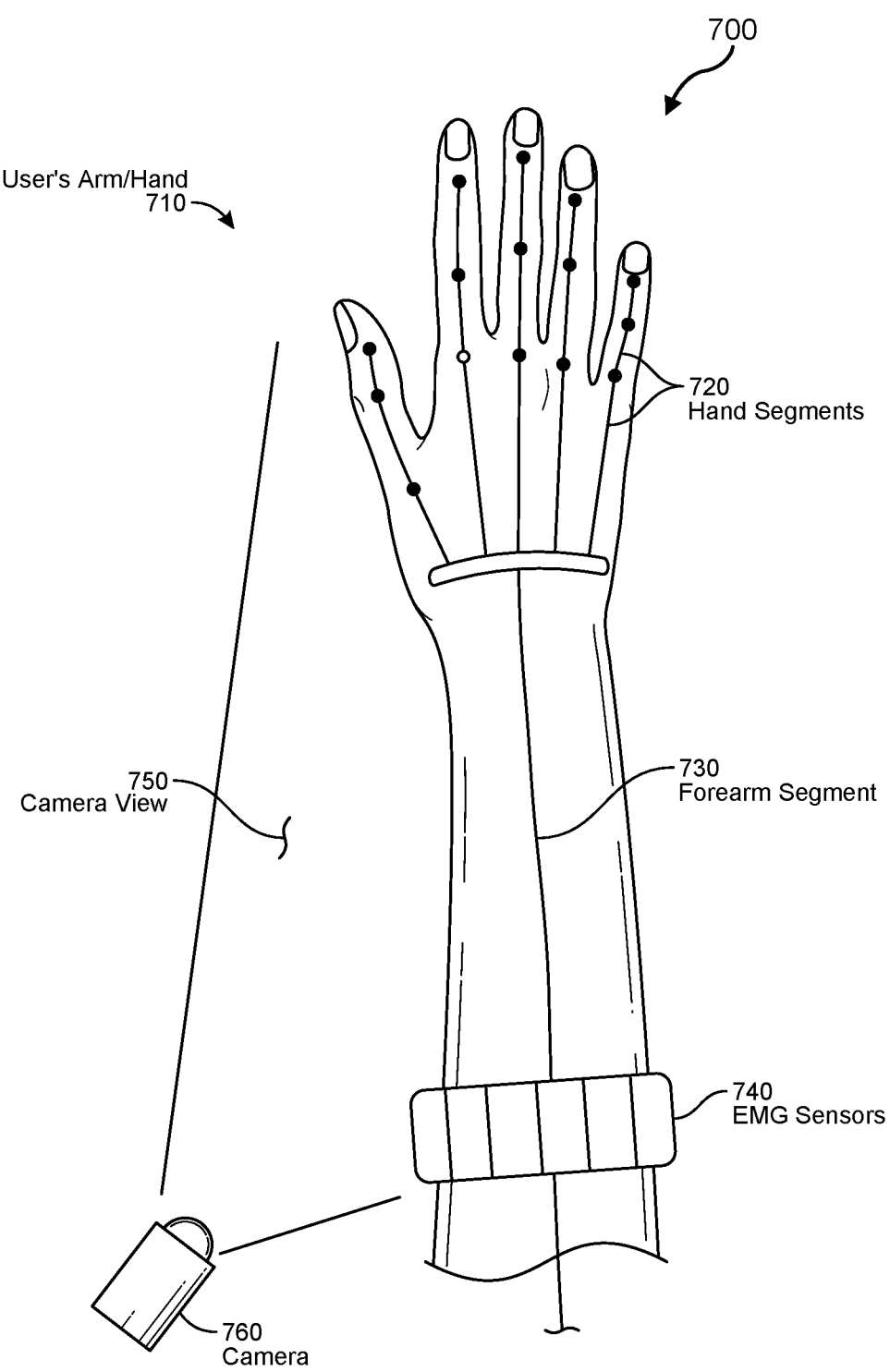
FIG. 7 is a diagram schematically illustrating an example implementation of a camera and a wearable system of neuromuscular sensors arranged on an arm, in accordance with some embodiments of the technology described herein.

FIG. 7 is a schematic diagram showing an example implementation of a system 700 that utilizes one or more EMG sensor(s) 740 and a camera 760, in accordance with some embodiments of the technology described herein. For example, the system 700 may comprise the system 100. The user's arm 702 and the user's hand 704 are attached and may comprise an arm/hand portion 710 of the user's body. The arm/hand portion 710 comprises a plurality of joints and segments, which can be depicted as a musculoskeletal representation. More particularly, the user's hand segments 720 are connected by joints. Any one or any combination of arm positions, hand positions, and segment lengths of the arm 702 and the hand 704 may be determined by the system 700 and positioned within a three-dimensional space of a model musculoskeletal representation of the arm/hand portion 210. Further, in addition to the hand segments 720, the musculoskeletal representation of the user's arm/hand portion 710 may include a forearm segment 730. The system 700 may be used to determine one or more musculoskeletal representation(s) of the user's arm/hand portion 710, which may be used to determine one more position(s) of the arm/hand portion 710. To this end, the user may wear a band comprising the EMG sensor(s) 740, which sense the user's neuromuscular signals used to determine the musculoskeletal representation(s). Concurrently with the EMG sensor(s) 740 sensing the neuromuscular signals, a camera 760 may be used to capture objects within the camera's field of view 750. For example, in FIG. 7, the camera's field of view 750 may be in a same general direction of extension of the user's arm/hand portion 710, and may include a part of the user's arm/hand portion 710. In this example, the camera 760 may be mounted on the user's head, as discussed above, such that the user may change the camera's field of view 750 via head motion. Data captured by the camera 760 in addition to the sensed signals obtained by the EMG sensors 740 may be used to generate a 3D map of an environment, identify smart devices in the environment, control one or more smart device(s) in the environment, interact with another person in the environment, etc. Further, the system 700 may render a representation of the user's arm/hand portion 710 based on the sensed signals, such as within an AR environment.

FIG. 8A-8D schematically illustrate embodiments of the present technology in which a wearable system 800 comprises a plurality of neuromuscular sensors 810 (e.g., EMG sensors) and a camera 820 (e.g., the camera 600) arranged on an arm band 812 structured to be worn on an arm 814 of the user. Optionally, an IMU, a GPS, and/or other auxiliary device (not shown) may be arranged on the arm band 812 together with the camera 820 and the neuromuscular sensors 810.

Figure 8A:
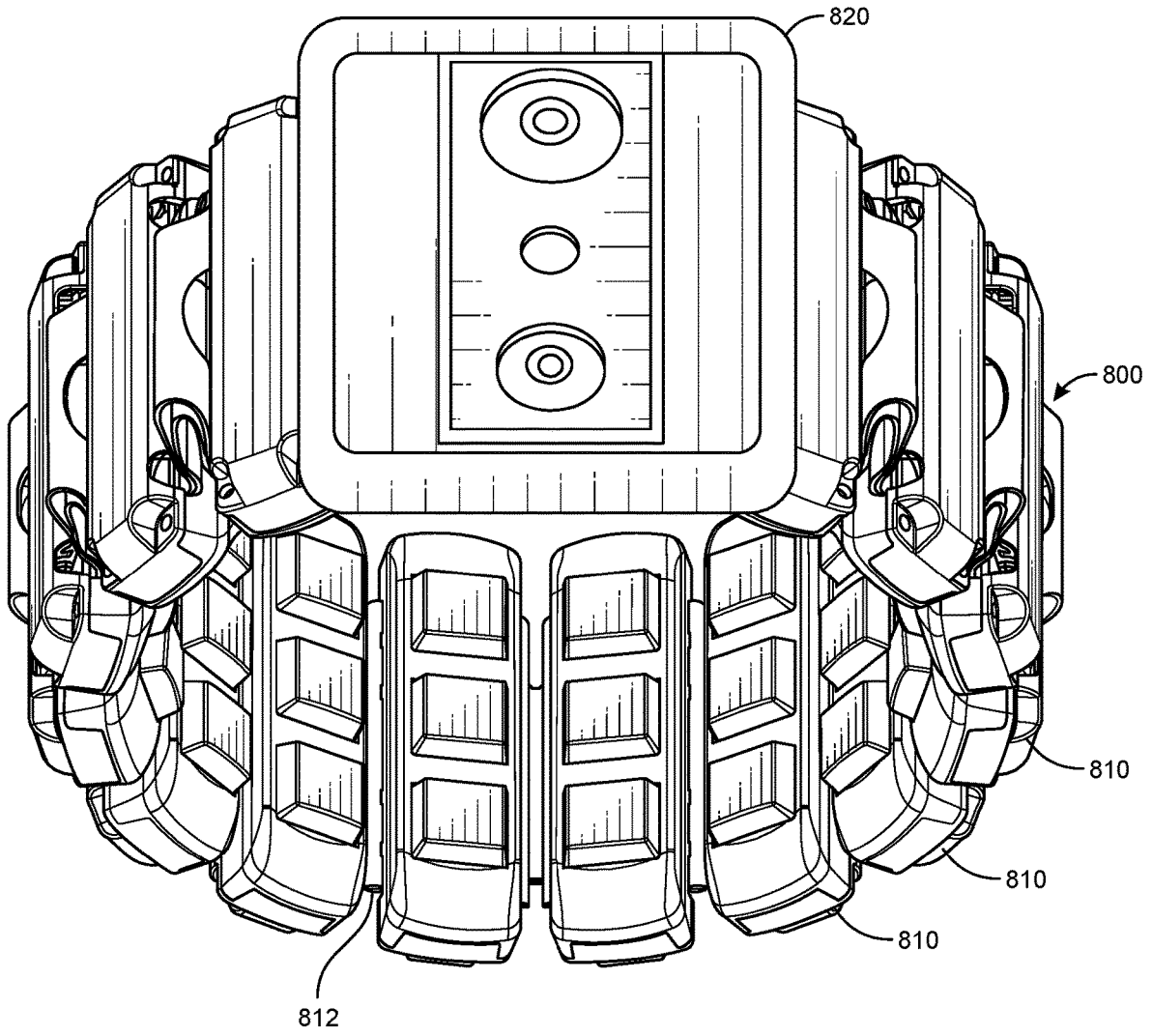
FIG. 8A is a diagram schematically illustrating another example implementation of a wearable system of a camera and neuromuscular sensors arranged on an arm, in accordance with some embodiments of the technology described herein.
Figure 8B:
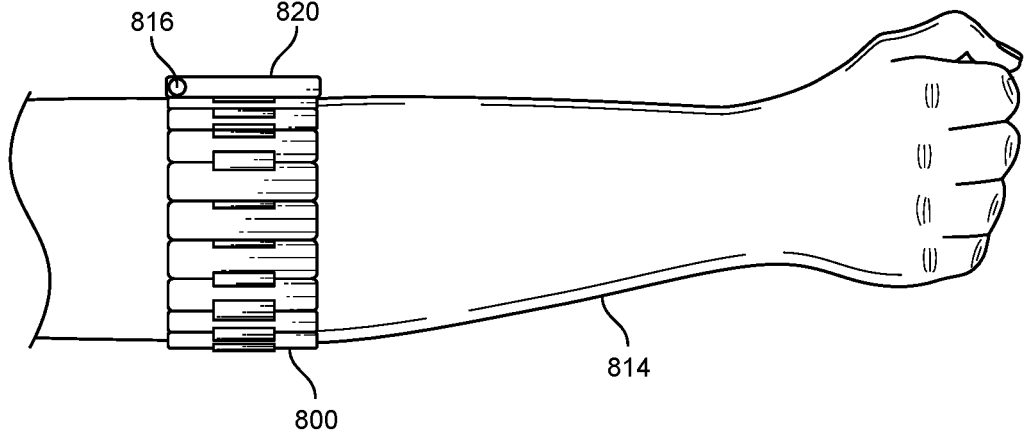
FIGS. 8B and 8C schematically illustrate a perpendicular orientation and an axial orientation of the camera of FIG. 8A, in accordance with some embodiments of the technology described herein.
Figure 8C:
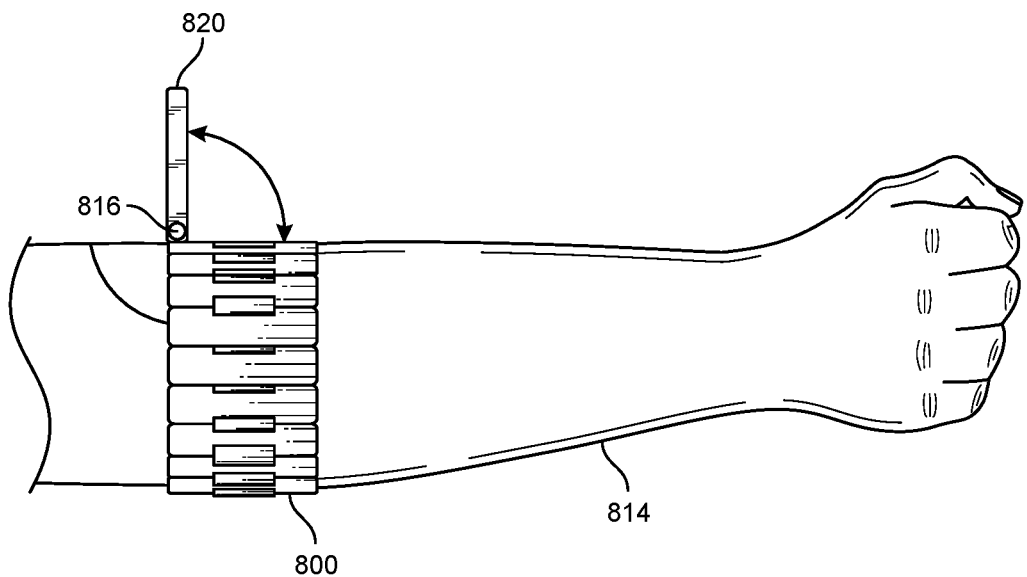

In FIG. 8B, the camera 820 is shown in a perpendicular orientation to capture images that are perpendicular to the user's arm 814. When the user's arm 814 is held directly outward from the user's torso while the user is standing on a ground surface, such that the user's arm 814 is parallel to the ground surface, the arm band 812 may be rotated on the user's arm such that the camera 820 may face upward to capture images of a ceiling of an environment, i.e., the camera 820 may have a field of view pointing upwards from the user's arm 814. Based on a mapping of the environment (which may include the ceiling and features above, beyond, below, and/or in front of the user), the disclosed embodiments herein can employ geometric techniques to orient the arm band 812 and the camera 820 in the environment, and thus be able to identify the specific spatial location in the environment surrounding the user at any given time (e.g., in front of the user even when the camera is pointed orthogonal to a plane formed by the user's arm).

Figure 8D:
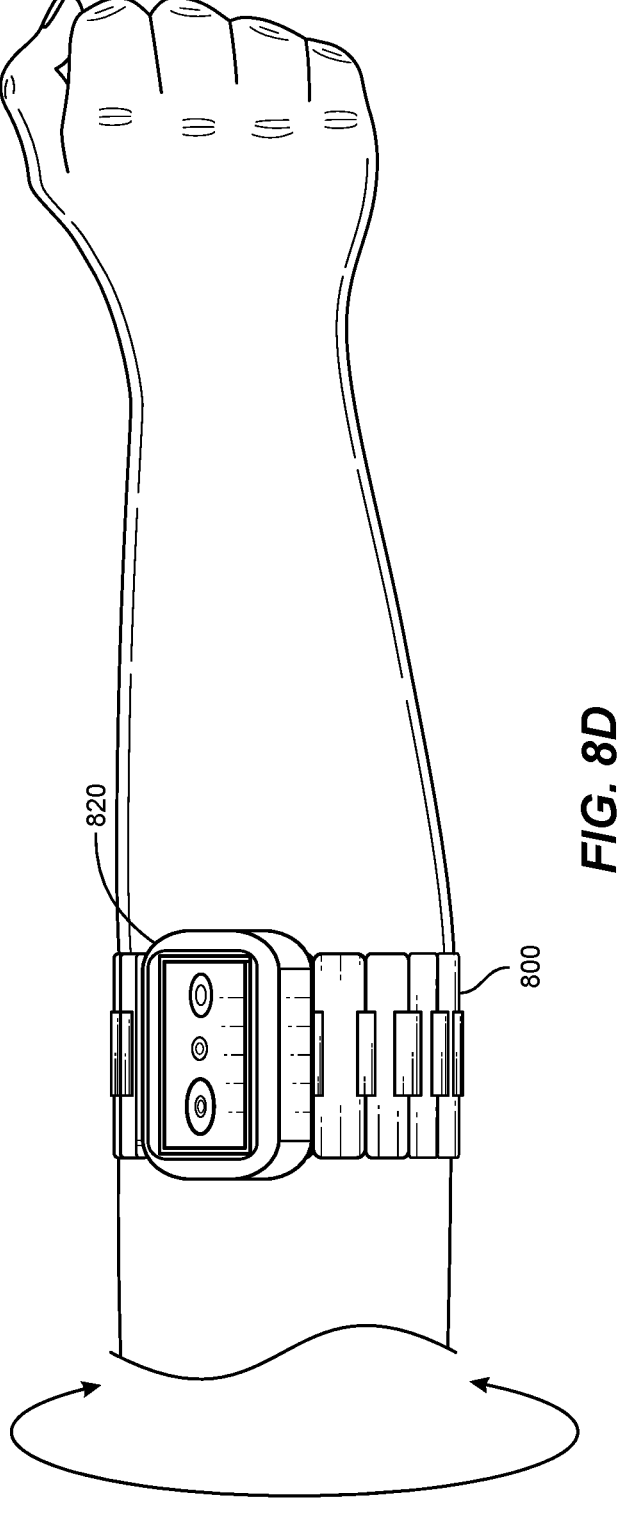
FIG. 8D shows that the wearable system comprising a camera that may be rotated in accordance with some embodiments of the technology described herein.

In some embodiments of the present technology, the camera 820 may be arranged to pivot about a hinge 816 or other type of pivoting device. For example, the hinge 816 may enable the camera 820 to be adjusted from the perpendicular orientation shown in FIG. 8B (see also FIG. 8A) to an axial orientation shown in FIG. 8C, which is 90° from the perpendicular orientation. In the axial orientation, when the user's arm 814 is held directly outward from the user's torso while the user is standing on the ground surface, such that the user's arm 814 is parallel to the ground surface, the field of view of the camera 820 may be aligned generally with a lengthwise direction of the user's arm 814. Thus, when the camera 820 is in the axial orientation, the user easily may use a finger on the arm 814 to point forward at an object in the field of view of the camera 820. The double-headed arrow in FIG. 8D shows that the wearable system 800 comprising the camera 820 may be rotated around the user's arm 814.

Figure 9:
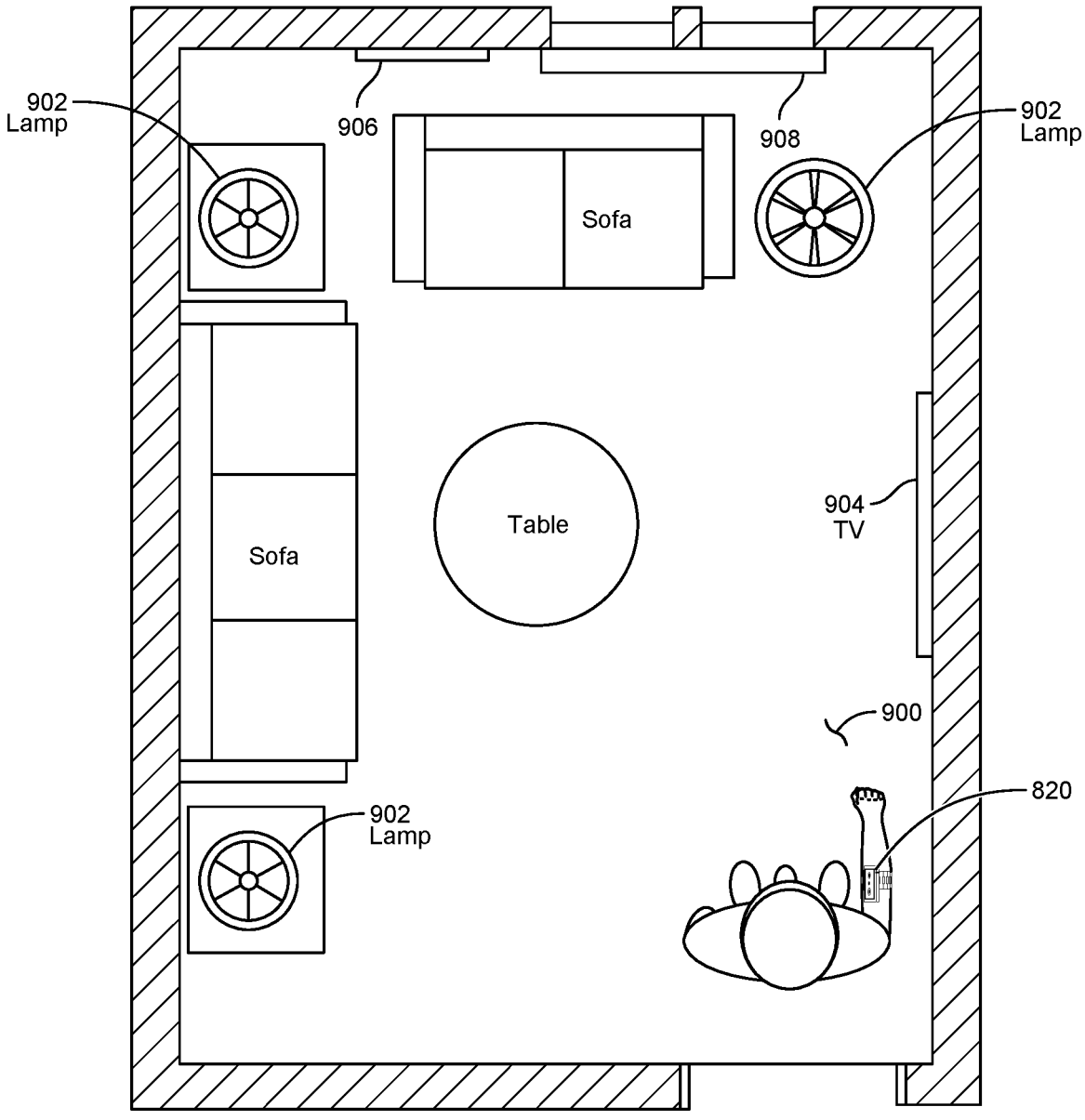
FIG. 9 schematically illustrates a living-room environment in which smart devices are located, in accordance with some embodiments of the technology described herein.

In an example implementation, the user may use the camera 820 to capture images and/or video(s) for generation of a 3D map of an environment (e.g., a living room 900, schematically shown in FIG. 9) by performing any one or any combination of: standing inside the environment at a central location and scanning the arm 814 in an arc while the torso is in a fixed position; by holding the arm 814 in a fixed position relative to the torso and rotating the torso in place at the central location through an angle from 0° to 360°; by walking around a perimeter of the environment while a field of view of the camera 820 is aimed inwards away from the perimeter; and while meandering in the environment while the field of view of the camera changes randomly. The images/video(s) captured by the camera 820 may include still images of a standard aspect ratio; still images of a panoramic, wide-angle, or other non-standard aspect ratio; and/or one or more video scan(s). As discussed above, via the neuromuscular sensors 810, the user may use various gestures to control the camera 820, to impart information to be used to generate the 3D map of the living room 900, which may include an entirety of the living room 900 (including walls, ceiling, and floor). For example, a first gesture corresponding to a first activation state may be performed to cause the camera 820 to capture a still image or initiate a video scan; a second gesture corresponding to a second activation state may be performed to cause the camera 820 to stop a video scan; a third gesture corresponding to a third activation state may be performed to cause a specific object (e.g., a lamp 902, a television 904, a window shade 908, etc.) in the field of view of the camera 820 to be identified as a smart device in captured camera data corresponding to the living room 900; a fourth gesture corresponding to a fourth activation state may be performed to cause an object in the field of view of the camera 820 to be designated a reference object 906 for the living room 900. As will be appreciated, the 3D map generated for the living room 900 may be identified based on the reference object 906. Optionally, a plurality of reference objects may be designated for an environment of a 3D map (e.g., a primary reference object and a secondary reference object, to ensure a correct correlation between the environment and the 3D map).

In some embodiments of the present technology, images/ video(s) captured by the camera(s) 120 when the user is in an environment may be processed by the computer processor(s) 112 to determine one or more reference object(s) in the environment. If a reference object is recognized for the environment, the processor(s) may access a storage device 122 to retrieve a 3D map of the recognized environment. Further, the processor(s) 112 also may activate a control interface for the recognized environment, to enable the user to interact with smart devices in the recognized environment via neuromuscular activation states (e.g., gestures, movements, etc.). Thus, instead of using a conventional interface to control the smart devices in the recognized environment (e.g., a conventional Internet-of-Things type smartphone interface), the smart devices in the environment may be controlled by the user's neuromuscular activity when the reference object(s) for the environment is or recognized and the corresponding 3D map is retrieved. In an embodiment, the storage device 122 may store a plurality of different maps for a plurality of different environments. In another embodiment, the storage device 122 may store a plurality of maps for a single environment, with each map identifying a different set of smart devices usable by the user. For example, User A may be permitted to control a lamp and a sound system via neuromuscular activity via Map A corresponding to Control Interface A, whereas User B may be permitted to control the lamp, the sound system, and a television via neuromuscular activity via Map B corresponding to Control Interface B.

Figure 10:
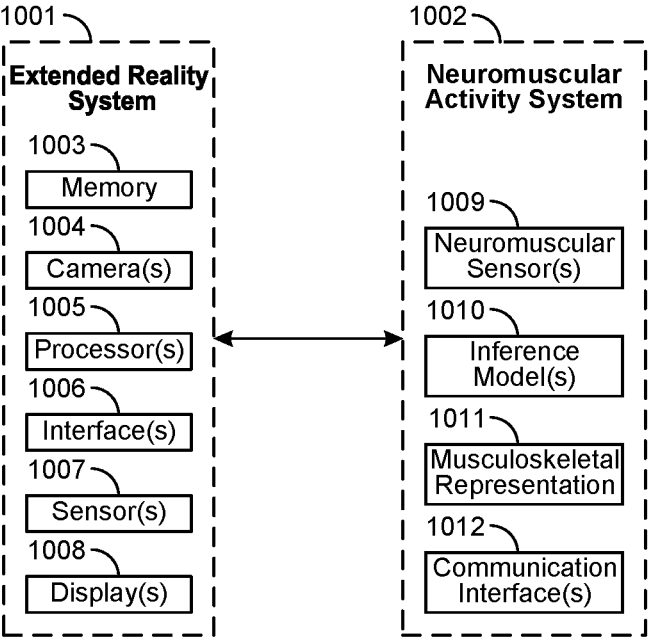
FIG. 10 is a block diagram of a distributed computer-based system that integrates an XR system with a neuromuscular activity system, in accordance with some embodiments of the technology described herein.

In some embodiments of the present technology, the 3D map may be utilized for an XR environment. FIG. 10 illustrates a schematic diagram of an XR-based system 1000, which may be a distributed computer-based system that integrates an XR system 1001 with a neuromuscular activity system 1002. The neuromuscular activity system 1002 may be the same as or similar to the system 100 described above with respect to FIG. 1.

The XR system 201 may take the form of a pair of goggles or glasses or eyewear, or other type of display device that shows display elements to a user that may be superimposed on the user's "reality." This reality in some cases could be the user's view of the environment (e.g., as viewed through the user's eyes), or a captured version of the user's view of the environment. For instance, the XR system 1001 may include one or more camera(s) 1004, which may be mounted within a device worn by the user, that captures one or more view(s) experienced by the user in the environment. The XR system 1001 may include one or more processor(s) 1005 operating within a device worn by the user and/or within a peripheral device or computer system, and such processor(s) 1005 may be capable of transmitting and receiving video information and other types of data (e.g., sensor data).

The XR system 1001 may also include one or more sensor(s) 1007, such as any one or any combination of a microphone, a GPS element, an accelerometer, an infrared detector, a haptic feedback element, and the like. In some embodiments of the present technology, the XR system 1001 may be an audio-based or auditory XR system, and the sensor(s) 1007 may also include one or more headphones or speakers. Further, the XR system 1001 may also include one or more display(s) 1008 that permit the XR system 1001 to overlay and/or display information to the user in addition to provide the user with a view of the user's environment presented via the XR system 1001. The XR system 1001 may also include one or more communication interface(s) 1006, which enable information to be communicated to one or more computer systems (e.g., a gaming system or other system capable of rendering or receiving XR data). XR systems can take many forms and are available from a number of different manufacturers. For example, various embodiments may be implemented in association with one or more types of XR systems or platforms, such as HoloLens holographic reality glasses available from the Microsoft Corporation (Redmond, Washington, USA); Lightwear AR headset from Magic Leap (Plantation, Florida, USA); Google Glass AR glasses available from Alphabet (Mountain View, California, USA); R-7 Smartglasses System available from Osterhout Design Group (also known as ODG; San Francisco, California, USA); Oculus Quest, Oculus Rift S, and Spark AR Studio available from Facebook (Menlo Park, California, USA); or any other type of XR device.

The XR system 1001 may be operatively coupled to the neuromuscular activity system 1002 through one or more communication schemes or methodologies, including but not limited to, Bluetooth protocol, Wi-Fi, Ethernet-like protocols, or any number of connection types, wireless and/or wired. It should be appreciated that, for example, the systems 1001 and 1002 may be directly connected or coupled through one or more intermediate computer systems or network elements. The double-headed arrow in FIG. 10 represents the communicative coupling between the systems 1001 and 1002.

As mentioned above, the neuromuscular activity system 1002 may be similar in structure and function to the system 100. In particular, the neuromuscular activity system 1002 may include one or more neuromuscular sensor(s) 1009, one or more inference model(s) 1010, and may create, maintain, and store one or more musculoskeletal representation(s) 1011. In an example embodiment, similar to one discussed above, the neuromuscular activity system 1002 may include or may be implemented as a wearable device, such as a band that can be worn by the user, in order to collect (i.e., obtain) and analyze neuromuscular signals from the user. Further, the neuromuscular activity system 1002 may include one or more communication interface(s) 1012 that permit the neuromuscular activity system 1002 to communicate with the XR system 1001, such as by Bluetooth, Wi-Fi, or another means of communication. Notably, the XR system 1001 and the neuromuscular activity system 1002 may communicate information that can be used to enhance user experience and/or allow the XR system 1001 to function more accurately and effectively.

In some embodiments, the XR system 1001 or the neuromuscular activity system 1002 may include one or more auxiliary sensor(s) configured to obtain auxiliary signals that may also be provided as input to the one or more trained inference model(s), as discussed above. Examples of auxiliary sensors include IMUs, GPSs, imaging devices, radiation detection devices (e.g., laser scanning devices), heart rate monitors, or any other type of biosensors able to sense biophysical information from the user during performance of one or more muscular activation(s). Further, it should be appreciated that some embodiments of the present technology may be implemented using camera-based systems that perform skeletal tracking, such as, for example, the Kinect system available from the Microsoft Corporation (Redmond, Washington, USA) and the LeapMotion system available from Leap Motion, Inc. (San Francisco, California, USA). It also should be appreciated that any combination of hardware and/or software may be used to implement various embodiments described herein.

Although FIG. 10 shows a distributed computer-based system 1000 that integrates the XR system 1001 with the neuromuscular activity system 1002, it should be understood that integration of these systems 1001 and 1002 may be non-distributed in nature. In some embodiments, the neuromuscular activity system 1002 may be integrated into the XR system 1001 such that various components of the neuromuscular activity system 1002 may be considered as part of the XR system 1001. For example, inputs from the neuromuscular signals sensed by the neuromuscular sensor(s) 1009 may be treated as another of the inputs (e.g., from the camera(s) 1004, from the sensor(s) 1007) to the XR system 1001. In addition, processing of the inputs (e.g., sensed signals) obtained from the neuromuscular sensor(s) 1009 may be integrated into the XR system 1001 (e.g., performed by the processor(s) 1005).

As noted above, the present technology involves, in some aspects, a computerized map system. The map system may generate an electronic three-dimensional (3D) map of an environment (e.g., room in a house, an office of a building, a warehouse indoor environment, etc.), and the 3D map may identify objects in the environment that may be controlled remotely. The map system may comprise a plurality of neuromuscular sensors, one or more camera(s), one or more computer processor(s), and one or more memory device(s). The neuromuscular sensors may be attached to a wearable device, which may be worn by a user to sense neuromuscular signals from the user. As discussed herein, the neuromuscular signals may be processed to determine neuromuscular activities of the user. The neuromuscular activities may result from a readily visible movement by the user or from sub-muscular changes in the user, which may not be readily visible. The computer processor(s) may generate the 3D map based on the neuromuscular signals sensed by the plurality of neuromuscular sensors and image information captured by the camera(s), and may store the 3D map in the memory device(s). The camera(s) may be controlled to capture one or more image(s) and/or one or more video scan(s) based on a neuromuscular activity recognized by the computer processor(s) from the neuromuscular signals. Known image-processing techniques may be used to stitch together two or more images and/or two or more video sequences.

For instance, the map system may generate a 3D map of a real-world room by capturing a video scan of the room and/or capturing one or more still image(s) of the room (referred to collectively as "captured video/images"). The captured video/images may be stored in the memory device(s). Of the various real-world objects in the captured video/images, the user may identify one or more controllable object(s) (i.e., smart device(s)), which may be controlled remotely as so-called "Internet of Things" (IoT) object(s). For example, the room may include an IoT controllable lamp, an IoT controllable sound system, and an IoT controllable videogame monitor. The user may identify these IoT controllable objects via neuromuscular activities detected during or after capturing of the captured video/images. In one example, in the case of a video scan, during capturing of the video scan the user may point his/her index finger to each of the IoT controllable objects. In another example, the user may update a previously existing 3D map of the room by identifying the IoT controllable object(s) via neuromuscular activities.

More specifically, the plurality of neuromuscular sensors and the camera(s) may be attached to a wearable device worn on an arm of the user. The computer processor(s) may be programmed to control the camera(s) to capture a still image or a video scan when, e.g., the user's index finger is pointed. In this example, the user may point the index finger to initiate a video capture or recording of the room, and may move the arm (and consequently the camera(s)) to scan various parts of the room for the video capture. Optionally, the user may identify particular objects of interest in the room (e.g., IoT controllable objects) by performing another neuromuscular activity during the video capture. For example, the user may move the index finger up and down to identify an object of interest in the room. Each object of interest may be electronically tagged or labeled to enable the object to be identified in the 3D map of the room.

The neuromuscular sensors may output one or more signal(s) to the computer processor(s) and/or to the memory device(s). These signal(s) may be processed by the computer processor(s) to determine each pointing instance during the video scan, in which the user moves his/her index finger up and down, and to correlate each such instance to an IoT controllable object. As will be appreciated, each IoT controllable object may have a corresponding IoT control system (e.g., a corresponding IoT control interface) accessible by the computer processor(s), such that the computer processor(s) may communicate instruction signals to the IoT controllable object via the IoT control system.

In order to obtain depth information, the camera(s) may include an infrared (IR) distance sensor comprising circuitry for IR transmission and IR reception. The IR distance sensor may be configured to transmit IR light outward and receive reflected IR light resulting from the transmitted IR light impinging on surfaces (i.e., reflection surfaces) and reflecting back towards the IR distance sensor. Using known techniques, a processor in the IR distance sensor and/or the computer processor(s) may determine a distance between each reflection surface and the IR distance sensor based on an elapsed time between transmission of the IR light and reception of the reflected IR light. As will be appreciated, the IR distance sensor and the camera(s) may be aligned, so that an imaging region of the camera(s) may be correlated with distance information from the IR distance sensor. Using known techniques, each pixel of an array of pixels of an image captured by the camera(s) may be associated with depth or distance information for that pixel.

Alternatively, the camera(s) may comprise a stereoscopic camera able to record 3D still images or 3D video, or may comprise a plurality of cameras mounted relative to each other to obtain image information or video information that may be combined to produce stereoscopic information.

The present technology also involves, in some aspects, using recognized neuromuscular activities of a user to control smart devices in an IoT-enabled environment. In this regard, an IoT interaction system is provided that may comprise a plurality of neuromuscular sensors, one or more camera(s), one or more computer processor(s), and one or more memory device(s). The IoT interaction system may be a real-world system or an XR-based system. The neuromuscular sensors may be attached to a wearable device, which may be worn by the user to sense neuromuscular signals from the user. The computer processor(s) may process image data captured by the camera(s) to determine whether an object in the image data corresponds to a reference object of a 3D map stored in the memory device(s). If a match is found, the 3D map corresponding to the reference object may be accessed, and control interfaces for smart devices in an environment corresponding to the 3D map may be activated.

The computer processor(s) may process the sensed signals from the neuromuscular sensors to determine neuromuscular activities of the user while the user is in the environment corresponding to the 3D map. Recognized neuromuscular activities may be used to control smart devices in the environment. If the IoT interaction system is an XR-based system, the may be enabled to have a virtual experience with a real-world object. For example, the user may interact with a real-world window of a room via neuromuscular activities, e.g., to open a window shade covering the window. The interaction may be via detection of the user pointing to the window shade and/or via a relative movement of the user's fingers to indicate that the window shade is to be opened. The recognized predetermine neuromuscular activities may indicate the user's desire to see a view of animation through the window (e.g., a clockwise turn of the user's wrist may cause an animated bird to appear at the window, a counterclockwise turn of the user's wrist may cause a fall foliage scene to appear through the window, etc.).

The present technology also involves, in some aspects, using recognized neuromuscular activities of a user to interact with a person in an environment (e.g., an XR environment). In this regard, an XR-based system is provided that may comprise a plurality of neuromuscular sensors, one or more camera(s), one or more computer processor(s), and one or more memory device(s). The neuromuscular sensors may be attached to a wearable device, which may be worn by the user to sense neuromuscular signals from the user. The computer processor(s) may process image data captured by the camera(s) to determine whether an object in the environment is a person. Such determination may be based on shape, movement, facial characteristics, and the like. Optionally, the computer processor(s) may be equipped with a detector configured to detect a signal emanating from a device worn by a person in the environment. If the computer processor(s) determine that a person is present, the computer processor(s) may determine an identity of the person. For example, facial-recognition processing may be performed on facial characteristics in the captured image data. In another example, the signal emanating from the device worn by the user may provide the person's identification. Once the person is identified, the user may interact with the person in the environment using neuromuscular activities.

For example, recognized neuromuscular activities may be used to play a game with the person in the environment, sent messages to the person's smartphone, send haptic signals to the person, etc.

Implementation A—Generation of 3D Map

According to some embodiments of an implementation of the present technology, a computerized system for obtaining a 3D map of an environment is provided, which may be the system 100. The system may comprise a plurality of neuromuscular sensors, at least one camera, and at least one computer processor. The plurality of neuromuscular sensors may be configured to sense neuromuscular signals from a user. For example, the plurality of neuromuscular sensors may be arranged on at least one wearable device structured to be worn by the user to obtain the neuromuscular signals. The at least one camera may be configured to capture information about objects in the environment based on or in response to signals from the plurality of neuromuscular sensors. The at least one computer processor may be coupled to a memory and may be programmed to: generate a 3D map of the environment based on or in response to the signals from the plurality of neuromuscular sensors or information obtained from the signals from the plurality of neuromuscular sensors, and cause the 3D map to be stored in the memory. The 3D map may comprise information identifying the objects in the environment.

In various embodiments of this implementation, the system may include GPS circuitry, which may provide GPS data to be associated with the 3D map. For example, the GPS circuitry may be configured to provide GPS coordinates for objects in the environment based on or in response to signals from the plurality of neuromuscular sensors.

In various embodiments of this implementation, the neuromuscular signals from the plurality of neuromuscular sensors may cause a plurality of images of the environment to be captured and/or may cause at least one video scan of the environment to be captured. The at least one computer processor may generate the 3D map by joining together the plurality of images or joining together portions of the at least one video scan. For example, the at least one computer processor may be programmed to "close loops" and join together the plurality of images or to join together the portions of the at least one video scan using Simultaneous Localization and Mapping (SLAM) technology, (e.g., Visual SLAM or VSLAM, ORB-SLAM, DynaSLAM, and the like)

and/or Real-Time Appearance-Based Mapping (RTAB-Map) technology. Feature-tracking algorithms (e.g., Scale-Invariant Feature Transform (SIFT), Speeded-Up Robust Features (SURF), Good Features To Track (GFTT), Binary Robust Independent Elementary Features (BRIEF), and the like) may be used in conjunction with SLAM technology. As will be appreciated, other image-joining technologies known in the art may be used instead of or in conjunction with those identified herein.

As can be appreciated, some of the embodiments of the present technology described herein may generate or utilize a 3D map of an environment as seen from a predetermined rotational axis, in which a camera may be rotated through an angular sector (e.g., 90°, 180°, 270°, 360°, etc.) to capture video(s) and/or images, and in which depth may be one of the dimensions; these embodiments may involve 3D maps that may be partial maps. In other embodiments of the present technology, a 3D map may involve rotations through multiple different rotational axes (e.g., three mutually orthogonal axes); maps for these embodiments may result from video(s) and/or images taken through any angle from multiple different center points along the multiple different rotational axes, with established geometric relationships between the multiple different center points.

The at least one computer processor used to generate a 3D map may include one or more local processor(s) at a location of the environment being mapped and/or one or more remote processor(s) at a location remote from the environment being mapped. In some embodiments, the local processor(s) may be located on a wearable device on which a camera and neuromuscular sensors are located (e.g., on the wearable system 800 of FIG. 8A) or may be located within one or more server(s) of a local-area network (LAN) to which the wearable device belongs. As will be appreciated, communication within the LAN may be via any one or any combination of: Wi-Fi, 3G, 4G, 5G, Bluetooth, other streaming technologies, and also conventional hardwiring. In some embodiments, the remote processor(s) may be located at a distant facility (e.g., in a different city, in a different state, in a different country, etc.) from the wearable device and may be in communication with the wearable device via a global communication network (e.g., the Internet). As will be appreciated, although some computations used to generate a 3D map may be relatively simple and thus may require a relatively small amount of computing power and consequently can be performed on a simple processor that may be carried on the wearable device, other computations may require a significantly greater amount of computing power and consequently a simple processor may not be sufficient. Thus, it may be advantageous for some or all of the computations used to generate a 3D map to be performed on one or more specialized (e.g., high computing power) mapping computer(s) equipped with one or more graphics processing unit(s) (GPUs), which may perform. For instance, data from the neuromuscular sensors and the camera may be streamed or uploaded to a remote cloud facility where the data may be accessed by the specialized computer(s) to generate a 3D map from the data.

In various embodiments of this implementation, the at least one computer processor may be programmed to identify a first neuromuscular activity from the neuromuscular signals. Each occurrence of the first neuromuscular activity may cause an image of the environment to be captured or a video scan of the environment to be captured. The at least one computer processor may be further programmed to determine a second neuromuscular activity from the neuromuscular signals, and to correlate the second neuromuscular activity to a controllable object (e.g., a smart device) in the environment. The 3D map may be generated such that the 3D map includes information on which of the objects in the environment is a controllable object, such that the controllable object(s) may be identified from the 3D map. That is, in a case where the environment includes a plurality of controllable objects, each of the of controllable objects may be identified on the 3D map.

In various embodiments of this implementation, the first neuromuscular activity and/or the second neuromuscular activity may comprise any one or any combination of: a pointing of a finger of the user, an unpointing of a finger of the user, a making of a first of the user, an unmaking of a first of the user, a clockwise wrist movement of the user, a counterclockwise wrist movement of the user, a palm up gesture of the user, and a palm down gesture of the user, or any other suitable arm, finger, hand, or wrist movement or gesture. As will be appreciated, the at least one computer processor may be programmed to recognize one or more other types of neuromuscular activity for the first neuromuscular activity and or the second neuromuscular activity.

In various embodiments of this implementation, the information captured about the objects in the environment may comprise any one or any combination of: a visual image of each of the objects in the environment, one or more depth value(s) of each of the objects in the environment, and one or more angular value(s) of each of the objects in the environment. For example, for each of the objects in the environment, an angular value of the object may correspond to an angle between the object and a predetermined origin for the 3D map. A vertex of this angle may correspond to a camera location of the at least one camera during capturing of the information about the objects in the environment. The depth value of an object in the environment may be a line-of-sight distance between the at least one camera and the object. Depending on the sizes of the various objects in the environment, one or more depth value(s) and/or angular value(s) may be used for the various embodiments disclosed herein.

In various embodiments of this implementation, the at least one camera may be arranged on the at least one wearable device. For example, the at least one camera may comprise a camera arranged on a head-wearable device. The head-wearable device may be one of: a head band, a hat, a helmet, and eyewear. In another example, the at least one wearable device may comprise a band structured to encircle a wrist or a forearm of the user. The plurality of neuromuscular sensors may be arranged circumferentially on the band, and the at least one camera may comprise a camera mounted on the band and arranged radially external to one or more of the plurality of neuromuscular sensors.

In various embodiments of this implementation, the at least one camera may comprise a stereoscopic camera able to capture 3D images/video(s).

In various embodiments of this implementation, the at least one camera may comprise: an imaging portion, and a depth determination portion. The imaging portion may comprise an RGB camera. The imaging portion may comprise at least two optical paths. The depth determination portion may comprise an infrared-light transmitter and receiver. The transmitter may be configured to transmit infrared light to one or more surface(s), and the receiver may be configured to receive reflected infrared light from the surface(s).

In various embodiments of this implementation, the information about the objects in the environment, captured by the at least one camera, may comprise images, with each of the images being formed of an array of pixels. Each pixel of the array of pixels may comprise depth data and visual data.

In various embodiments of this implementation, the at least one computer processor may be programmed to: identify and label a particular object of the objects in the 3D map as a reference object for the environment, and identify and label others of the objects in the 3D map relative to the reference object, such that identification of a physical location of the reference object in the 3D map enables identification of physical locations of the others of the objects in the 3D map.

In various embodiments of this implementation, the reference object for the environment may be determinable based on any one or any combination of: a shape of the reference object, a color or a combination of colors of the reference object, a symbol on the reference object, and a surface relief structure on the reference object. For example, the 3D map may be retrieved from the memory device when a match is found between the reference object identified for the 3D map and an object in an image captured by a camera.

FIG. 11 shows a flow chart of a process flow 1100 for an embodiment of this implementation. At S1102, neuromuscular sensors on the user sense the user's neuromuscular signals, and the sensed signals are processed. For example, the neuromuscular sensors may be attached to a band worn around the user's arm. At 51104, if a determination is made that the neuromuscular signals include one or more signal(s) corresponding to a first neuromuscular activity, the process flow 1100 proceeds to S1106; if not, the process flow 1100 returns to S1102. For example, the first neuromuscular activity may be the user forming a first to start imaging the user's current environment. At S1106, 3D images/video(s) is or are captured while neuromuscular signals of the user continue to be sensed and processed. For example, the images/video(s) may be captured by a 3D camera attached to the band worn around the user's arm.

At 51108, if a determination is made that the neuromuscular signals include one or more signal(s) corresponding to a second neuromuscular activity, the process flow 1100 proceeds to S1110; if not, the process flow 1100 returns to S1106. For example, the second neuromuscular activity may be the user pinching a thumb and index finger together. At S1110, an object appearing in the images/video(s) when the second neuromuscular activity occurred is tagged. For example, the second neuromuscular activity may be performed by the user to indicate a reference object for the environment. The reference object may be an object used to identify the environment from other environments. The environment may have one reference object or a plurality of reference objects. As will be appreciated, a field of view of the 3D camera may be aligned with a direction of the user's arm or may be orthogonal to that direction or at some other angle to that direction, such that the user's hand or a portion thereof may or may not be captured in the image(s). Optionally, if captured in the image(s), the user's hand can facilitate identification of the object as a reference object; however, as described herein, it is not necessary to capture the user's hand to know where a finger of the hand is pointing, because neuromuscular signals obtained from the user via one or more neuromuscular sensors(s) (e.g., EMG sensor(s)) on a wearable system worn by the user, and image information obtained from a camera on the wearable system, may be provided to a trained inference model to determine when and where the finger of the user's hand is pointing. It should be understood that identification of a particular object may be achieved by extrapolating a direction of pointing of the user's finger to an object determined from the image information. When the environment has objects that are spaced far apart from each other, a single extrapolation may be sufficient to identify the particular object. On the other hand, when the environment has multiple objects that are close to each other, multiple extrapolations may be used to identify the particular object. For example, in the case of multiple extrapolations, each extrapolation may be from the user's finger pointing at the object from different perspectives, and an intersection of the extrapolations may be used to identify the particular object.

The process flow then proceeds to S1112 at which a determination is made as to whether the neuromuscular signals include one or more signal(s) corresponding to a third neuromuscular activity. If so, the process flow 1100 proceeds to S1114; if not, the process flow 1100 returns to S1106. For example, the third neuromuscular activity may be the user pointing a finger. At S1114, an object appearing in the image(s) when the third neuromuscular activity occurred is tagged. For example, the third neuromuscular activity may be performed by the user to indicate a smart device in the environment. The process flow then proceeds to S1116, at which a determination is made as to whether the neuromuscular signals include one or more signal(s) corresponding to a fourth neuromuscular activity, which may indicate the user's desire to stop capturing information about the environment. If not, the process flow 1100 returns to the S1106 to enable another reference object and/or another smart device to be tagged. If so, the process flow 1100 proceeds to S1118, at which the sensing and processing neuromuscular signals stops, the capturing of the image(s) stops, and sensor data corresponding to the sensed and processed neuromuscular signals, and camera data corresponding to the image(s) is stored. The stored sensor data and/or the stored camera data may include raw data, or processed data, or both raw data and processed data. The data may be stored such that the data is searchable based on the tagged reference object(s).

The process flow 1100 of FIG. 11 may be used to obtain information about the environment to produce a 3D map of the environment.

FIG. 12 shows a flow chart of a process flow 1200 for another embodiment of this implementation. At S1202, a plurality of captured images of an environment, or portions of one or more video scan(s) of the environment, are stitched together to form a 3D map of the environment. For example, the image(s) from the process flow 1100 of FIG. 11 may be used in this regard. At S1204, the 3D map of the environment is updated to identify each object tagged as a smart device (e.g., based on the third neuromuscular activity at S1114 in FIG. 11). At S1206, for each smart device identified on the 3D map, a link is formed between the smart device and a control interface for that smart device. Thus, when the 3D map of the environment is accessed for use, each smart device identified in the 3D map is activated to be remotely controllable. At S1208, the 3D map of the environment is updated to identify each object tagged as a reference object (e.g., based on the second neuromuscular activity at S1110 in FIG. 11). At S1210, the updated 3D map is stored in a memory device such that the 3D map is searchable based on the reference object(s) identified on the 3D map for the environment. As will be appreciated, the link to the smart device may be any means for remotely controlling the smart device using IoT technology. In some embodiments, the link may be a user interface known in the art that enables communication of instructions from the user to the smart device via a server that processes the instructions and transmits control signals to the smart device. For example, the communication may be via Wi-Fi, Bluetooth, LAN, WAN, and/or any suitable technology, wired or wireless, for sending the instructions to the server. The server may be programmed to receive the instructions from the user interface, and to transmit appropriate control signals to the smart device. The transmission may be via Wi-Fi, Bluetooth, LAN, WAN, and/or any suitable technology, wired or wireless, for sending the control signals to the smart device. Thus, when a 3D map of an environment is accessed for use, user interfaces for smart devices in the environment may be accessed and activated for use, such that instructions determined from recognized neuromuscular activity of the user may be transmitted via the user interfaces to one or more server(s) corresponding to the smart devices, to process the instructions and control the smart devices of the environment in a manner analogous to control of smart devices conventionally via instructions received via, e.g., a tablet computer, a smartphone and/or one or more other input devices.

Implementation B—Use of 3D Map

According to some embodiments of an implementation of the present technology, a computerized system for remote control of devices is provided, which may be the system 100, or the system 1000, or a variation of these systems 100, 1000. The system may comprise a plurality of neuromuscular sensors, at least one camera, and at least one computer processor. The plurality of neuromuscular sensors may be arranged on at least one wearable device structured to be worn by a user to sense neuromuscular signals from the user. The at least one camera may be configured to capture information about an environment of interest to the user. The at least one computer processor may be programmed to access map information of the environment based on the information about the environment captured by the at least one camera. The map information may comprise information for controlling at least one controllable object in the environment. The at least one computer processor also may be programmed to, in response to a neuromuscular activity recognized from the neuromuscular signals sensed by the plurality of neuromuscular sensors, control the at least one controllable object to change from a first state to a second state.

In various embodiments of this implementation, the map information of the environment may be stored in a memory, and the at least one computer processor may be programmed to retrieve the map information from the memory based on information recognized from the information about the environment captured by the at least one camera. For example, the recognized information may be visible in the environment and may comprise any one or any combination of: a QR code, a graphical symbol, a string of alphanumeric text, a 3D object having a specific shape, and a physical relationship between at least two objects. The recognized information may comprise a reference object for the environment. As an example, if the camera detects a small desk and/or a small office lamp, the system can use that information and help identify the given environment as a home office environment; if the camera detects a couch and/or an ottoman, the system can use that information and help identify the environment as a living room or a family room; if the camera detects architectural lighting and/or ceiling fixtures, the system can use that information and help identify the environment as an office space or a warehouse; if the camera detects natural light in a range of wavelengths and/or detects a motor vehicle, the system can use that information and help identify the environment as outdoors; etc.

In various embodiments of this implementation, the map information may comprise map data on a physical relationship between two or more controllable objects in the environment. For example, the map data may comprise one or a plurality of established center point(s), and the physical relationship between the two or more controllable objects in the environment may be determined from the established center point(s). The map data may comprise 3D panoramic data of objects in the environment. In one example, the 3D panoramic data may comprise a partial view of the environment. In another example, the 3D panoramic data may comprise a representation of the environment through a single rotational axis or multiple different rotational axes.

In various embodiments of this implementation, the environment may be an XR environment comprising virtual objects and real-world objects. The at least one computer processor may be programmed to: determine, from the information about the environment captured by the at least one camera, a reference object in the environment; and to determine, from the map information, location information of the virtual objects and location information of the real-world objects. The map information may comprise location information of the at least one controllable object relative to the reference object.

In various embodiments of this implementation, the neuromuscular activity recognized from the neuromuscular signals sensed by the plurality of neuromuscular sensors results from the user performing at least one gesture relative to the at least controllable object while the user is in the environment. The at least one gesture may comprise any one or any combination of: the user moving at least one finger relative to the at least one controllable object (e.g., the user moving the at least one finger upward or downward relative to the at least one controllable object); the user moving a wrist relative to the at least one controllable object (e.g., the user tilting the wrist upward or downward relative to the at least one controllable object); the user moving an arm relative to the at least one controllable object (e.g., the user moving the arm upward or downward relative to the at least one controllable object); and the user using two or more fingers to perform a pinching motion relative to the at least one controllable object.

In various embodiments of the present implementation, the at least one controllable object may comprise a plurality of controllable objects. The at least one gesture may comprise a gesture relative to one of the plurality of controllable objects. The at least one computer processor may be programmed to, in response to the neuromuscular activity recognized from the neuromuscular signals sensed by the plurality of neuromuscular sensors, control each of the plurality of controllable objects to change from a first state to a second state.

In various embodiments of the present implementation, the environment may be any one or any combination of: one or more room(s) in a home; one or more room(s) in an business; one or more floor(s) of a multistory building; and an outdoor region.

In various embodiments of the present implementation, the at least one controllable object comprises any one or any combination of: a lamp, a display device, an electronic game, a window shade, a sound system, a lock, and a food or beverage preparation device.

Figure 13:
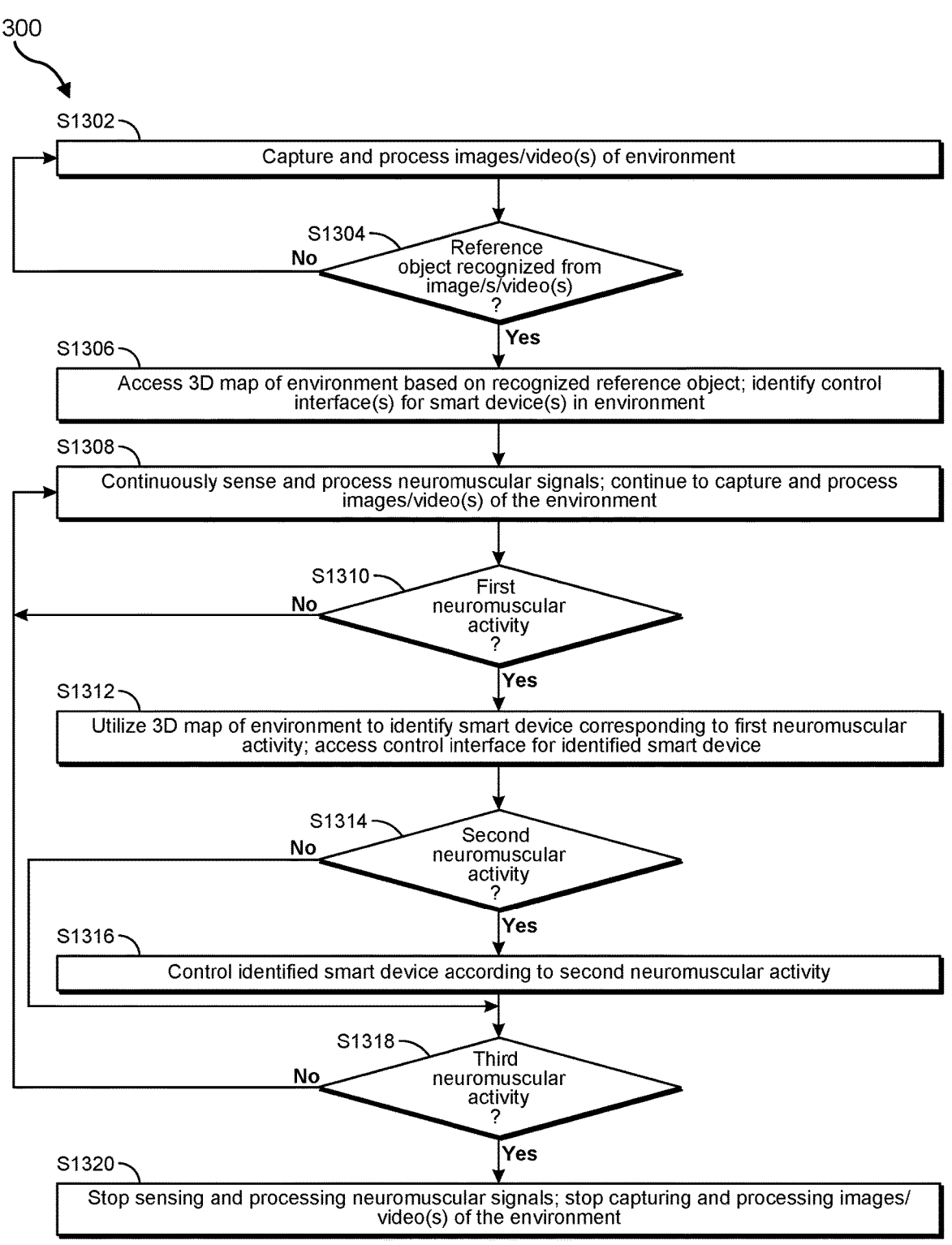
FIG. 13 shows a flowchart of a process in which neuromuscular signals and camera data are used in conjunction with a 3D map of an environment to control smart devices in the environment, in accordance with some embodiments of the technology described herein.

FIG. 13 shows a flow chart of a process flow 1300 for an embodiment of this implementation. At S1302, images/video(s) of an environment is or are captured by a camera. For example, the images/video(s) may be captured by a camera attached to a band worn around a user's arm. At S1304, the images/video(s) are processed to determine whether a reference object can be recognized. If not, the process flow 1300 returns to S1302. If so, at S1306, a 3D map of the environment is accessed based on the recognized reference object. Also, at S1306, one or more control inter- face(s) are identified for one or more smart device(s) in the environment. For example, the control interface(s) may be linked to the 3D map (e.g., see S1206 in FIG. 12). At S1308, the user's neuromuscular signals are sensed continuously by neuromuscular sensors, and the images/video(s) continue to be captured. For example, the neuromuscular sensors may be attached to the band on which the camera is attached. The process flow 1300 proceeds to S1310, at which a determi- nation is made as to whether the neuromuscular signals include one or more signal(s) corresponding to a first neuromuscular activity. If so, the process flow 1300 pro- ceeds to S1312; if not, the process flow 1300 returns to S1308. For example, the first neuromuscular activity may be the user pointing a finger. At S1312, the 3D map is utilized to identify a smart device corresponding to the first neuro- muscular activity, and a control interface for the identified smart device is accessed (e.g., via a link to the 3D map). A field of view of the 3D camera may be aligned with a direction of the user's arm, such that the user's finger may be captured in the images/video(s), to facilitate identification of the smart device. For example, the smart device may be a window shade (e.g., 908 in FIG. 9).

At S1314, a determination is made as to whether the neuromuscular signals include one or more signal(s) corre- sponding to a second neuromuscular activity. If not, the process flow 1300 proceeds to S1318. If so, the process flow 1300 proceeds to S1316, at which the identified smart device is controlled according to the second neuromuscular activity. Continuing with the previous example of the window shade, if the second neuromuscular activity is the user pinching a thumb and index finger together, the window shade may be controlled to close the window shade via an electronic mechanism activated by the control interface linked to the 3D map. At S1318, a determination is made as to whether the neuromuscular signals include one or more signal(s) corresponding to a third neuromuscular activity. If not, the process flow 1300 returns to S1308. If so, the process flow 1300 proceeds to S1320, at which the sensing and process- ing of neuromuscular signals stops, and the capturing of the image(s) stops.

In some embodiments of this implementation, the user may wear the wearable system 800, which may continuously stream image data, or periodically stream image data (e.g., A seconds of imaging "on" then B seconds of imaging "off" in an ABAB, etc., repeated sequence), or occasionally stream image data (e.g., C seconds "on" then "off" until a neuromuscular event is detected), while the user is in the environment. In these embodiments, the image data may be used to continuously or periodically or occasionally "local- ize" or determine the user's location and/or orientation in the environment. In the case of image data that is occasionally streamed, the C seconds of image data may be stored (e.g., in cache) and updated with a new C seconds of image data when the user, e.g., points his or her finger while in the environment; processing of the new C seconds of image data and the neuromuscular signals therefore may be performed together when the user performs an activity, but otherwise processing is held off to conserve use of processing resources. In this regard, in order to conserve processing resources, difference techniques may be used to store dif- ferent information between, e.g., a plurality of image frames, instead of storing the image frames in their entirety. For example, if the user is moving slowly in the environment and the image frames show slow variations of a wall as the user is moving, data corresponding to the variations may be stored instead of data of the entirety of the image frames.

In some embodiments of this implementation, the wear- able system 800 worn by the user may include an IMU sensor, which may help to localize the user in the environ- ment (i.e., determine the user's position and orientation). For example, data from the IMU sensor may improve localiza- tion processing by taking into consideration human arm constraints (discussed above) to give a more accurate deter- mination of the user's arm orientation (e.g., angle(s)). Local- ization of the user may be determined more quickly by using known human arm constraints to eliminate impossible arm positions from being part of the localization processing. For instance, a typical human arm may be rotated though an arc of, e.g., ±135° (based on a maximum possible arc of ±180° corresponding to a complete circle). Constraints on the user's arm position/orientation would eliminate the possi- bility that the user is pointing to an object that would require the user's arm to be rotated greater than ±135°, thus elimi- nating unnecessary calculations.

Implementation C—Hardware, Including Programmed Hardware

According to some embodiments of an implementation of the present technology, an electronic apparatus is provided. The apparatus may comprise: a wearable carrier; a plurality of neuromuscular sensors attached to the carrier; a camera system; and at least one computer processor configured to communicate electronically with the plurality of neuromus- cular sensors and the camera system. The apparatus may further comprise a communication interface configured to transmit signals between the plurality of neuromuscular sensors, the camera system, and the at least one computer processor. The communication interface may comprise any one or any combination of: a wiring that directly intercon- nects the plurality of neuromuscular sensors and the camera system; a wiring that directly interconnects the plurality of neuromuscular sensors and the at least one computer pro- cessor; a wiring that directly interconnects the camera system and the at least one computer processor; a wired communication bus interconnecting the plurality of neuro- muscular sensors, the camera system, and the at least one computer processor; a wireless signal transmitter; and a wireless signal receiver.

In various embodiments of this implementation, the at least one processor may be attached to the carrier, and may be configured to access a memory device to retrieve infor- mation and to store information. The memory device may be attached to the carrier.

In an embodiment of this implementation, the camera system may comprise at least two optical paths. For example, the camera system may comprise a stereoscopic camera.

In various embodiments of this implementation, the cam- era system may comprise: an imaging portion and a depth determination portion. The imaging portion may comprise any one or any combination of: a still-image camera, an RGB camera, a panoramic camera, and a video camera. The imaging portion may be equipped with various types of lenses and/or filters. For example, the imaging portion may be equipped with a wide-angle or fisheye lens, which may enable the imaging portion to capture a larger area of an environment, which in some serve to speed up tracking of objects in the environment. The depth determination portion may comprise a light-beam transmitter and receiver. For example, the light-beam transmitter and receiver may be an infrared-beam transmitter and receiver. The at least one computer processor may comprise a controller configured to control the imaging portion and the depth determination portion to capture data simultaneously.

In various embodiments of this implementation, the at least one computer processor may be programmed to: receive image signals from the imaging portion; receive depth signals from the depth determination portion; generate correlation data correlating at least a portion of the image signals with at least a portion of the depth signals; and cause the memory device to store the correlation data.

In various embodiments of this implementation, the carrier may be structured to be worn by a user. In one example, the carrier may be structured to be worn on a hand of the user (e.g., a glove). In another example, the carrier may be an arm band structured to be worn on an arm of the user (e.g., an elastic band, an adjustable belt). In this example, the arm band may be sized to encircle a wrist or a forearm portion of the user, and the plurality of neuromuscular sensors are arranged circumferentially on the arm band. The plurality of neuromuscular sensors may comprise EMG sensors.

In various embodiments of this implementation, the camera system may be arranged circumferentially on the arm band together with the plurality of neuromuscular sensors. For example, the camera system may be arranged on the arm band radially external to one or more of the plurality of neuromuscular sensors. The camera system may be arranged on the arm band to be movable to and from a perpendicular orientation, in which the camera system points radially outward from the arm band when the arm band is worn on the arm of the user, and an axial orientation, in which the camera system points axially in a direction parallel to a central axis of the arm band when the arm band is worn on the arm of the user. The camera system may be attached to a hinge that is structured to pivot the camera system from the perpendicular orientation to the axial orientation, to enable the camera system to capture image information in the perpendicular orientation, or the axial orientation, or an orientation between the perpendicular orientation and the axial orientation.

In various embodiments of the present implementation, the apparatus may further comprise a second carrier structured to be worn on a head of the user. The camera system may be attached to the second carrier.

In various embodiments of the present implementation, the apparatus may further comprise an auxiliary device attached to the wearable carrier or the second wearable carrier. The auxiliary device may comprise any one or any combination of: an IMU, a GPS, a radiation detector, a heart-rate monitor, a moisture (e.g., perspiration) detector, etc.

Implementation D—Interactions Via Neuromuscular Activity

According to some embodiments of an implementation of the present technology, a computerized system for performing interactions via neuromuscular activity is provided. The system may comprise: a plurality of neuromuscular sensors; a camera system; and at least one computer processor. The plurality of neuromuscular sensors, which may be configured to sense neuromuscular signals from a user, may be arranged on at least one wearable device worn by the user to obtain the neuromuscular signals. The camera system, which may be configured to capture information about an environment of interest to the user, may comprise an imaging portion and a depth determination portion. The at least one computer processor may be programmed to: receive the captured information from the camera system and the neuromuscular signals from the plurality of neuromuscular sensors; recognize the environment from the captured information; access control information associated with the environment recognized from the captured information, with the control information comprising information for performing at least one function associated with the environment; and, in response to a neuromuscular activity recognized from the neuromuscular signals, cause the at least one function to be performed.

In various embodiments of this implementation, the environment may be an outdoor region, and the control information may comprises information for performing an outdoor function. The outdoor function may be a transportation-related function. In one example, the transportation-related function may be to start an automobile. In another example, the transportation-related function may be to cause a request to be transmitted for a pickup at the outdoor region. The at least one computer processor may be programmed to transmit the request via an Internet transmission to a transportation service vendor.

In various embodiments of this implementation, the at least one computer processor may be programmed to determine whether a person is present in the environment based on the captured information. For example, the at least one computer processor may be programmed to determine that a person is present in the environment based on an one or any combination of: a recognized general shape of the person; a recognized presence of at least one limb on the person; a recognized facial characteristic of the person; a recognized movement of the person; and a recognized object carried by the person. The at least one computer processor may be further programmed such that, if it is determined that a person is in the environment, an identity of the person may be determined based on recognized facial characteristics of the person.

In various embodiments of this implementation, the system may further comprise a communication interface configured to transmit electronic signals to an external device and to receive electronic signals from the external device. The external device may be any one or any combination of: a smart device; a smartphone; a haptic device; a game; and a display device. In some embodiments, the at least one computer processor may be programmed to determine an identity of a person in the environment based on recognized facial characteristics of the person; to access an interactive control application based on the identity of the person; and to utilize the interactive control application to cause any one or any combination of: a personal message to be transmitted to a smartphone of the person, a game move to be performed in an electronic game played by the person, an activation of a haptic device worn by the person, an image to be displayed on a display device viewable by the person in the environment, and permit the person to control of a function of the environment. The at least one computer processor may be programmed to cause permission to be granted to the person to control any one or any combination of: the electronic game, the display device, a smartphone of the user, and a haptic device worn by the user.

In various embodiments of this implementation, the at least one computer processor may be programmed to utilize the interactive control application to generate an XR environment in which the user and the person may interact. In one example, the at least one computer processor may be programmed to enable the user to interact with the person in the XR environment based on neuromuscular activities recognized from the neuromuscular signals sensed by the plurality of neuromuscular sensors. In another example, the at least one computer processor may be programmed to utilize the interactive control application to: turn on an electronic device operable by the user and the person, and, in response to one or more neuromuscular activities recognized from the neuromuscular signals sensed by the plurality of neuromuscular sensors, control at least one operation of the electronic device. For instance, the electronic device may be a game playable by the user and the person, and, in response to the one or more neuromuscular activities recognized from the neuromuscular signals, the at least one computer processor controls any one or any combination of: a game-player movement, a game effect, and a game setting.

Figure 14B:
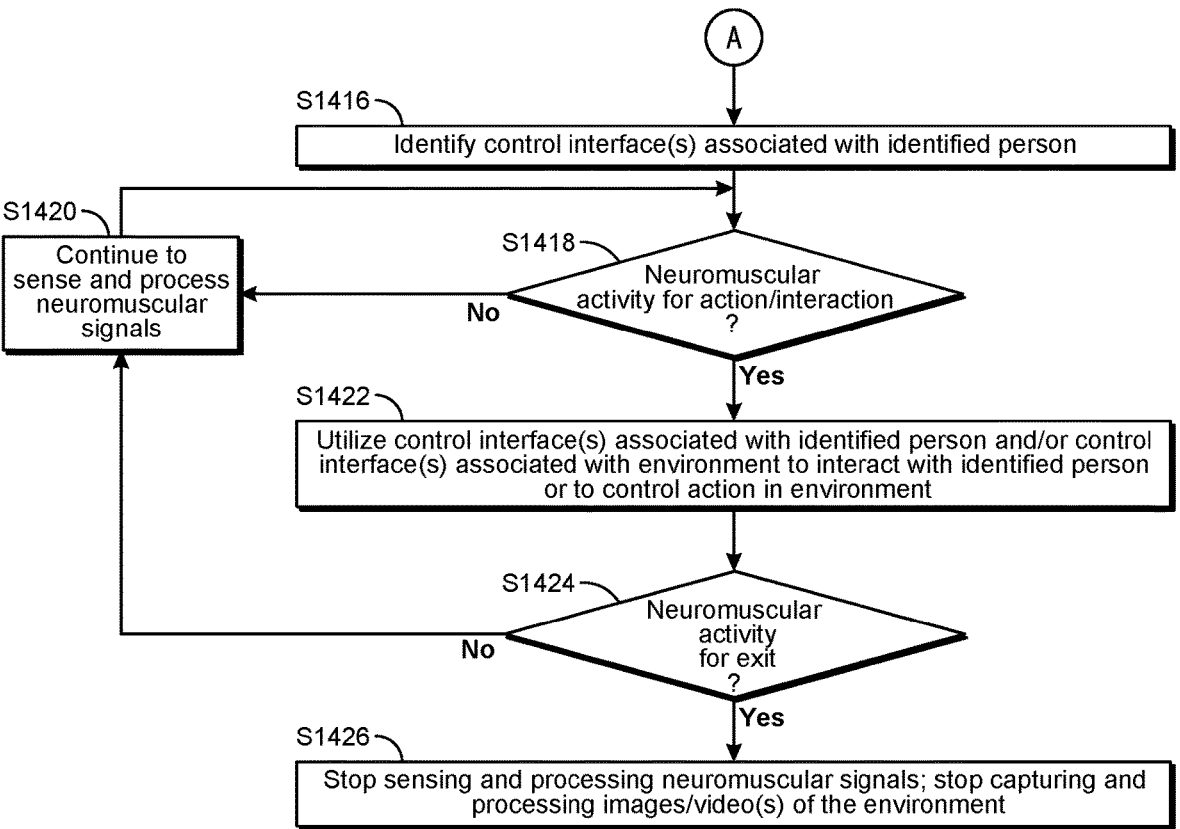

FIGS. 14A and 14B show a flow chart of a process flow 1400 for an embodiment of this implementation. At S1402, images/video(s) of an environment is or are captured by a camera. For example, the images/video(s) may be captured by a camera attached to a band worn around a user's arm. At S1404, the images/video(s) are processed to determine whether a reference object can be recognized. If not, the process flow 1400 returns to S1402. If so, at S1406, a 3D map of the environment is accessed based on the recognized reference object. Also, at S1406, one or more control interface(s) are identified for the environment. For example, the control interface(s) may be for communication functions linked to the environment of the 3D map. At S1408, the user's neuromuscular signals are sensed continuously by neuromuscular sensors, and the images/video(s) continue to be captured. For example, the neuromuscular sensors may be attached to the band on which the camera is attached. The process flow 1400 proceeds to S1410, at which a determination is made as to whether a person is detected in the environment. For example, detection may be via a determination that an object in the images/video(s) is shaped like a human. If a person is detected, the process flow 1400 proceeds to S1412; if not, the process flow 1400 returns to S1408.

At S1412, processing is performed to identify the person. For example, if the person is carrying a smartphone or other electronic device (e.g., another neuromuscular armband or wristband), a signal from the smartphone or other electronic device may be detected by electronic circuitry (e.g., NFC circuitry, RFID circuitry, etc.) attached to the band on which the camera is attached. In another example, facial detection may be used to identify the person from the images/video(s). In yet another example, the person may be wearing a wearable system (e.g., the wearable system 800 in FIG. 8A), which may provide an identification signal useable to identify the person. At S1414, if the person cannot be identified, the process flow 1400 returns to S1408. If the person is identified at S1414, the process flow 1400 proceeds to S1416, at which one or more control interface(s) associated with the identified person is or are identified and accessed for use.

At S1418, a determination is made as to whether the neuromuscular signals include one or more signal(s) corresponding to a neuromuscular activity for an action in the environment or an interaction with the identified person. If so, the process flow 1400 proceeds to S1422; if not, the process flow 1400 returns to S1418 via S1420, where the user's neuromuscular signals continue to be sensed and processed to determine whether there is neuromuscular activity for an action in the environment or an interaction with the identified person.

At S1422 the control interface(s) associated with the identified person and/or the control interface(s) associated with the environment is or are used to interact with the identified person (e.g., send a text message to the identified person's smartphone) and/or to control an action in the environment (e.g., initiate XR functions in the environment). At S1424, a determination is made as to whether the neuromuscular signals include one or more signal(s) corresponding to a neuromuscular activity to exit control operations and interactions in the environment. If not, the process flow 1400 proceeds to S1418 via S1420. If so, the process flow 1400 proceeds to S1426, at which at which the sensing and processing of neuromuscular signals stops, and the capturing of the images/video(s) stops. If the system interacts with the identified person, such interactions can comprise any one or any combination of: sending discrete text or email messages to the identified person's mobile phone or computer, synchronizing one or more smart devices between the user and the identified person, sending a message or communication in an XR environment that the identified person can see in the XR environment, etc.

In some embodiments, two or users may interact with the XR environment. Each user (e.g., User A and User B) may be uniquely identified to the XR system by a wearable device (e.g., the wearable system 800 in FIG. 8A). In such a case, no facial recognition would be necessary, because each user's wearable device would be registered to a different account in the XR system, such that each wearable device would uniquely identify the user to the XR system. Thus, each user may interact with objects in the XR environment independently of the other user, and also may interact with the other user in the XR environment. Further, each user may be associated with a different 3D map for the same XR environment (e.g., User A may be a child and may only have control of lamps in the XR environment of User A's 3D map, while User B may have control of a television and a video-game system in the XR environment of User B's 3D map). In an embodiment, when multiple users are in the same XR environment at the same time, the XR system may enable all the users to share control of each other's controllable objects (e.g., User A and User B may both perform control operations with the video-game system). In this regard, User A's 3D map may be merged or stitched together with User B's 3D map when User A and User B are both in the same XR environment.

In a cloud-based embodiment, an environment may be associated with a plurality of users, and each of the users may be equipped with a wearable band (e.g., the wearable system 800 in FIG. 8A) useable to control one or more object(s) in the environment. For example, the environment may be a workplace having multiple different regions, and the plurality of users may be employees of the workplace. Employees A and C may be associated with Map A1 of region A and Map C of region C of the environment. Employees B and D may be associated with Map A2 of region A and Map B of region B of the environment. Maps A1, A2, B, and C may be stored remotely in a cloud facility, which may be controlled by workplace management personnel. Thus, the workplace management personnel may authorize a first group of employees to have permission to control a first group of object(s) within region A via Map A1, and may authorize a second group of employees to have permission to control a second group of object(s) within the same region A via Map A2.

Workplace management personnel may control each employee's authorization details via the employees wearable band, and may change an employee's authorization(s) via the employee's wearable band. Each wearable band may be associated with an identification code, which may be used to associate the wearable band with one or more 3D maps of the regions of the environment. For instance, the environment may be a warehouse having several stock rooms, and Map A1 may permit a group of employees to operate heavy machinery in region A while Map A2 may permit another group of employees to operate light machinery in region A. As will be appreciated, some employees may be associated with Maps A1 and A2, and thus may be permitted to operate light machinery and heavy machinery. As will be appreciated, various other types of control may be set up for the regions of the environment by the workplace management personnel using the 3D maps for the regions of the environment, and the description above is illustrative of just one example.

Each wearable band may emit an identification signal when in the environment (e.g., using RFID technology, NFC technology, GPS technology and the like). Such a signal may be used to determine which employee is in the environment, and roughly where the employee is in the environment (e.g., which region of the environment); the localization techniques described above (e.g., using a video stream) may be used to determine a more exact location of the user (e.g., where the employee is located within the region of the environment). In some embodiments, such a signal may be used access one or more 3D maps, which may enable the employee corresponding to the signal to control object(s) in the environment or to interact in other ways with the environment (e.g., to enable a first employee in the environment to interact with a second employee in the environment via a neuromuscular action indicating a desire to transfer a control authorization from the first employee to the second employee; to enable the first employee to send a haptic warning signal to the second employee; etc.).

As will be appreciated, cloud-based storage of 3D maps and other information useable by management personnel may enable centralized oversight of a workplace environment that may encompass regions in multiple cities and/or multiple states and/or multiple countries. For example, the management personnel can control employees by controlling authorizations or permissions granted to each of the employees, which may differ from employee to employee based on each employee's wearable band and the 3D map(s) associated with each employee's wearable band.

Example Embodiments

Example 1: A computerized system for remote control of devices may include a plurality of neuromuscular sensors configured to sense neuromuscular signals from a user, where the plurality of neuromuscular sensors is arranged on at least one wearable device structured to be worn by the user to obtain the neuromuscular signals. The system may further include at least one camera able to capture information about an environment and at least one computer processor programmed to: access map information of the environment based on the information about the environment captured by the at least one camera, the map information comprising information for controlling at least one controllable object in the environment and, in response to a neuromuscular activity recognized from the neuromuscular signals sensed by the plurality of neuromuscular sensors, control the at least one controllable object to change from a first state to a second state.

Example 2: The system of Example 1, wherein: the map information of the environment is stored in a memory, and the at least one computer processor retrieves the map information from the memory based on information recognized from the information about the environment captured by the at least one camera.

Example 3: The system of Examples 1 or 2, wherein the recognized information is visible in the environment and comprises at least one of: a QR code, a graphical symbol, a string of alphanumeric text, a 3D object having a specific shape, or a physical relationship between at least two objects.

Example 4: The system of any of Examples 1-3, wherein the recognized information comprises a reference object for the environment.

Example 5: The system of any of Examples 1-4, wherein the map information comprises map data representing a physical relationship between two or more controllable objects in the environment.

Example 6: The system of any of Examples 1-5, wherein the map data is 3D panoramic data of objects in the environment, the objects comprising the at least one controllable object.

Example 7: The system of any of Examples 1-6, wherein the 3D panoramic data comprises a 360° representation of the environment.

Example 8: The system of any of Examples 1-7, wherein the 3D panoramic data comprises data relative to a single rotational axis.

Example 9: The system of any of Examples 1-8, wherein the 3D panoramic data comprises a representation of a partial view of the environment.

Example 10: The system of any of Examples 1-9, wherein the map information comprises a plurality of established center points, and wherein the physical relationship between two or more controllable objects in the environment is determined from the established center points.

Example 11: The system of any of Examples 1-10, wherein the environment is an extended reality (XR) environment comprising virtual objects and real-world objects, wherein the at least one computer processor is programmed to: determine, from the map information, location information of the virtual objects and location information of the real-world objects, and determine, from the information about the environment captured by the at least one camera, a reference object in the environment, and wherein the map information comprises location information of the at least one controllable object relative to the reference object.

Example 12: The system of any of Examples 1-11, wherein the neuromuscular activity recognized from the neuromuscular signals sensed by the plurality of neuromuscular sensors results from the user performing at least one gesture relative to the at least controllable object while the user is in the environment.

Example 13: The system of any of Examples 1-12, wherein the at least one gesture comprises any one or any combination of: the user moving at least one finger relative to the at least one controllable object, the user moving a wrist relative to the at least one controllable object, the user moving an arm relative to the at least one controllable object, the user applying a force without a movement relative to the at least one controllable object, and the user activating a motor unit without a movement relative to the at least one controllable object and without a force relative to the at least one controllable object.

Example 14: The system of any of Examples 1-13, wherein the neuromuscular activity recognized from the neuromuscular signals sensed by the plurality of neuromuscular sensors results from the user performing a motor-unit activation potential (MUAP) activity relative to the at least controllable object while the user is in the environment.

Example 15: The system of any of Examples 1-14, wherein the at least one gesture comprises at least one of the following: the user using two or more fingers to perform a pinching motion relative to the at least one controllable object, the user tilting the wrist upward or downward relative to the at least one controllable object, the user moving the arm upward or downward relative to the at least one controllable object, or the user moving the at least one finger upward or downward relative to the at least one controllable object.

Example 16: The system of any of Examples 1-15, wherein: the at least one controllable object comprises a plurality of controllable objects, the at least one gesture comprises a gesture relative to one of the plurality of controllable objects, and the at least one computer processor is programmed to, in response to the control signal, control each of the plurality of controllable objects to change from a first state to a second state.

Example 17: The system of any of Examples 1-16, wherein the environment is at least one of: a room in a home, a room in a business, a story of a multistory building, or an outdoor region.

Example 18: The system of any of Examples 1-17, wherein the at least one controllable object comprises any one or any combination of: a display device, a lamp, an electronic game, a window shade, a sound system, a lock, and a food or beverage preparation device.

Example 19: A computer-implemented method comprising: activating a plurality of neuromuscular sensors configured to sense neuromuscular signals from a user, the plurality of neuromuscular sensors being arranged on at least one wearable device structured to be worn by the user to obtain the neuromuscular signals, activating at least one camera able to capture information about an environment, accessing map information of the environment based on the information about the environment captured by the at least one camera, the map information comprising information for controlling at least one controllable object in the environment, and in response to a neuromuscular activity recognized from the neuromuscular signals sensed by the plurality of neuromuscular sensors, controlling the at least one controllable object to change from a first state to a second state.

Example 20: A wearable electronic device comprising: a plurality of neuromuscular sensors configured to sense neuromuscular signals from a user, the plurality of neuromuscular sensors being arranged on at least one wearable device structured to be worn by the user to obtain the neuromuscular signals, at least one camera able to capture information about an environment, and at least one computer processor programmed to: access map information of the environment based on the information about the environment captured by the at least one camera, the map information comprising information for controlling at least one controllable object in the environment, and in response to a neuromuscular activity recognized from the neuromuscular signals sensed by the plurality of neuromuscular sensors, control the at least one controllable object to change from a first state to a second state.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1500 in FIG. 15) or that visually immerses a user in an artificial reality (such as, e.g., virtual-reality system 1600 in FIG. 16). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 15:
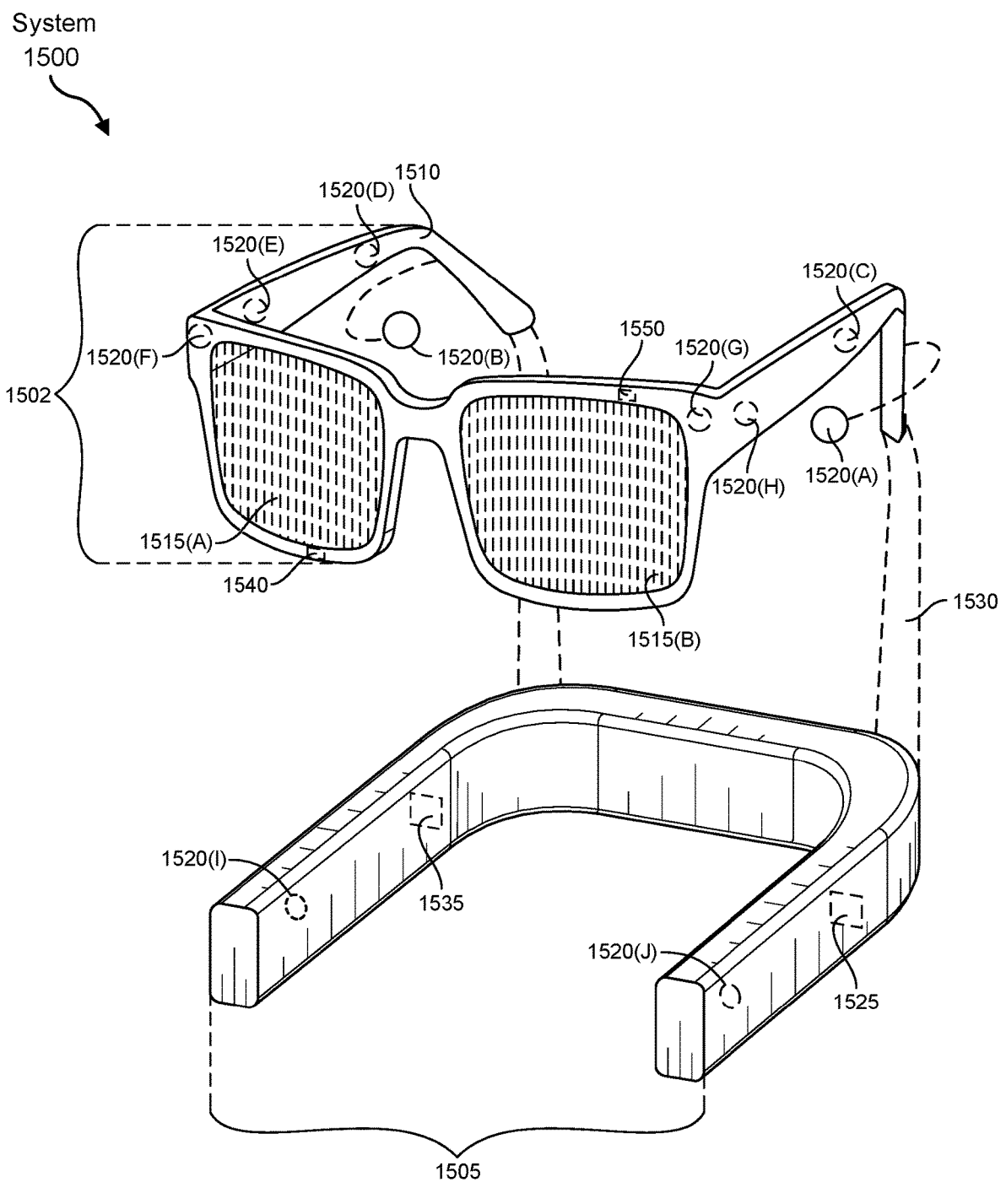
FIG. 15 is an illustration of exemplary augmented-reality glasses that may be used in connection with embodiments of this disclosure.

Turning to FIG. 15, augmented-reality system 1500 may include an eyewear device 1502 with a frame 1510 configured to hold a left display device 1515(A) and a right display device 1515(B) in front of a user's eyes. Display devices 1515(A) and 1515(B) may act together or independently to present an image or series of images to a user. While augmented-reality system 1500 includes two displays, embodiments of this disclosure may be implemented in augmented-reality systems with a single NED or more than two NEDs.

In some embodiments, augmented-reality system 1500 may include one or more sensors, such as sensor 1540. Sensor 1540 may generate measurement signals in response to motion of augmented-reality system 1500 and may be located on substantially any portion of frame 1510. Sensor 1540 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1500 may or may not include sensor 1540 or may include more than one sensor. In embodiments in which sensor 1540 includes an IMU, the IMU may generate calibration data based on measurement signals from sensor 1540. Examples of sensor 1540 may include, without limitation, accelerometers, gyroscopes, magnetometers, other suitable types of sensors that detect motion, sensors used for error correction of the IMU, or some combination thereof.

In some examples, augmented-reality system 1500 may also include a microphone array with a plurality of acoustic transducers 1520(A)-1520(J), referred to collectively as acoustic transducers 1520. Acoustic transducers 1520 may represent transducers that detect air pressure variations induced by sound waves. Each acoustic transducer 1520 may be configured to detect sound and convert the detected sound into an electronic format (e.g., an analog or digital format). The microphone array in FIG. 15 may include, for example, ten acoustic transducers: 1520(A) and 1520(B), which may be designed to be placed inside a corresponding ear of the user, acoustic transducers 1520(C), 1520(D), 1520(E), 1520(F), 1520(G), and 1520(H), which may be positioned at various locations on frame 1510, and/or acoustic transducers 1520(I) and 1520(J), which may be positioned on a corresponding neckband 1505.

In some embodiments, one or more of acoustic transducers 1520(A)-(J) may be used as output transducers (e.g., speakers). For example, acoustic transducers 1520(A) and/ or 1520(B) may be earbuds or any other suitable type of headphone or speaker.

The configuration of acoustic transducers 1520 of the microphone array may vary. While augmented-reality system 1500 is shown in FIG. 15 as having ten acoustic transducers 1520, the number of acoustic transducers 1520 may be greater or less than ten. In some embodiments, using higher numbers of acoustic transducers 1520 may increase the amount of audio information collected and/or the sensitivity and accuracy of the audio information. In contrast, using a lower number of acoustic transducers 1520 may decrease the computing power required by an associated controller 1550 to process the collected audio information. In addition, the position of each acoustic transducer 1520 of the microphone array may vary. For example, the position of an acoustic transducer 1520 may include a defined position on the user, a defined coordinate on frame 1510, an orientation associated with each acoustic transducer 1520, or some combination thereof.

Acoustic transducers 1520(A) and 1520(B) may be positioned on different parts of the user's ear, such as behind the pinna, behind the tragus, and/or within the auricle or fossa. Or, there may be additional acoustic transducers 1520 on or surrounding the ear in addition to acoustic transducers 1520 inside the ear canal. Having an acoustic transducer 1520 positioned next to an ear canal of a user may enable the microphone array to collect information on how sounds arrive at the ear canal. By positioning at least two of acoustic transducers 1520 on either side of a user's head (e.g., as binaural microphones), augmented-reality device 1500 may simulate binaural hearing and capture a 3D stereo sound field around about a user's head. In some embodiments, acoustic transducers 1520(A) and 1520(B) may be connected to augmented-reality system 1500 via a wired connection 1530, and in other embodiments acoustic transducers 1520(A) and 1520(B) may be connected to augmented-reality system 1500 via a wireless connection (e.g., a Bluetooth connection). In still other embodiments, acoustic transducers 1520(A) and 1520(B) may not be used at all in conjunction with augmented-reality system 1500.

Acoustic transducers 1520 on frame 1510 may be positioned in a variety of different ways, including along the length of the temples, across the bridge, above or below display devices 1515(A) and 1515(B), or some combination thereof. Acoustic transducers 1520 may also be oriented such that the microphone array is able to detect sounds in a wide range of directions surrounding the user wearing the augmented-reality system 1500. In some embodiments, an optimization process may be performed during manufacturing of augmented-reality system 1500 to determine relative positioning of each acoustic transducer 1520 in the microphone array.

In some examples, augmented-reality system 1500 may include or be connected to an external device (e.g., a paired device), such as neckband 1505. Neckband 1505 generally represents any type or form of paired device. Thus, the following discussion of neckband 1505 may also apply to various other paired devices, such as charging cases, smart watches, smart phones, wrist bands, other wearable devices, hand-held controllers, tablet computers, laptop computers, other external compute devices, etc.

As shown, neckband 1505 may be coupled to eyewear device 1502 via one or more connectors. The connectors may be wired or wireless and may include electrical and/or non-electrical (e.g., structural) components. In some cases, eyewear device 1502 and neckband 1505 may operate independently without any wired or wireless connection between them. While FIG. 15 illustrates the components of eyewear device 1502 and neckband 1505 in example locations on eyewear device 1502 and neckband 1505, the components may be located elsewhere and/or distributed differently on eyewear device 1502 and/or neckband 1505. In some embodiments, the components of eyewear device 1502 and neckband 1505 may be located on one or more additional peripheral devices paired with eyewear device 1502, neckband 1505, or some combination thereof.

Pairing external devices, such as neckband 1505, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1500 may be provided by a paired device or shared between a paired device and an eyewear device, thus reducing the weight, heat profile, and form factor of the eyewear device overall while still retaining desired functionality. For example, neckband 1505 may allow components that would otherwise be included on an eyewear device to be included in neckband 1505 since users may tolerate a heavier weight load on their shoulders than they would tolerate on their heads. Neckband 1505 may also have a larger surface area over which to diffuse and disperse heat to the ambient environment. Thus, neckband 1505 may allow for greater battery and computation capacity than might otherwise have been possible on a stand-alone eyewear device. Since weight carried in neckband 1505 may be less invasive to a user than weight carried in eyewear device 1502, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1505 may be communicatively coupled with eyewear device 1502 and/or to other devices. These other devices may provide certain functions (e.g., tracking, localizing, depth mapping, processing, storage, etc.) to augmented-reality system 1500. In the embodiment of FIG. 15, neckband 1505 may include two acoustic transducers (e.g., 1520(I) and 1520(J)) that are part of the microphone array (or potentially form their own microphone subarray). Neckband 1505 may also include a controller 1525 and a power source 1535.

Acoustic transducers 1520(I) and 1520(J) of neckband 1505 may be configured to detect sound and convert the detected sound into an electronic format (analog or digital). In the embodiment of FIG. 15, acoustic transducers 1520(I) and 1520(J) may be positioned on neckband 1505, thereby increasing the distance between the neckband acoustic transducers 1520(I) and 1520(J) and other acoustic transducers 1520 positioned on eyewear device 1502. In some cases, increasing the distance between acoustic transducers 1520 of the microphone array may improve the accuracy of beamforming performed via the microphone array. For example, if a sound is detected by acoustic transducers 1520(C) and 1520(D) and the distance between acoustic transducers 1520(C) and 1520(D) is greater than, e.g., the distance between acoustic transducers 1520(D) and 1520(E), the determined source location of the detected sound may be more accurate than if the sound had been detected by acoustic transducers 1520(D) and 1520(E).

Controller 1525 of neckband 1505 may process information generated by the sensors on neckband 1505 and/or augmented-reality system 1500. For example, controller 1525 may process information from the microphone array that describes sounds detected by the microphone array. For each detected sound, controller 1525 may perform a direction-of-arrival (DOA) estimation to estimate a direction from which the detected sound arrived at the microphone array. As the microphone array detects sounds, controller 1525 may populate an audio data set with the information. In embodiments in which augmented-reality system 1500 includes an inertial measurement unit, controller 1525 may compute all inertial and spatial calculations from the IMU located on eyewear device 1502. A connector may convey information between augmented-reality system 1500 and neckband 1505 and between augmented-reality system 1500 and controller 1525. The information may be in the form of optical data, electrical data, wireless data, or any other transmittable data form. Moving the processing of information generated by augmented-reality system 1500 to neckband 1505 may reduce weight and heat in eyewear device 1502, making it more comfortable to the user.

Power source 1535 in neckband 1505 may provide power to eyewear device 1502 and/or to neckband 1505. Power source 1535 may include, without limitation, lithium ion batteries, lithium-polymer batteries, primary lithium batteries, alkaline batteries, or any other form of power storage. In some cases, power source 1535 may be a wired power source. Including power source 1535 on neckband 1505 instead of on eyewear device 1502 may help better distribute the weight and heat generated by power source 1535.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1600 in FIG. 16, that mostly or completely covers a user's field of view. Virtual-reality system 1600 may include a front rigid body 1602 and a band 1604 shaped to fit around a user's head. Virtual-reality system 1600 may also include output audio transducers 1606(A) and 1606(B). Furthermore, while not shown in FIG. 16, front rigid body 1602 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 1500 and/or virtual-reality system 1600 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1500 and/or virtual-reality system 1600 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1500 and/or virtual-reality system 1600 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, augmented-reality systems 1500 and 1600 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 17:
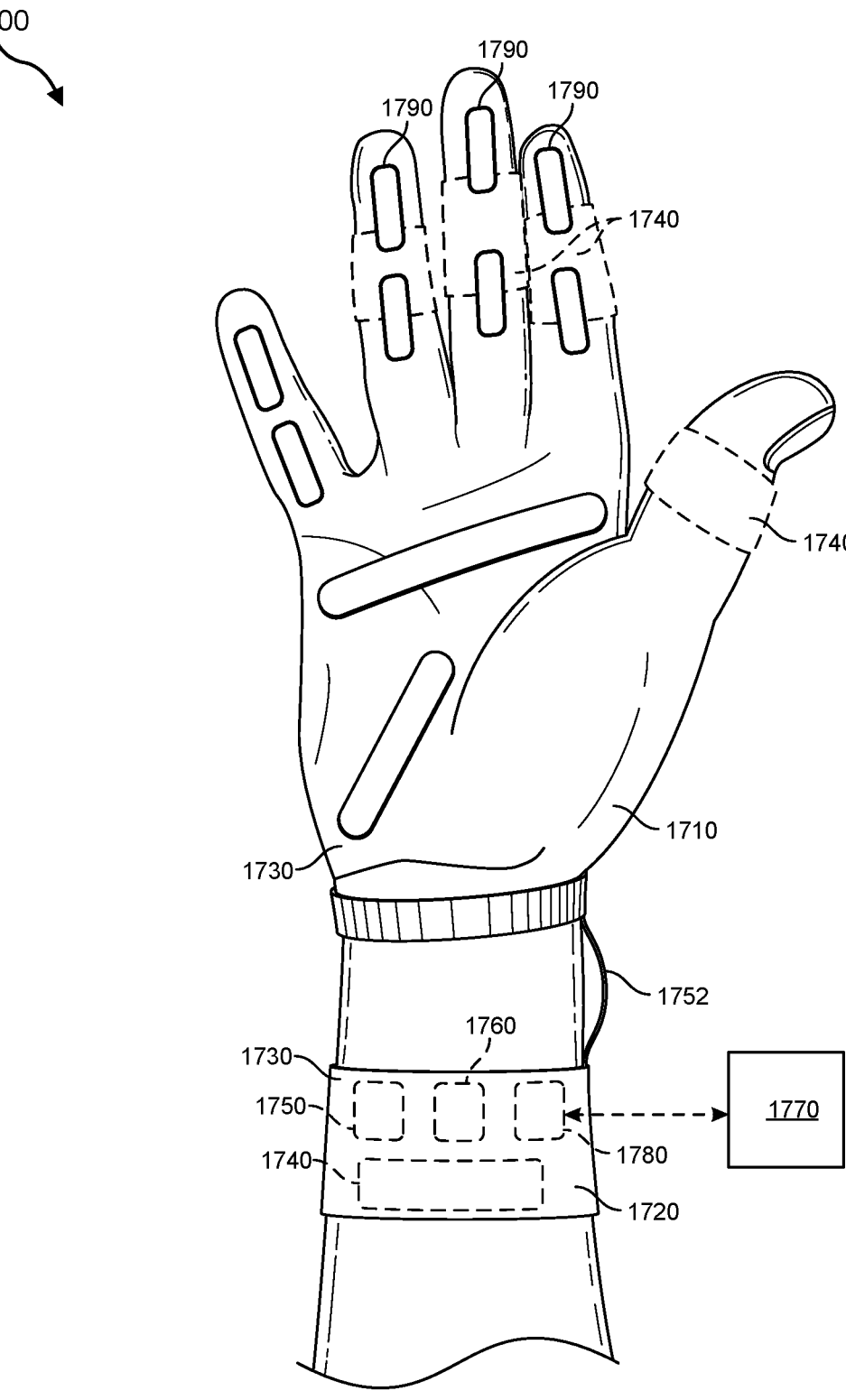
FIG. 17 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 17 illustrates a vibrotactile system 1700 in the form of a wearable glove (haptic device 1710) and wristband (haptic device 1720). Haptic device 1710 and haptic device 1720 are shown as examples of wearable devices that include a flexible, wearable textile material 1730 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1740 may be positioned at least partially within one or more corresponding pockets formed in textile material 1730 of vibrotactile system 1700. Vibrotactile devices 1740 may be positioned in locations to provide a vibrating sensation (e.g., haptic feedback) to a user of vibrotactile system 1700. For example, vibrotactile devices 1740 may be positioned against the user's finger(s), thumb, or wrist, as shown in FIG. 17. Vibrotactile devices

1740 may, in some examples, be sufficiently flexible to conform to or bend with the user's corresponding body part(s).

A power source 1750 (e.g., a battery) for applying a voltage to the vibrotactile devices 1740 for activation thereof may be electrically coupled to vibrotactile devices 1740, such as via conductive wiring 1752. In some examples, each of vibrotactile devices 1740 may be independently electrically coupled to power source 1750 for individual activation. In some embodiments, a processor 1760 may be operatively coupled to power source 1750 and configured (e.g., programmed) to control activation of vibrotactile devices 1740.

Vibrotactile system 1700 may be implemented in a variety of ways. In some examples, vibrotactile system 1700 may be a standalone system with integral subsystems and components for operation independent of other devices and systems. As another example, vibrotactile system 1700 may be configured for interaction with another device or system 1770. For example, vibrotactile system 1700 may, in some examples, include a communications interface 1780 for receiving and/or sending signals to the other device or system 1770. The other device or system 1770 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1780 may enable communications between vibrotactile system 1700 and the other device or system 1770 via a wireless (e.g., Wi-Fi, Bluetooth, cellular, radio, etc) link or a wired link If present, communications interface 1780 may be in communication with processor 1760, such as to provide a signal to processor 1760 to activate or deactivate one or more of the vibrotactile devices 1740.

Vibrotactile system 1700 may optionally include other subsystems and components, such as touch-sensitive pads 1790, pressure sensors, motion sensors, position sensors, lighting elements, and/or user interface elements (e.g., an on/off button, a vibration control element, etc.). During use, vibrotactile devices 1740 may be configured to be activated for a variety of different reasons, such as in response to the user's interaction with user interface elements, a signal from the motion or position sensors, a signal from the touch-sensitive pads 1790, a signal from the pressure sensors, a signal from the other device or system 1770, etc.

Although power source 1750, processor 1760, and communications interface 1780 are illustrated in FIG. 17 as being positioned in haptic device 1720, the present disclosure is not so limited. For example, one or more of power source 1750, processor 1760, or communications interface 1780 may be positioned within haptic device 1710 or within another wearable textile.

Figure 18:
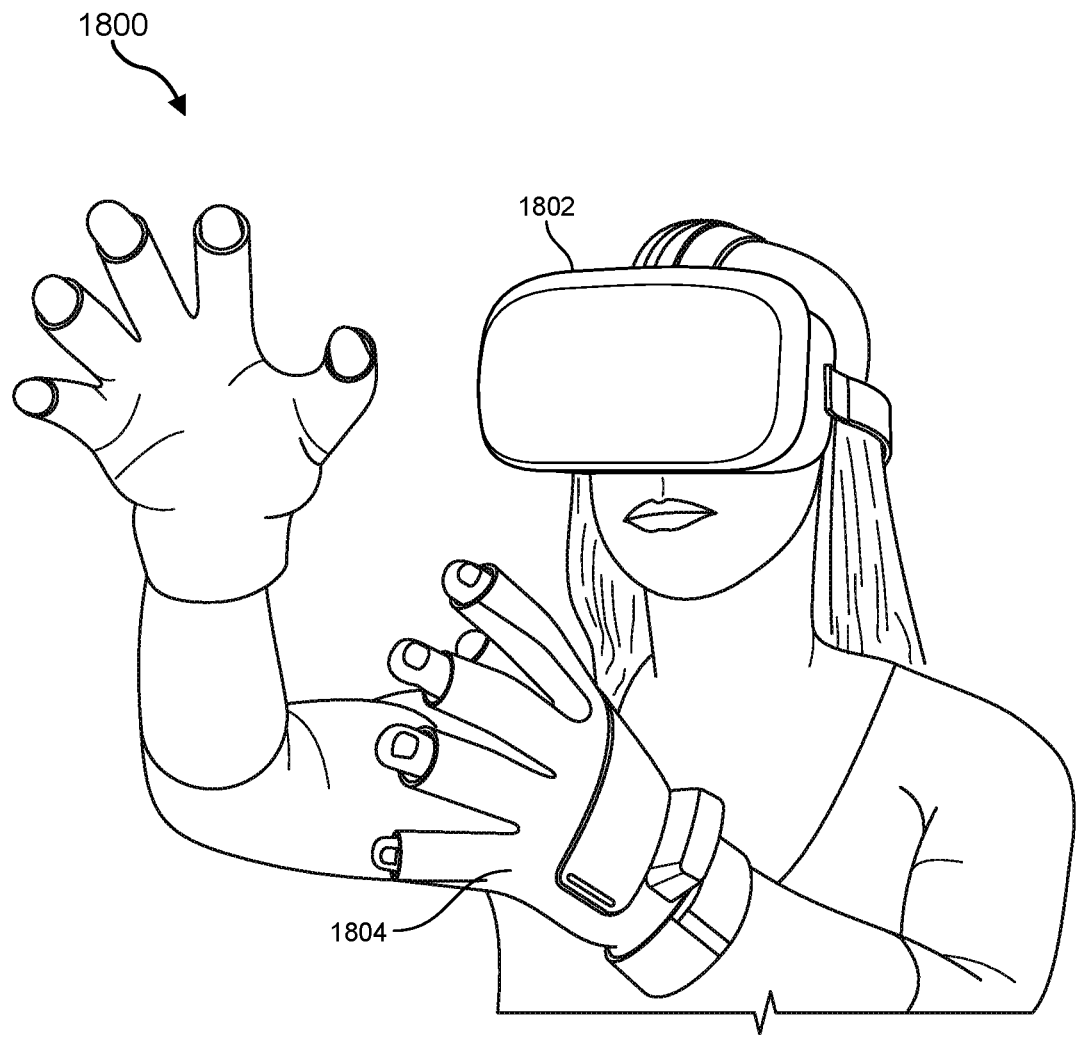
FIG. 18 is an illustration of an exemplary virtual-reality environment according to embodiments of this disclosure.

Haptic wearables, such as those shown in and described in connection with FIG. 17, may be implemented in a variety of types of artificial-reality systems and environments. FIG. 18 shows an example artificial-reality environment 1800 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 16:
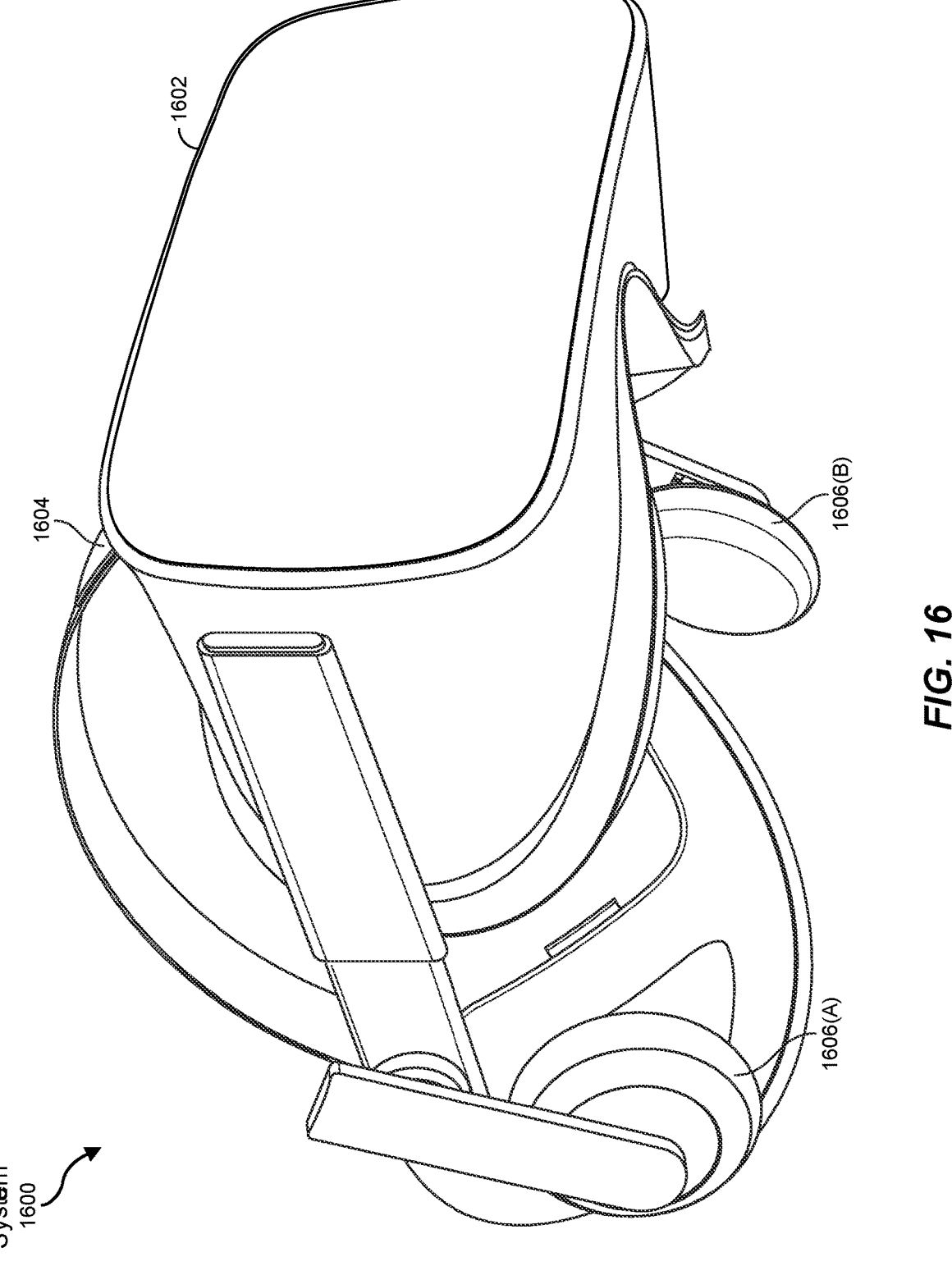
FIG. 16 is an illustration of an exemplary virtual-reality headset that may be used in connection with embodiments of this disclosure.

Head-mounted display 1802 generally represents any type or form of virtual-reality system, such as virtual-reality system 1600 in FIG. 16. Haptic device 1804 generally represents any type or form of wearable device, worn by a user of an artificial-reality system, that provides haptic feedback to the user to give the user the perception that he or she is physically engaging with a virtual object. In some embodiments, haptic device 1804 may provide haptic feedback by applying vibration, motion, and/or force to the user. For example, haptic device 1804 may limit or augment a user's movement. To give a specific example, haptic device 1804 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 1804 to send action requests to a console. Examples of action requests include, without limitation, requests to start an application and/or end the application and/or requests to perform a particular action within the application.

Figure 19:
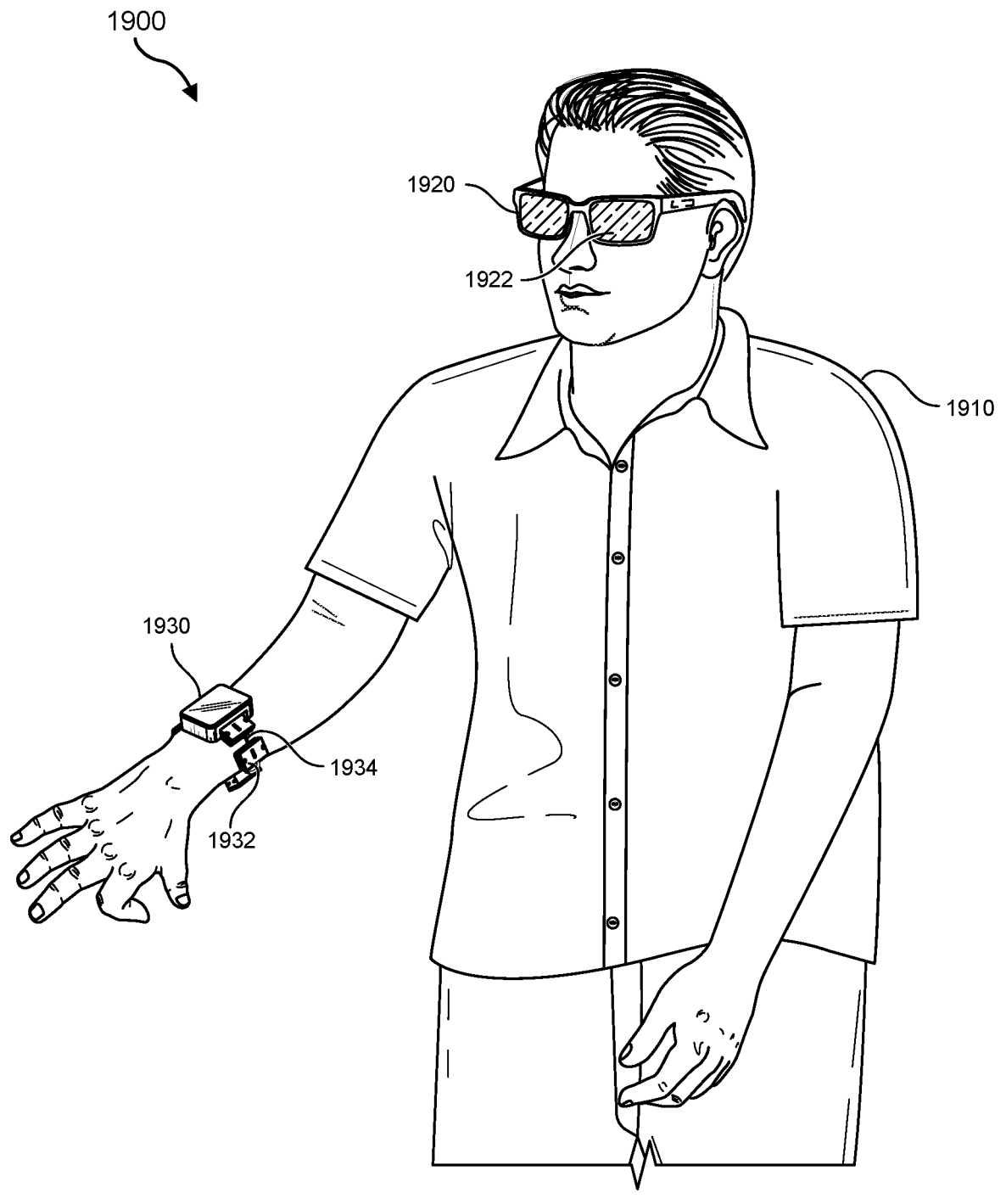
FIG. 19 is an illustration of an exemplary augmented-reality environment according to embodiments of this disclosure.

While haptic interfaces may be used with virtual-reality systems, as shown in FIG. 18, haptic interfaces may also be used with augmented-reality systems, as shown in FIG. 19. FIG. 19 is a perspective view of a user 1910 interacting with an augmented-reality system 1900. In this example, user 1910 may wear a pair of augmented-reality glasses 1920 that may have one or more displays 1922 and that are paired with a haptic device 1930. In this example, haptic device 1930 may be a wristband that includes a plurality of band elements 1932 and a tensioning mechanism 1934 that connects band elements 1932 to one another.

One or more of band elements 1932 may include any type or form of actuator suitable for providing haptic feedback. For example, one or more of band elements 1932 may be configured to provide one or more of various types of cutaneous feedback, including vibration, force, traction, texture, and/or temperature. To provide such feedback, band elements 1932 may include one or more of various types of actuators. In one example, each of band elements 1932 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1710, 1720, 1804, and 1930 may include any suitable number and/or type of haptic transducer, sensor, and/or feedback mechanism. For example, haptic devices 1710, 1720, 1804, and 1930 may include one or more mechanical transducers, piezoelectric transducers, and/or fluidic transducers. Haptic devices 1710, 1720, 1804, and 1930 may also include various combinations of different types and forms of transducers that work together or independently to enhance a user's artificial-reality experience. In one example, each of band elements 1932 of haptic device 1930 may include a vibrotactor (e.g., a vibrotactile actuator) configured to vibrate in unison or independently to provide one or more of various types of haptic sensations to a user.

The above-described embodiments can be implemented in any of numerous ways. For example, the embodiments may be implemented using hardware, software or a combination thereof. When implemented using software, code comprising the software can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that one implementation of the embodiments of the present invention comprises at least one non-transitory computer-readable storage medium (e.g., a computer memory, a portable memory, a compact disk, etc.) encoded with a computer program (i.e., a plurality of instructions), which, when executed on a processor, performs the above-discussed functions of the embodiments of the technologies described herein. The computer-readable storage medium can be transportable such that the program stored thereon can be loaded onto any computer resource to implement the aspects of the present invention discussed herein. In addition, it should be appreciated that reference to a computer program that, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the technology presented herein may be used alone, in combination, or in a variety of arrangements not specifically discussed in the embodiments described above and therefore are not limited in their application to the details and arrangements of components set forth in the foregoing description and/or in the drawings.

Also, some of the embodiments described above may be implemented as one or more method(s), of which some examples have been provided. The acts performed as part of the method(s) may be ordered in any suitable way. Accordingly, embodiments may be constructed in which acts are performed in an order different than illustrated or described herein, which may include performing some acts simultaneously, even though shown as sequential acts in illustrative embodiments. The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

The foregoing features may be used, separately or together in any combination, in any of the embodiments discussed herein.

Further, although advantages of the present invention may be indicated, it should be appreciated that not every embodiment of the invention will include every described advantage. Some embodiments may not implement any features described as advantageous herein. Accordingly, the foregoing description and attached drawings are by way of example only.

Variations on the disclosed embodiment are possible. For example, various aspects of the present technology may be used alone, in combination, or in a variety of arrangements not specifically discussed in the embodiments described in the foregoing, and therefore they are not limited in application to the details and arrangements of components set forth in the foregoing description or illustrated in the drawings. Aspects described in one embodiment may be combined in any manner with aspects described in other embodiments.

Use of ordinal terms such as "first," "second," "third," etc., in the description and/or the claims to modify an element does not by itself connote any priority, precedence, or order of one element over another, or the temporal order in which acts of a method are performed, but are used merely as labels to distinguish one element or act having a certain name from another element or act having a same name (but for use of the ordinal term) to distinguish the elements or acts.

The indefinite articles "a" and "an," as used herein in the specification and in the claims, unless clearly indicated to the contrary, should be understood to mean "at least one."

Any use of the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

Any use of the phrase "equal" or "the same" in reference to two values (e.g., distances, widths, etc.) means that two values are the same within manufacturing tolerances. Thus, two values being equal, or the same, may mean that the two values are different from one another by ±5%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of"

"Consisting essentially of," when used in the claims, shall have its ordinary meaning as used in the field of patent law.

Also, the phraseology and terminology used herein is for the purpose of description and should not be regarded as limiting. Use of terms such as "including," "comprising," "comprised of," "having," "containing," and "involving," and variations thereof herein, is meant to encompass the items listed thereafter and equivalents thereof as well as additional items.

The terms "approximately" and "about" if used herein may be construed to mean within ±20% of a target value in some embodiments, within ±10% of a target value in some embodiments, within ±5% of a target value in some embodiments, and within ±2% of a target value in some embodiments. The terms "approximately" and "about" may equal the target value.

The term "substantially" if used herein may be construed to mean within 95% of a target value in some embodiments, within 98% of a target value in some embodiments, within 99% of a target value in some embodiments, and within 99.5% of a target value in some embodiments. In some embodiments, the term "substantially" may equal 100% of the target value.

The invention claimed is:

1. A system comprising:
   a head-mounted device communicatively coupled with a wearable device that includes a plurality of neuromuscular sensors configured to sense neuromuscular signals from a first user, the plurality of neuromuscular sensors being arranged on the wearable device structured to be worn by the first user;
   at least one camera configured to capture information about a physical environment; and
   at least one processor programmed to:
      determine that the first user is present within the physical environment using the information captured by the camera, wherein the first user has control privileges for a first object and a second object within an extended-reality experience associated with the physical environment;
      determine an identity of a second user that is present within the physical environment, wherein the second user has control privileges for the first object and a third object within the extended-reality experience associated with the physical environment;
      detect one or more neuromuscular signals of the first user sensed by the plurality of neuromuscular sensors; and
      cause presentation, via the head-mounted device, of a control interface for the first user, selected based on the identity of the second user and in accordance with the first user and the second user both having control privileges for the first object within the extended-reality experience, that allows the first user to interact with the second user via the first object based on the detected neuromuscular signals of the first user.

2. The system of claim 1, wherein a first user gesture indicated by the neuromuscular signals from the first user is configured to initiate capturing information about the physical environment, a second user gesture indicated by the neuromuscular signals from the first user is configured to terminate capturing information about the physical environment, a third user gesture indicated by the neuromuscular signals from the first user is configured to identify the first object associated with the physical environment, and a fourth user gesture indicated by the neuromuscular signals from the first user is configured to identify the first object associated with the physical environment as a reference object.

3. The system of claim 1, wherein the second user's identity is determined by identifying an electronic device that is associated with the second user.

4. The system of claim 3, wherein the control interface is specific to the second user and includes one or more controls for controlling the electronic device associated with the second user.

5. The system of claim 3, wherein the electronic device comprises at least one of:

a smart device;

a smartphone;

a haptic device;

an electronic gaming device; or a display device.

6. The system of claim 5, wherein the neuromuscular signals of the first user cause at least one of the following:

a personal message to be transmitted to the smartphone of the second user;

an electronic game input to be performed in the electronic gaming device played by the first user;

an activation of the haptic device worn by the first user;

an image to be displayed on the display device viewable by the second user in the environment; or permit the second user to control a function of the environment.

7. The system of claim 5, wherein the processor is further programmed to cause permission to be granted to the second user to control at least one of:

the electronic gaming device;

the display device;

the smartphone; or the haptic device.

8. The system of claim 1, wherein the processor is further programmed to generate an extended reality (XR) environment in which the first user and the second interact with each other.

9. The system of claim 8, wherein the processor is programmed to enable the first user to interact with the second user in the XR environment based on neuromuscular activities recognized from the neuromuscular signals sensed by the plurality of neuromuscular sensors.

10. The system of claim 8, wherein the XR environment enables the first and second users to share control of each other's electronically controllable objects.

11. The system of claim 8, wherein recognized neuromuscular activities recognized from the neuromuscular signals sensed by the plurality of neuromuscular sensors cause an electronic game to be played with the second user in the XR environment.

12. The system of claim 8, wherein recognized neuromuscular activities recognized from the neuromuscular signals sensed by the plurality of neuromuscular sensors cause messages to be sent to a smartphone associated with the second user.

13. The system of claim 8, wherein recognized neuromuscular activities recognized from the neuromuscular signals sensed by the plurality of neuromuscular sensors cause haptic signals to be sent to the second user.

14. A wearable electronic device comprising:

a plurality of neuromuscular sensors configured to sense neuromuscular signals from a first user, the plurality of neuromuscular sensors being arranged on the wearable device structured to be worn by the first user, wherein the wearable electronic device is communicatively coupled with a head-mounted device;

at least one camera configured to capture information about a physical environment; and at least one processor programmed to:

determine that the first user is present within the physical environment using the information captured by the camera, wherein the first user has control privileges for a first object and a second object within an extended-reality experience associated with the physical environment;

determine an identity of a second user that is present within the environment, wherein the second user has control privileges for the first object and a third object within the extended-reality experience associated with the physical environment;

detect one or more neuromuscular signals of the first user sensed by the plurality of neuromuscular sensors; and cause presentation, via the head-mounted device, of a control interface for the first user, selected based on the identity of the second user and in accordance with the first user and the second user both having control privileges for the first object within the extended-reality experience, that allows the first user to interact with the second user via the first object based on the detected neuromuscular signals of the first user.

15. The wearable electronic device of claim 14, wherein the processor is further programmed to generate an extended reality (XR) environment in which the first user and the second interact with each other.

16. The wearable electronic device of claim 15, wherein the processor is programmed to enable the first user to interact with the second user in the XR environment based on neuromuscular activities recognized from the neuromuscular signals sensed by the plurality of neuromuscular sensors.

17. The wearable electronic device of claim 15, wherein the XR environment enables the first and second users to share control of each user's electronically controllable objects.

18. The wearable electronic device of claim 15, wherein recognized neuromuscular activities recognized from the neuromuscular signals sensed by the plurality of neuromuscular sensors cause an electronic game to be played with the second user in the XR environment.

19. The wearable electronic device of claim 15, wherein recognized neuromuscular activities recognized from the neuromuscular signals sensed by the plurality of neuromuscular sensors cause messages to be sent to a smartphone associated with the second user.

20. An apparatus comprising:

a head-mounted device communicatively coupled with a wearable device that includes a plurality of neuromuscular sensors configured to sense neuromuscular signals from a first user, the plurality of neuromuscular sensors being arranged on the wearable device structured to be worn by the first user;

at least one camera configured to capture information about a physical environment; and at least one processor programmed to:

determine that the first user is present within the physical environment using the information captured by the camera, wherein the first user has control privileges for a first object and a second object within an extended-reality experience associated with the physical environment;

determine an identity of a second user that is present within the physical environment, wherein the second user has control privileges for the first object and a third object within the extended-reality experience associated with the physical environment;

detect one or more neuromuscular signals of the first user sensed by the plurality of neuromuscular sensors; and cause presentation, via the head-mounted device, of a control interface for the first user, selected based on the identity of the second user and in accordance with the first user and the second user both having control privileges for the first object within the extended-reality experience, that allows the first user to interact with the second user via the first object based on the detected neuromuscular signals of the first user.

* * * * *